US007416137B2

(12) United States Patent
Hagen et al.

(10) Patent No.: US 7,416,137 B2
(45) Date of Patent: Aug. 26, 2008

(54) THERMODYNAMIC CYCLES USING THERMAL DILUENT

(75) Inventors: David L. Hagen, Goshen, IN (US); Gary Ginter, Chicago, IL (US); Alberto Traverso, Novi Ligure (IT); Bill Goheen, Goshen, IN (US); Allan McGuire, Elkhart, IN (US); Janet Rankin, Shawano, WI (US); Aristide Massardo, Genova (IT); Ronald L. Klaus, Goshen, IN (US)

(73) Assignee: Vast Power Systems, Inc., Elkhart, IN (US)

( * ) Notice: Subject to any disclaimer, the term of this patent is extended or adjusted under 35 U.S.C. 154(b) by 767 days.

(21) Appl. No.: 10/763,057

(22) Filed: Jan. 22, 2004

(65) Prior Publication Data

US 2004/0238654 A1 Dec. 2, 2004

Related U.S. Application Data

(60) Provisional application No. 60/442,844, filed on Jan. 24, 2003, provisional application No. 60/442,096, filed on Jan. 22, 2003.

(51) Int. Cl.
    *B60H 1/02* (2006.01)
(52) U.S. Cl. .................................. 237/12.1; 60/39.01
(58) Field of Classification Search ............... 237/12.1; 60/39.01, 793, 624
    See application file for complete search history.

(56) References Cited

U.S. PATENT DOCUMENTS 2,678,531 A   5/1954   Miller
2,678,532 A   5/1954   Miller
2,869,324 A   1/1959   Foote (Continued)

FOREIGN PATENT DOCUMENTS

EP       0444013 A1    8/1991

(Continued)

OTHER PUBLICATIONS

Agren, N., "Advanced Gas Turbine Cycles with Water-Air Mixtures as Working Fluid", Doctoral Thesis, Deparyment of Chemical Engineering and Technology, Energy Processes, Royal Institute of Technology, Stockholm, 2000.

(Continued)

*Primary Examiner*—Derek S. Boles
(74) *Attorney, Agent, or Firm*—Ostrolenk, Faber, Gerb & Soffen, LLP

(57) ABSTRACT

A thermodynamic system that produces mechanical, electrical power, and/or fluid streams for heating or cooling. The cycle contains a combustion system that produces an energetic fluid by combustion of a fuel with an oxidant. A thermal diluent may be used in the cycle to improve performance, including but not limited to power, efficiency, economics, emissions, dynamic and off-peak load performance, and/or turbine inlet temperature (TIT) regulation and cooling heated components. The cycle preferably includes a heat recovery system and a condenser or other means to recover and recycle heat and the thermal diluent from the energetic fluid to improve the cycle thermodynamic efficiency and reduce energy conversion costs. The cycle may also include controls for temperatures, pressures, and flow rates throughout the cycle, and controls power output, efficiency, and energetic fluid composition.

101 Claims, 25 Drawing Sheets

U.S. PATENT DOCUMENTS

| | | | |
|---|---|---|---|
| 3,238,719 A | 3/1966 | Harslem |
| 3,651,641 A | 3/1972 | Ginter |
| 3,657,879 A | 4/1972 | Ewbank et al. |
| 3,696,795 A | 10/1972 | Smith et al. |
| 4,128,994 A | 12/1978 | Cheng |
| 4,248,039 A | 2/1981 | Cheng |
| 4,273,527 A | 6/1981 | Meenan |
| 4,483,137 A | 11/1984 | Faulkner et al. |
| 4,491,093 A | 1/1985 | Hoekstra |
| 4,509,324 A | 4/1985 | Urbach et al. |
| 4,522,024 A | 6/1985 | Zaugg |
| 4,753,068 A | 6/1988 | El-Masri |
| 4,841,721 A | 6/1989 | Patton et al. |
| 4,928,478 A | 5/1990 | Maslak |
| 5,050,375 A | 9/1991 | Dickinson |
| 5,175,995 A | 1/1993 | Pak et al. |
| 5,226,594 A | 7/1993 | Swenson |
| 5,271,215 A | 12/1993 | Guillet |
| 5,617,716 A | 4/1997 | Schreiber |
| 5,627,719 A | 5/1997 | Gaston |
| 5,680,764 A | 10/1997 | Viteri |
| 5,690,039 A | 11/1997 | Monro et al. |
| 5,743,080 A | 4/1998 | Ginter |
| 5,771,678 A | 6/1998 | Shouman |
| 6,053,418 A | 4/2000 | Guyer |
| 6,073,857 A | 6/2000 | Gordon et al. |
| 6,089,024 A | 7/2000 | Hatanaka |
| 6,158,962 A | 12/2000 | Lee et al. |
| 6,183,240 B1 | 2/2001 | Dobbeling et al. |
| 6,289,666 B1 | 9/2001 | Ginter |
| 6,293,086 B1 | 9/2001 | Reynolds |
| 6,370,862 B1 | 4/2002 | Cheng |
| 6,418,724 B1 | 7/2002 | Cheng |
| 6,564,556 B2 | 5/2003 | Ginter |
| 6,810,668 B2 | 11/2004 | Nagatani et al. |

FOREIGN PATENT DOCUMENTS

| | | | |
|---|---|---|---|
| EP | 0505263 A1 | 9/1992 |
| IT | 1256878 | 12/1995 |
| WO | WO 0190548 A1 | 11/2001 |

OTHER PUBLICATIONS

Agren et al., "First Experiments on an Evaporative Gas Turbine Pilot Power Plant—Water Circuit Chemistry and Himidification Evaluation", The American Society of Mechanical Engineers, 2000.

Agren et al., "New Humidification Concept for Evaporative Gas Turbine Cycles Applied to a Modern Aeroderivative Gas Turbine", Proceedings for the ASME, AES-vol. 37, 1997.

Lindquist, T., "Evaluation, Experience and Potential fo Gas Turbine Based Cycles with Humidification", Doctoral Thesis, Division of Therrmal Power Engineering, Dept. of Heat and Power Engineering, Lund University, Sweden, Sep. 6, 2002, p. 85.

International Search Report for Application No. PCT/US04/01545 (the PCT counterpart of the parent application).

Blanco et al., "Water Recovery Systems for Steam Injected Gas Turbines: An Economic Analysisi", Proceedings of ECOS 2002, Jul. 3-5, Berlin, Germany.

Bathie, W., "Fundamentals of Gas Turbines", 1996, p. 139.

Boyce, M., "Handbook for Cogeneration and Combine Cycle Power Plants", 2002, p. 62.

Granovski et al.; "Simulation of Temperature Field Redistribution through multistage cooled turbines", Paper 2001-GT-0576, ASME Turbo Expo.Jun. 4-7, 2001, New Orleans.

Lefebvre, A., "Gas Turbine Combustion", 1998, section 5-7-3 (pp. 150-151); p. 337 (on CO vs. NOx).

Malecki et al., "Application of and Advanced CFD-Based Analysis System to the PW600 Combustor to Optimize Exit Temperature Distribution—Part 1: Description and Validation of the Analysis Tool", 2001.

Moore et al., "GE Power Systems; Gas Turbine Emissions and Control", 2001, p. 18.

Travers, A., "Thermoeconomic Analysis of STIG, RWO and HAT Cycles with Carbon Dioxide ($CO_2$) Emission Penalty". Masters Thesis of Thermochemical Power Group of the University of Genoa Faculty of Engineering, 2000.

Fig. 8
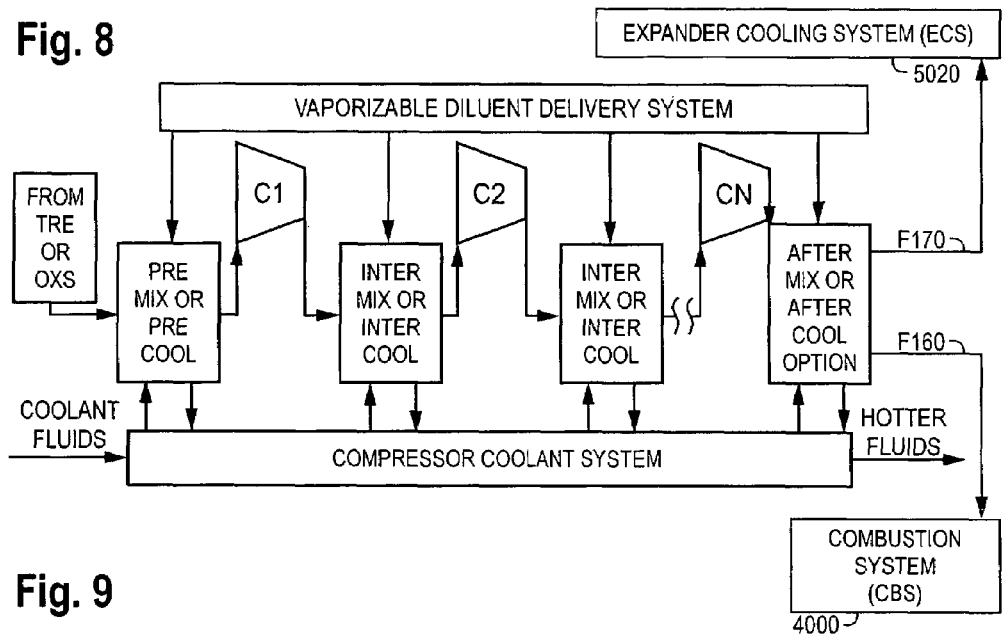
Fig. 9
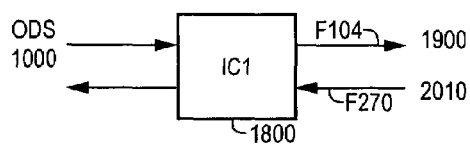
Fig. 10
Fig. 11
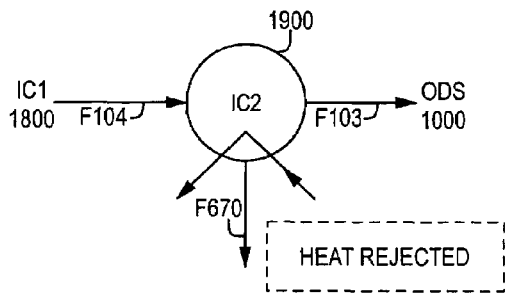
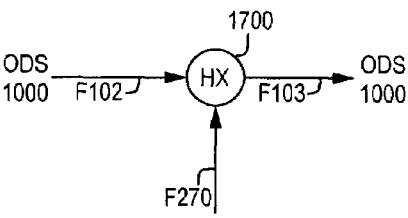

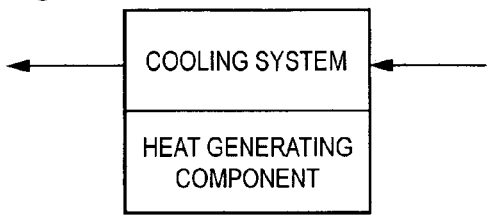
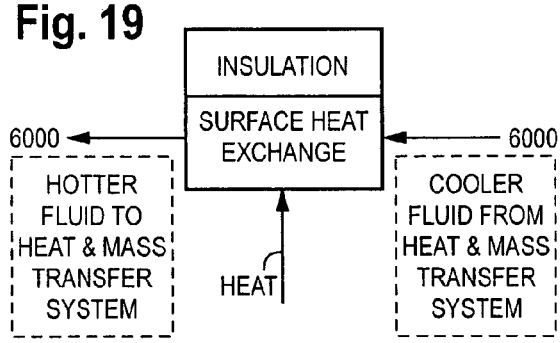
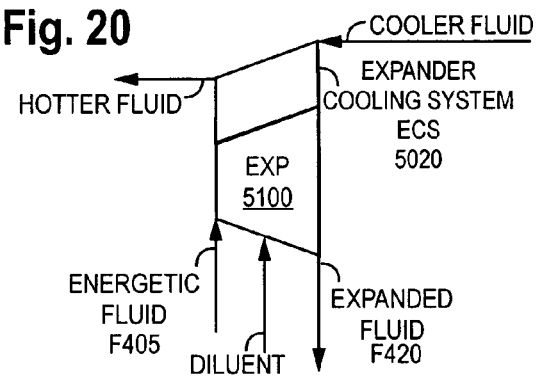
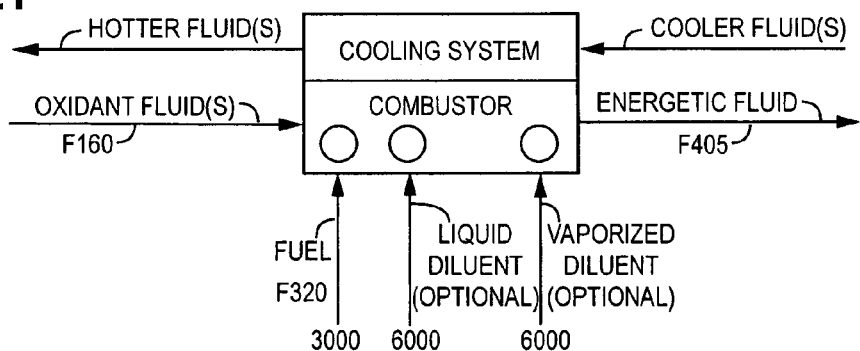
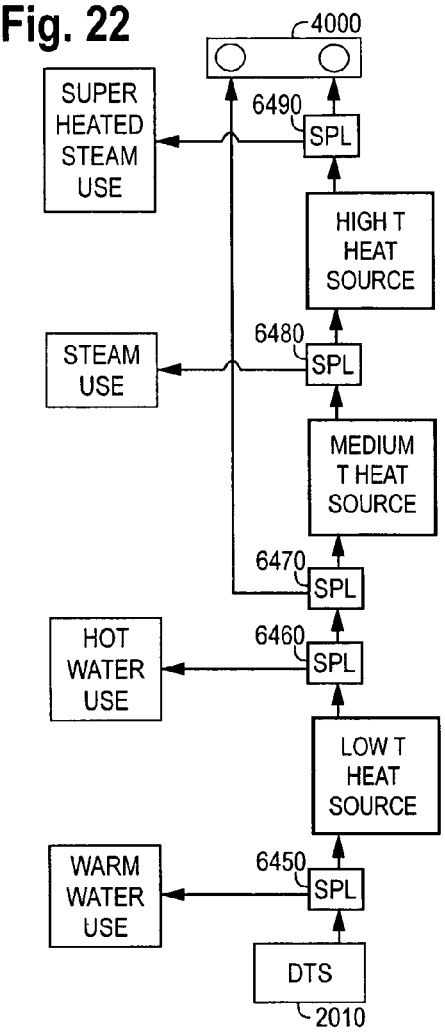

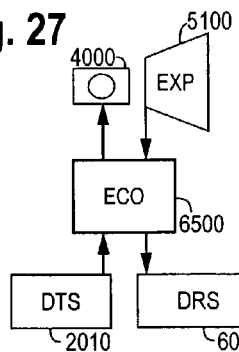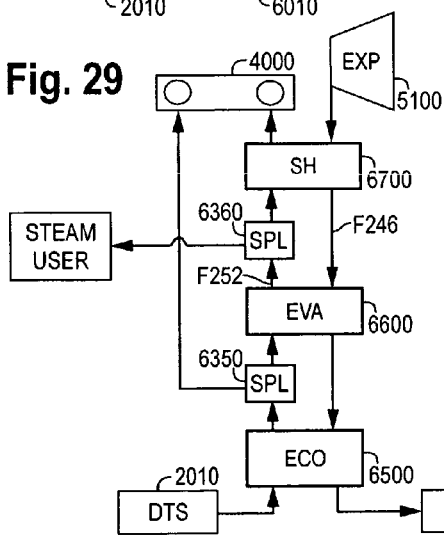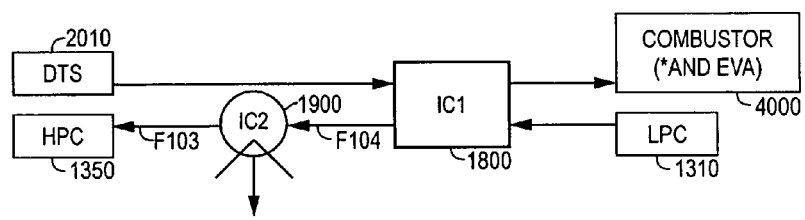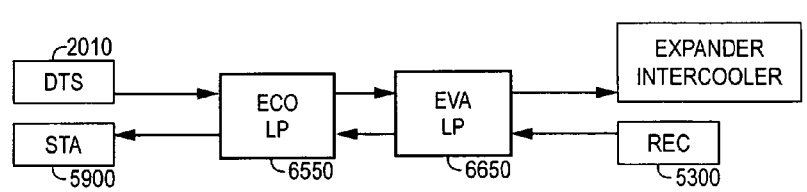

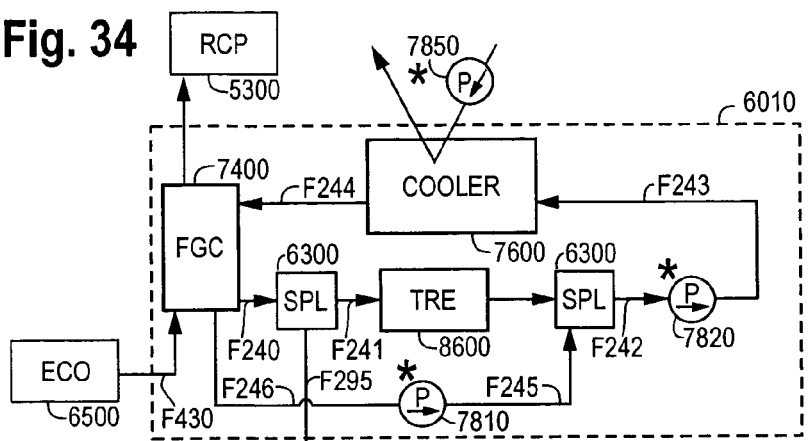
Fig. 34
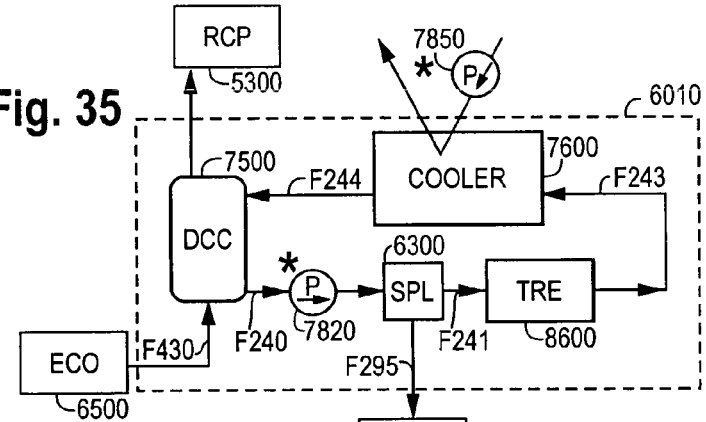
Fig. 35
Fig. 36
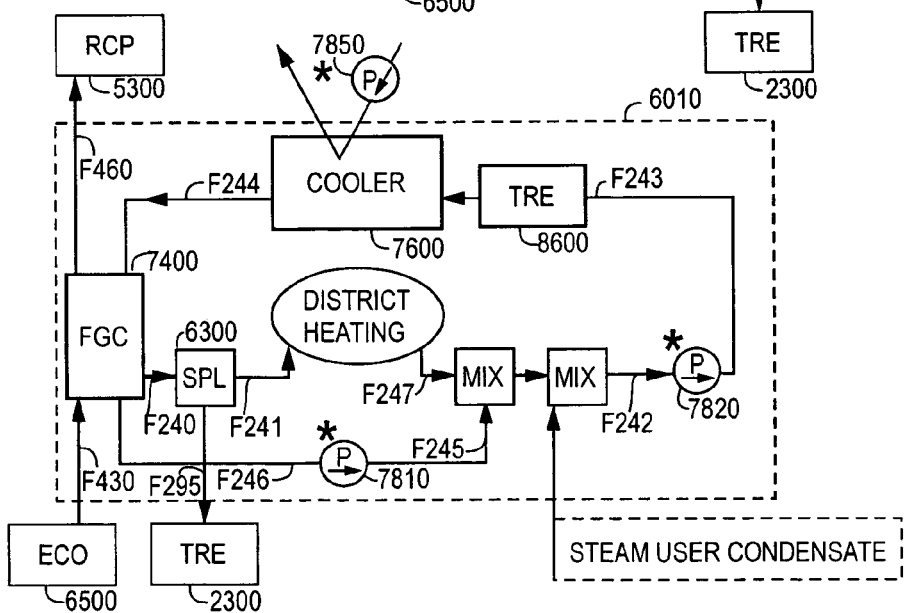

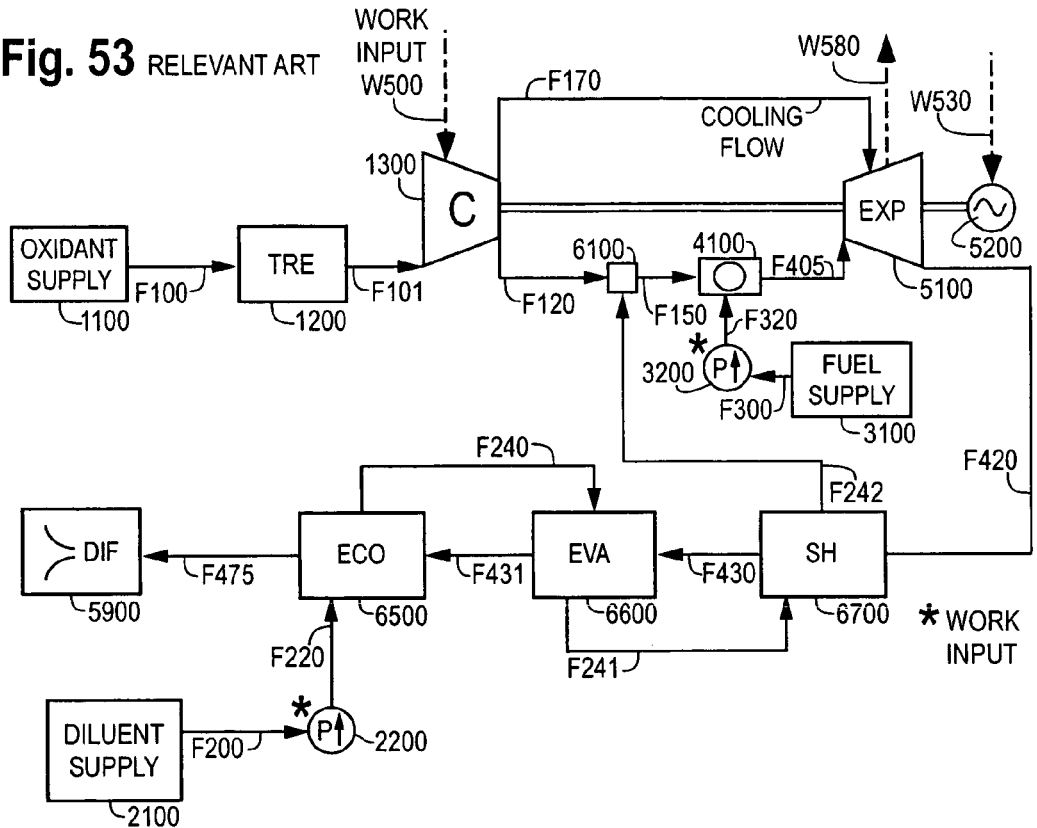
Fig. 53 RELEVANT ART
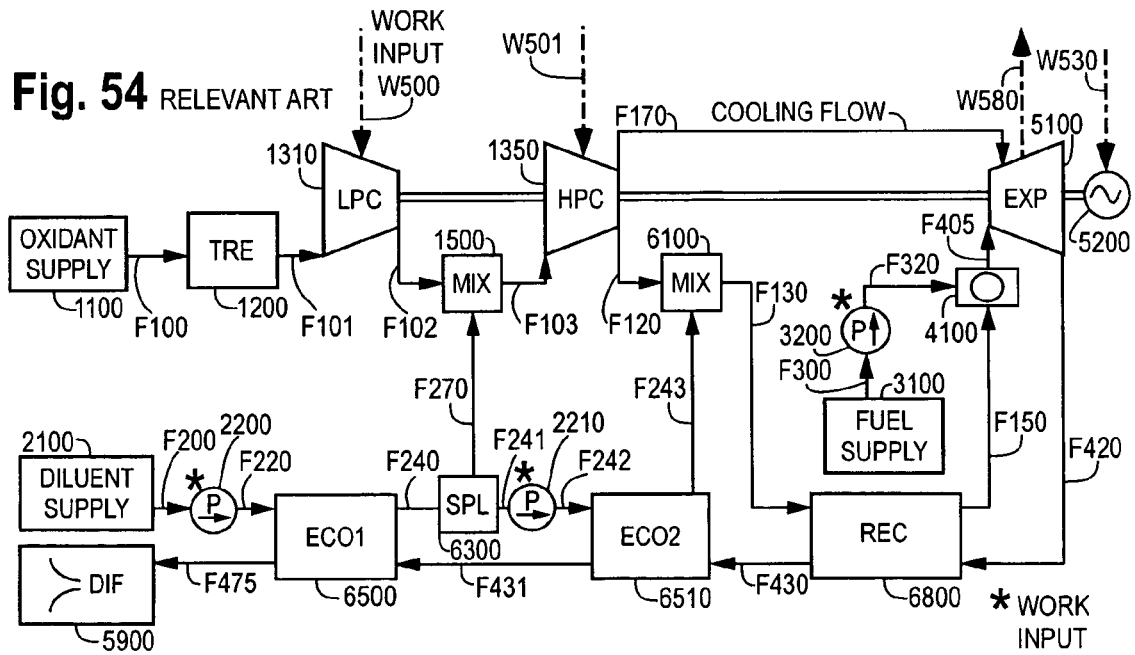
Fig. 54 RELEVANT ART

THERMODYNAMIC CYCLES USING THERMAL DILUENT

PRIORITY INFORMATION

This application claims the priority benefit under 35 U.S.C. § 119(e) of Provisional Application 60/442,096, filed Jan. 22, 2003 and Provisional Application 60/442,844 filed Jan. 24, 2003.

BACKGROUND OF THE INVENTION

1. Field of the Invention

The invention relates in general to methods of performing thermodynamic cycles for generating mechanical and electrical power, heating, or cooling.

2. Description of the Related Art

The prior art includes combustors and combustion systems that use diluents to cool combustion with relatively poor control over the peak temperature and little spatial control over the transverse temperature profile. Cooling of the combustion products has commonly been done with excess air. Pressurizing this excess air along commonly consumes 40% to 70% (from large turbines to microturbines) of the gross turbine power recovered resulting in low net specific power. I.e., the gross power less compressor and pump power produced per mass flow through the compressor(s) or turbine(s).

Relevant applications of diluent have particularly focused on controlling emissions, flame stability and flame quenching, especially when using ultra-lean mixtures and operating near the combustion limit. (E.g., see Lefebvre, 1998, section 5-7-3; Bathie, 1996, p 139; Boyce, 2002, p 62; Lundquist, 2002, p 85). Some relevant efforts to reduce the use of excess air as diluent have used forms of thermal diluent, such as steam and water, that can remove more heat with less compression work (E.g., U.S. Pat. No. 3,651,641, U.S. Pat. No. 5,627,719, U.S. Pat. No. 5,743,080, and U.S. Pat. No. 6,289,666 to Ginter, U.S. Pat. No. 5,271,215 to Guillet, U.S. Pat. No. 6,370,862 to Cheng).

Temperature control throughout the thermodynamic cycle is important for efficient operation. Controlling the peak temperature and profile of the energetic fluid delivered to an expander results in better efficiencies of the cycle (Gravonvski, 2001). It is difficult to control the temperature profile using excess air or steam as commonly used to cool cycle components and special mixing devices. The irregularities in the spatial and temporal temperature distribution of flows require greater design margins than preferred to compensate for the uncertainties in the temperature profiles. (E.g., Malecki et al, "Application of and Advanced CFD-Based Analysis System to the PW600 Combustor to Optimize Exit Temperature Distribution—Part 1", 2001). The problem of temperature irregularities is heightened by changes in work load.

Various thermodynamic cycles have been proposed to improve heat recovery and system efficiency. The conventional Combined Cycle (CC) utilizes a Heat Recovery Steam Generator (HRSG) to generate steam which is expanded through a second (steam) turbine. This results in high capital costs. Consequently combined cycles are mostly used in base load applications. In the Steam Injected Gas Turbine (STIG) cycle, steam is generated in a similar HRSG and is injected upstream of the expander. This uses the same gas turbine with a higher mass flow. By only being able to deliver steam, the STIG cycle is limited in its ability to recover lower temperature heat. High water treatment costs and water availability are often stated as a major objections to more widespread use of the STIG. The CHENG cycle is similar to the STIG cycle. Similar objections have been raised for it as the STIG cycle.

The Recuperated Water Injection (RWI) cycle utilizes a recuperator to recover heat from expanded fluid into incoming compressed. It uses water injection on the intake of the recuperator to improve heat recovery. This is similarly limited by the air saturation limit. The Humidified Air Turbine (HAT) cycle humidified intake air through a saturator. The Evaporated Gas Turbine (EvGT) is a similar cycle. While utilizing lower quality water, the HAT and EvGT cycles are limited in the amount of deliverable diluent by air saturation limits. An EvGT cycle has been demonstrated at LUND University in Sweden. Otherwise these RWI, HAT, and EvGT cycles have been little used, possibly because of relatively high capital costs. The HAWIT cycle has been proposed to reduce capital costs. It utilizes direct contact heat exchangers to reduce the cost of surface heat exchangers used in the HAT cycle. It has lower costs but lower efficiency than the HAT cycle. The relative efficiency and internal rate of return for these cycles were compared by Traverso (2000).

Conventional heat recovery methods have particular difficulty in recovering useful heat below the temperature of steam formed from the expanded fluid with sufficient pressure to reinject upstream of an expander, or within a steam expander. Much heat energy continues to be lost as the expanded is exhausted. Conventional methods of recovering heat from the expanded fluid (after the hot energetic fluid has been expanded to extract mechanical energy) often seek to use high temperature recuperators to heat the large volume of excess cooling air. E.g. air to air recuperators approaching 700° C. These result in high cost and expensive maintenance, where the recuperator alone may exceed 30% of system costs and 80% of the maintenance in micro-turbines.

Using diluents other than air have resulted in further expenses in diluent supply and recovery in relevant cycles for power generation such as "wet" cycles like STIG and HAT. Relevant cycles with typical heat and diluent recovery systems typically need to add "make-up" diluent to compensate for inefficiencies of the system and to reduce operation costs.

Thermodynamic cycles that use a diluent beyond the oxidant containing fluid often need to recover that thermal diluent for pollution and/or economic reasons. (For example, Italian Patent TO92A000603 to Poggio and Agren, "Advanced Gas Turbine Cycles with Water-Air Mixtures as Working Fluid", 2000). Such processes have been expensive. Make-up diluent is commonly needed because of inefficiencies in the recovery process (Blanco, 2002).

In the addition of a thermal diluent, fluid filtering and cleanup has been required to prepare the diluent to be delivered to the thermodynamic cycle system (Agren, "Advanced Gas Turbine Cycles with Water-Air Mixtures as Working Fluid", 2000; SPE "Mashproekt", "Aquarius Cycle", http://www.mashproekt.nikolaev.ua). Such conventional methods add substantial expenses.

Pollutants are becoming a common concern throughout the world and their control is becoming more important. Relevant art methods of adding water often exacerbate formation of some pollutants such as while decreasing others. (e.g. See Lefebvre, 1998, p 337 on CO vs NOx). Control of pollutants to stringent legislated methods has often required additional components at substantial further capital and maintenance costs. Many of these pollutant control devices have short lives compared to the overall plant life resulting in further maintenance expenses. Major firms appear to have made a concerted effort to shift to dry excess air to achieve low NOx emissions and to avoid the use of steam as diluent.

Lefebvre (1998, p 337) demonstrates that conventional wisdom discourages water injection into turbine power systems. The cost of providing and treating water is frequently noted as a substantial hindrance. Commentators expect efficiencies to drop as more water or steam is added to the cycle (Pavri and Moore 2001, p 18).

Thermodynamic cycles are sometimes used for both mechanical work and heating. The heat produced by the combustion process may be used for heat in assorted applications from steam production to district heating. These "combined heat and power" (CHP) applications have been limited by the design of the CHP device. If the demand for heat or power deviates from the design of the CHP system, the efficiencies are greatly reduced, especially when providing hot water.

SUMMARY OF THE INVENTION

With many energy conversion systems and thermodynamic cycles, there is a desire to reduce system life cycle costs and emissions and improve performance and reliability. There is similar interest in improving the thermodynamic efficiency and reduce expenses while maintaining or improving limitations imposed by equipment, environment, including turbine blade life, and pollutant emissions.

Accordingly, one embodiment of this invention comprises configuring a new thermodynamic power cycle with a heat and mass transfer system that more effectively recovers heat from expanded energetic fluid. In such an embodiment, users preferably configure an energy conversion system to operate on an enhanced VAST Cycle to utilize a diluent comprising a vaporizable component (e.g., water) to provide effective heat recovery from an expanded energetic fluid downstream of an expander. In one embodiment, an VAST-W cycle recovers heat from the expanded fluid by heating liquid diluent. E.g. with water. In another embodiment, a VAST Steam Cycle (VAST-WS) recovers that heat by heating, evaporating and preferably superheating liquid diluent. E.g. with water and steam.

In other embodiments, a VAST Recuperated Water-Steam Cycle (VAST-WSR) cycle is configured recover heat from a portion of the expanded fluid to incoming oxidant containing fluid using a recuperator, together with the respective VAST-W and VAST-WS components. Each cycle includes a combustor preferably operable to deliver mix and combust oxidant containing fluid, fuel containing fluid, and one or both of liquid diluent and vaporized diluent.

In another embodiment, an object is to recover heat from heat generating components and from cooling heated components. In such an embodiment, users preferably distribute diluent to recover heat from one or more of heated components and heat generating components such as one or more turbines, combustors, generators, drives and motors. They preferably configure a controller operable to manage the diluent distribution to cool multiple fluids and components and to deliver heated diluent to a combustor.

In certain embodiments, VAST combustors are preferably provided and configured operable to control VAST Cycles under near stoichiometric conditions while keeping pollutants low, such as described in the patents to Ginter, in the Trifluid patent application by Hagen et al., and in the '191 patent application by Hagen et al. They are preferably configured to accommodate all the liquid and/or vapor diluent desired upstream of the expander to operate at near stoichiometric conditions. E.g., adding diluent (e.g., water and steam) sufficient to exceed one or more of the air saturation limit, the steam generation limit, and the conventional premixed combustibility or flame stability limit, and the small droplet combustion quench limit. Compressors are preferably resized relative to turbines to accommodate the lower oxidant containing fluid flows, providing major cost savings.

In some embodiments, one object is to reduce the cost of providing and treating diluent within the cycle. In such embodiments, the expanded fluid is preferably cooled with a condenser, and diluent condensed and recovered. A direct contact condensor using cooled diluent (water) is preferred to improve recovery efficiency and reduce pollutants exhausted. Water formed in combustion and/or humidity in air is preferably recovered as well as the injected diluent, making the cycles self sufficient in water. Recovering excess diluent assists in removing fluid contaminants by fluid discharge. Intake oxidant containing fluid flow is preferably reduced with corresponding reductions in intake contaminants. With clean fuels, and intake spray cleaning, contaminant levels may be controlled by diluent discharge. The cycles preferably treat and recycle diluent, reducing treatment costs.

In another embodiment, an object may be to increase heat conversion to mechanical power. In such embodiments, the pressure ratio of the compressors is increased, particularly with liquid diluent delivery. Users preferably configure a recompressor downstream of the condensor and expander. The combustor may be configured for lower pressure drop. A direct contact condensor may be used to reduce the pressure loss in the condenser. The pressure ratio of the intake compressors, the recompressor, the combustor pressure loss and the direct contact pressure loss are configured to achieve desired net expansion ratio across the turbine. With increased expansion, the heat recovery system is configured for the much lower exhaust temperature.

In another embodiment, an object is to increase the hot energetic ("working") fluid temperature and system efficiency. In such embodiments, a Trifluid VAST combustor may be operable to control the transverse temperature distribution entering the expander and precisely controlling fluid flows is preferably used. This enables higher mean fluid temperatures with the same peak temperature while controlling pollutant levels. Diluent (e.g., water and/or steam) is preferably used (instead of air cooling) to cool combustor and expander hot sections. The heated diluent is preferably recycled upstream into the combustor, thus avoiding diluent cooling of the energetic (working) fluid and further reducing compressor size and cost.

In another embodiment, another object is to reduce the cost and energy to treat the intake oxidant containing fluid. In such embodiments, direct contactors are preferably used to spray filter the intake oxidant fluid using excess diluent. Intake diffusers, and filters are resized for the lower oxidant flows. Cold diluent may be used to increase intake fluid density.

In another embodiment, an object is to reduce the power and equipment traditionally required in ultra-lean combustion to compress gaseous oxidant containing fluid relative to the power generated, thereby increasing the net specific power of compressors and turbines and to reduce system costs. (I.e., the gross turbine power less pumping power, divided by the respective mass flow.) In such embodiments, at least some vaporizable diluent is preferably used to reduce the excess gaseous oxidant containing fluid commonly used as diluent and displace gas pumping with liquid pumping work. The vaporizable diluent transfers more heat per volume of energetic fluid flowing through the expander.

In another embodiment, the cycles preferably configure the compressors to cool the oxidant containing fluid while using diluent to recover that heat of compression. The cycles preferably use direct fluid contactors as taught in the '191 patent application to improve spatial distribution of diluent delivery in compressor precoolers, inter-coolers and intra-coolers. Surface heat exchangers using cool diluent may be used with the heated diluent recycled into heat exchange system or into the combustor.

In another embodiment of the invention, an object is to control major pollutant levels below desired limits while operating near stoichiometric conditions. VAST combustors capable of controlling transverse distribution of fluid delivery are preferably utilized as operable to provide transverse distributions of near stoichiometric conditions and temperature, while achieving low pollutant emissions. In such an embodiment, by using a combustor operable to constrain peak combustion temperatures while using low excess oxidant, the emissions of oxides of nitrogen (NOx) are substantially. By using a combustor operable to control transverse temperature distributions and fluid composition distributions, good fuel oxidation is achieved with low emissions of carbon monoxide, and residual fuel components.

In another embodiment, one object is to configure a VAST cycle operable to provide one or more of hot water, saturated steam and superheated steam in Combined Heat and Power (CHP) as desired for particular applications. In such an embodiment, the heat and mass transfer system is preferably configured with one or more locations from which to extract such heated fluids together with mechanical or electrical power. Diluent delivery, heat recovery and the combustor are preferably configured and controllable to provide flexible control over the delivery of vaporized diluent (e.g., steam), total heat Q, and mechanical or electrical power.

It should be noted that certain objects and advantages of embodiments of the invention have been described above for the purpose of describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or increases one advantage or group of advantages as taught herein without necessarily achieving other objects or advantages as may be taught or suggested herein.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, each having features and advantages in accordance with one embodiment of the invention, of which:

FIG. 8 is a detail breakout of oxidant-delivery system compressor train with potential pre-cooling, inter-cooling or intra-cooling, and after-cooling with coolant fluids from a compressor coolant system;

FIG. 9 is a schematic diagram of a surface heat exchange apparatus;

FIG. 10 is a schematic diagram of flow cooling with heat rejection;

FIG. 11 is a simple diagram of a liquid-gas contactor or direct contactor heat exchanger;

FIG. 18 is a block diagram of a heat generating component and its cooling system;

FIG. 19 is a block diagram for insulation and surface heat exchange as option for a cooling system;

FIG. 20 is a block diagram for an expander with one or both of a surface heat exchange system with coolant flow, or direct contact cooling using diluent;

FIG. 21 is a block diagram for a combustion system with fuel, oxidant fluid(s), liquid diluent, and vapor diluent delivery, and a combustor cooling system;

FIG. 22 is a schematic diagram of cooling low temperature, medium temperature and high temperature heat sources with recovery and use of the heated diluent.

FIG. 27 is a schematic diagram of an economizer recovering heat from expanded fluid into treated liquid diluent;

FIG. 28 is a schematic diagram of an economizer, evaporator and superheater recovering heat and operable to deliver warm water, hot water, steam and superheated steam to user applications and/or the combustor;

FIG. 29 is a schematic diagram of an economizer, evaporator and superheater recovering heat and operable to deliver hot water and/or steam to a user application and/or the combustor;

FIG. 30 is a schematic diagram of a portion of the heat and mass transfer system of the intercooler system for the compressors;

FIG. 31 is a schematic diagram of a portion of the heat and mass transfer system with an economizer, evaporator and expander intercooler system;

FIG. 34 is a schematic diagram of the heat and mass transfer system diluent recovery by surface condensation with a coolant system;

FIG. 35 is a schematic diagram of the heat and mass transfer system diluent recovery by direct contact condenser and a coolant system;

FIG. 36 is a schematic diagram of the heat and mass transfer system diluent recovery by surface condensation with district heating within a coolant system;

FIG. 53 is a schematic of the Steam Injected Gas Turbine (STIG) cycle relevant art;

FIG. 54 is a schematic of the intercooled Recuperated Water Injection (RWI) cycle relevant art;

DETAILED DESCRIPTION OF THE PREFERRED EMBODIMENT

General

U.S. Pat. Nos. 3,651,641, 5,617,719, 5,743,080 and 6,289,666 to Ginter teach VAST thermodynamic power cycles that primarily pump liquid thermal diluent (such as water) into a thermodynamic cycle to cool the combustion, reducing the use of excess dilution air. This VAST ("Value Added Steam Technology") cycle is a hybrid between the Brayton and Rankine cycles and preferably uses fluid water as diluent. It uses an energetic fluid formed in a VAST direct contact fluid combustor, containing both hot products of combustion and superheated steam. This hot energetic fluid is preferably expanded through an expander to generate shaft and/or electrical power. E.g., via a turbine or reciprocating engine. It may also provide Combined Heat and Power (CHP).

Figure 1:
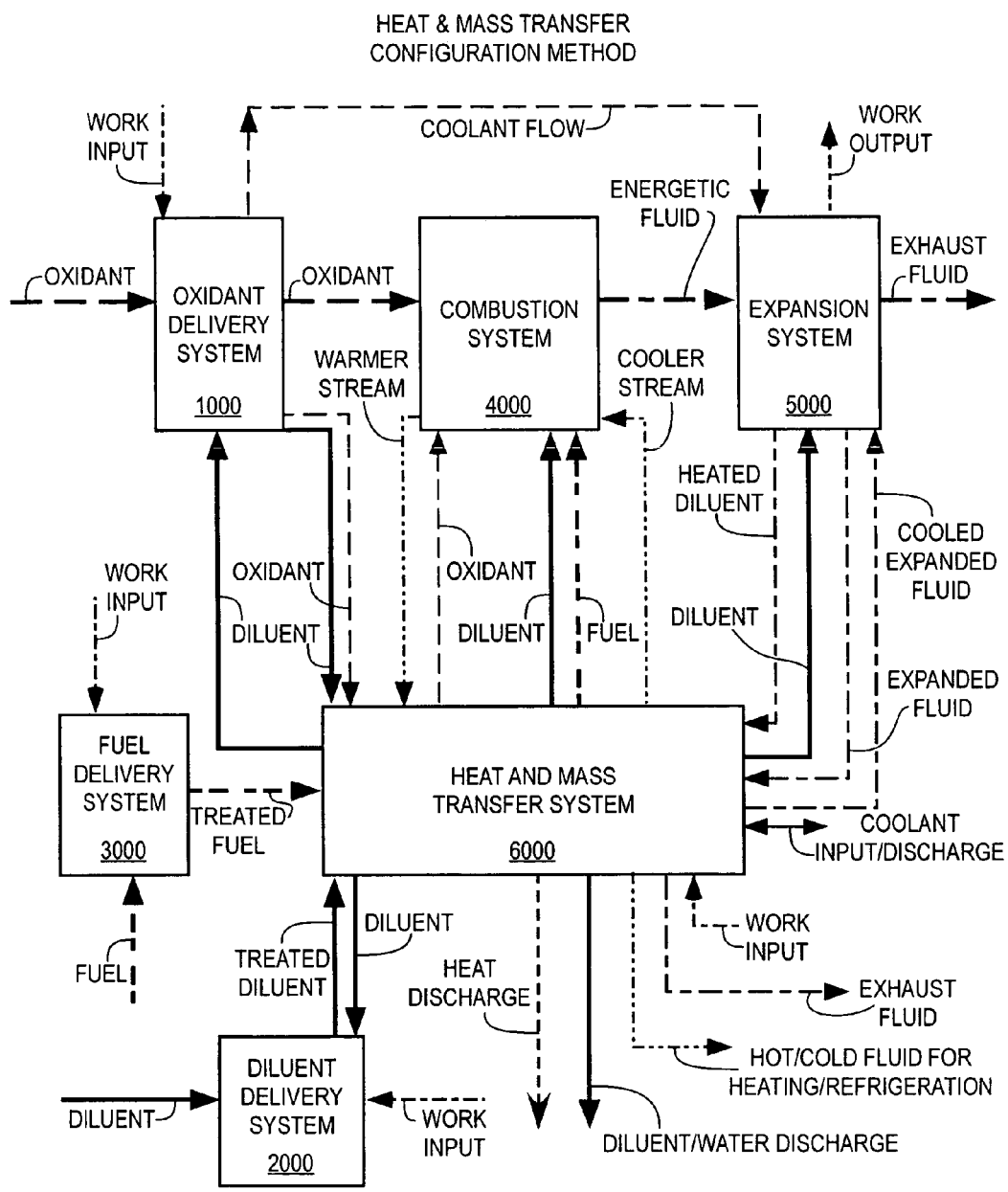
FIG. 1 is a schematic diagram of the overall heat and mass transfer configuration methods and potential configurations used in VAST cycles.

With reference to FIG. 1, the VAST thermodynamic cycles utilize a Combustion System 4000 to form and deliver an Energetic Fluid to an Expansion System 5000 forming an expanded fluid and delivering Work Output. E.g., expanding a working fluid through a turbine. The expansion system may expand to subatmospheric pressure and recompress and exhaust the cooled expanded fluid back to ambient conditions.

A Heat and Mass Transfer System 6000 is used to distribute diluent about the system. It recovers heat such as from the expanded fluid, cools components, such as the combustion system and expansion system, and to cool heated components, such as motors, pumps, bearings, and electromagnetic converters and controllers. It receives Work Input, such as for motors, pumps, and bearings. In doing so, it may deliver a cooler diluent to systems or components and receive heated diluent, such as to the combustion system, expansion system, and oxidant delivery system. The Heat and Mass Transfer system may recover heat using diluent containing fluid, oxidant containing fluid, fuel containing fluid or a coolant fluid. It may exhaust expanded cooled fluid. It may provide hot or cold fluid for heating or refrigeration. It may also discharge one or more of diluent, water, and heat.

A Fuel Delivery System 3000 is provided to receive fuel and deliver treated fuel through the Heat and Mass transfer System 6000 to the Combustion System 4000. It requires Work Input for pumps and fluid treatment. An Oxidant Delivery System 1000 delivers an oxidant containing fluid (termed "oxidant") to one or more of the Combustion System 4000, the Heat and Mass Transfer System 6000, and the Expansion System 5000. It requires Work Input for fluid compression and/or pumps, and fluid treatment. A Diluent Delivery System receives external and recovered diluent and delivers treated diluent to the Heat and Mass Transfer System 6000. It requires Work Input for pumps and fluid treatment.

The VAST cycle preferably pumps liquid water in to form steam by direct contact of water delivered upstream of the expander 5100, particularly in contact with the combusting fluids or energetic fluid in the combustor between the compressor and the expander. This forms steam at the highest possible temperatures useable in turbines 5100 with cooled blades. The VAST system preferably uses an insulted pressure vessel that is kept relatively cool, enabling use of inexpensive pressure vessel materials and construction. This approach avoids the conventional metallurgical limits where the combustion heat must be transferred through a surface heat exchanger. Thus it avoids the primary constraints on the temperature of conventional steam power systems and the corresponding limits on the working fluid temperature and system efficiency.

By Carnot's law, thermodynamic efficiency increases as the difference between high temperature of the energetic (working fluid) at the inlet to the expander and the low temperature at the outlet of the expander divided by the high absolute temperature. Gas turbines utilizing a VAST cycle can operate with temperatures of about 1773 K (1500° C.) compared to high pressure metallurgical limits of about 1373K (1100° C.). The VAST cycle preferably uses an embodiment of the Trifluid combustor taught in the related Trifluid patent application. The Trifluid combustor enables operators to very precisely and accurately control or limit the peak temperature of the energetic fluid F405 exiting the combustor to a desired design or allowable peak operating temperature given the tolerable material temperature and stress of the turbine blades, at the associated blade cooling provided. It also enables controlling the spatial temperature distribution of the energetic fluid F405 exiting the combustor into the expander.

With such precise peak temperature control, users preferably increase the mean temperature in the energetic fluid F405 by adjusting the spatial temperature control to match the desired temperature profile for the turbine blades, given the available blade cooling. Using thermal diluent to cool the combustor liner reduces or replaces the gaseous thermal diluent (e.g., air) conventionally used to cool the liner. The heated diluent is then delivered upstream into the combustor. This recycles the heat loss through the liner back into the combustion chamber 4100, avoiding most of the related reduction in mean temperature in the energetic fluid F405 in the relevant art.

Embodiments preferably using one or more of these methods increase the useable mean (high) temperature of the energetic fluid F405 and correspondingly increase the Carnot thermal efficiency relative to conventional technologies while controlling to the same peak temperatures in the downstream expander 5100. E.g. the same peak Turbine Inlet Temperatures (TIT).

By preferably reducing or displacing the common excess oxidant cooling flows through the liner, users improve the spatial uniformity of the static pressure distribution and the velocity distribution of the energetic fluid F405 across the combustor exit. Improving these parameter distributions in the energetic fluid F405 substantially improves the flow patterns within the turbine 5100 and increases the turbine efficiency.

The VAST cycle preferably uses a direct contact heat exchanger 7500 to cool the flow the expanded fluid downstream of the expander and condense the diluent. By using a distributed direct contact fluid condenser 7500, users improve the heat transfer resulting in a closer approach temperature compared to conventional art surface heat exchangers. They increase the effective flow area and reduce the effective pressure drop and energy losses across the condenser 7500. Embodiments using one or both of these methods lower the effective cold temperature in the Carnot efficiency, thereby increasing the Carnot efficiency.

By delivering liquid thermal diluent (e.g., water) to displace most of the excess oxidant containing fluid (e.g., air) some embodiments significantly reduce the parasitic pumping losses in the oxidant fluid compressor 1300 and thermal diluent pump. Using a spray direct contact filter reduces the parasitic intake fluid pressure loss. Such filters reduce the drop in efficiency from dirt buildup within the compressor 1300. Such direct contact filter cleaning reduces the amount of material carried over into the fluid condensed after the turbine. This reduces the filtration and pH balancing and corresponding parasitic pumping required to recycle the condensed fluid. By reducing one or more of these parasitic pumping losses, the various embodiments described significantly increase the net system efficiency.

The net specific power and efficiency of the VAST thermodynamic cycles are substantially improved by using one or more embodiments of the Trifluid combustor, direct contact condensor 7500, and direct contact filter as described herein and in the '191 patent application and the Trifluid patent application.

Heat and Mass Exchange System

Economizer

Figure 2:
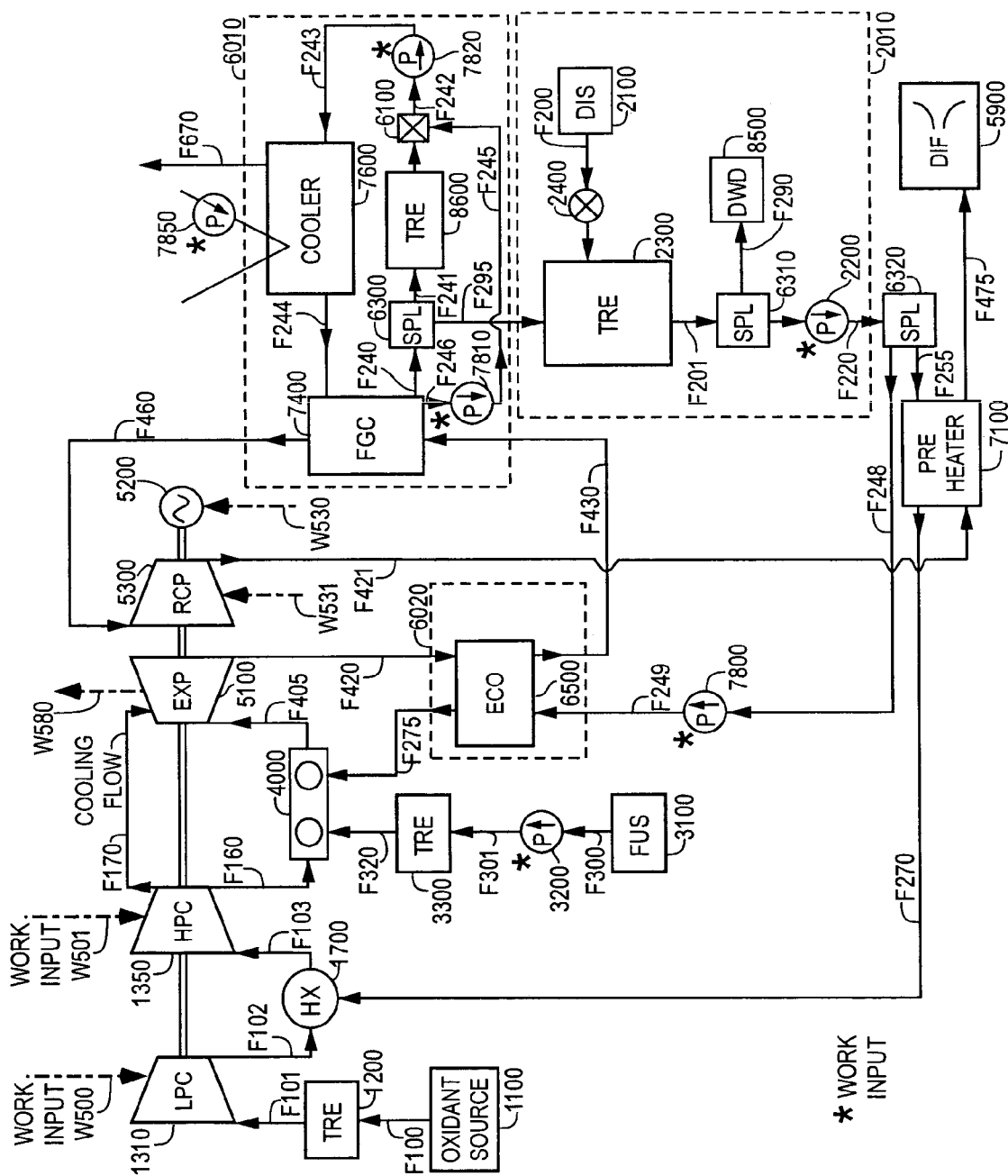
FIG. 2 is a schematic diagram of the VAST Water cycle (VAST-W) with intercooler, surface condenser, recompressor and preheater.

With reference FIG. 2, in some configurations, users preferably provide a heat exchanger an Economizer (ECO) 6500 to heat thermal diluent F249 received from the diluent recovery system 6010 (e.g., via a condensor or preheater 7100) and recover heat from the expanded fluid F420 exhausted from the Expander (EXP) 5100 and before it reaches the condensor or preheater. (See, for example, FIG. 2, FIG. 3, FIG. 4 and FIG. 27.) In VAST cycles, the expanded fluid F420 exiting the Expander 5100 is typically unsaturated. Thus a surface heat exchanger may be used for the Economizer 6500.

In some configurations, users preferably direct only part of the total recycled thermal diluent through the economizer 6500. E.g., With further reference to FIG. 2, they provide a flow Splitter 6320 to split the flow F220 between a portion of the flow F248 going towards the Economizer 6500 versus a portion of the diluent flow F250 that is directed towards the oxidant delivery system 1000. This Splitter 6320 may provide active control over the portion of fluid directed between those flows F248 and F250. They preferably duct some or all of the balance of the diluent to parts of the system requiring or desiring lower temperature fluids to cool fluid flows such as expanded fluid or oxidant containing fluid, and/or heat generating equipment to control equipment temperature and/or to improve efficiency. E.g. users preferably direct a portion of the cooler flows to a direct contactor mixer to entrain diluent spray into the first compressor 1310 as taught in the '191 patent application.

Similarly, users may provide one or more direct contactors as spray intercoolers between one or more lower pressure compressors 1310 and higher pressure compressors 1350 or compressor stages as taught in the '191 patent application. They may similarly provide diluent to cool the pressure vessel surrounding the combustion chamber 4100 in the combustor 4000 as taught in the Trifluid patent application. In the VAST-WS Cycle configuration results shown in FIG. 37 and Table 1, directing part of the diluent flow through the Economizer 6500 and part directly into the Combustor 4000 provided higher thermoeconomic benefits than directing all of the thermal diluent through the economizer to heat it.

TABLE 1

RELATIVE CYCLE CAPITAL COSTS OF POWER CYCLES USING FLUID WATER
$/kW @ 50 MW, TIT = 1300° C., Beta = 30

| Cycle | Combined | STIG | RWI | HAWIT | HAT | VAST-W | VAST-WS |
|---|---|---|---|---|---|---|---|
| Compressors | 138.7 | 107.9 | 112.0 | 100.8 | 100.1 | 89.3 | 79.2 |
| Combustor | 1.6 | 1.5 | 1.4 | 1.1 | 1.1 | 0.8 | 0.9 |
| Gas Expander | 50.3 | 51.4 | 47.7 | 45.1 | 43.9 | 45.8 | 42.1 |

TABLE 1-continued

RELATIVE CYCLE CAPITAL COSTS OF POWER CYCLES USING FLUID WATER
$/kW @ 50 MW, TIT = 1300° C., Beta = 30

| Cycle | Combined | STIG | RWI | HAWIT | HAT | VAST-W | VAST-WS |
|---|---|---|---|---|---|---|---|
| Recuperator | | | 4.3 | 4.2 | 4.4 | | |
| Saturator | | | | 4.3 | 4.5 | | |
| Super Heater | 10.3 | 6.0 | | | | | 3.1 |
| Evaporator | 32.2 | 9.5 | | | | | 6.3 |
| Economiser | 11.4 | 8.3 | 3.8 | 12.3 | 26.7 | 14.9 | 9.8 |
| Steam Expander* | 75.8 | | | 5.5 | | 4.6 | 11.0 |
| Generator | 37.8 | 36.5 | 36.5 | 36.6 | 36.6 | 36.7 | 36.6 |
| Pumps & Auxiliaries | 1.9 | 0.7 | 1.1 | 2.0 | 1.9 | 3.3 | 1.8 |
| Installation Etc. | 327.6 | 201.8 | 188.2 | 192.9 | 199.6 | 177.8 | 173.5 |
| Total $/kW | 687.6 | 423.6 | 395.1 | 404.9 | 418.9 | 373.2 | 364.1 |

*& Condensor, or Condensor & Recompressor; Cost equations per Traverso 2003

In modified configurations, users preferably provide a variable flow splitter 6320 after the diluent recovery system 6010 (e.g., a surface condenser 7400) to direct part or all of the thermal diluent to the downstream Preheater 7100 to recover heat from an expanded fluid F421 being exhausted to the Diffuser 5900 (or exhaust, or stack) that exhausts the expanded fluid F475 to ambient conditions. This splitter 6320 permits adjusting the amount of the thermal diluent flow through the preheater 7100 and thus directly affecting the temperature of the thermal diluent flow F270 exiting the preheater. This also affects the amount of diluent flow F249 through the economizer and thus the temperature of the thermal diluent flow F275 exiting the Economizer 6500.

In some configurations, users preferably operate the energy conversion system with an economizer on the "VAST Water Economizer Cycle" (VAST-W). They preferably pressurize the thermal diluent (e.g., water) to sufficient pressure to deliver the heated diluent F275 downstream of the economizer 6500 to the Combustion System 4000 without vaporizing. E.g., they may use a pump 7800 to pressurize a water diluent flow F248 and deliver a pressurized water flow F249 to the economizer 6500 and consequently form and deliver a pressurized hot water flow F275 to the Combustion System 4000 without the water evaporating to steam before delivery to the combustor. By using a high expansion ratio through the expander 5100 and condensing the expanded fluid F420 users achieve a substantially greater power generated by the expander (turbine) per mass flow compared to conventional cycles. It gives lower Turbine Exit Temperature in the expanded fluid F420 exiting the expander into the Economizer 6500 than in the relevant art.

Figure 37:
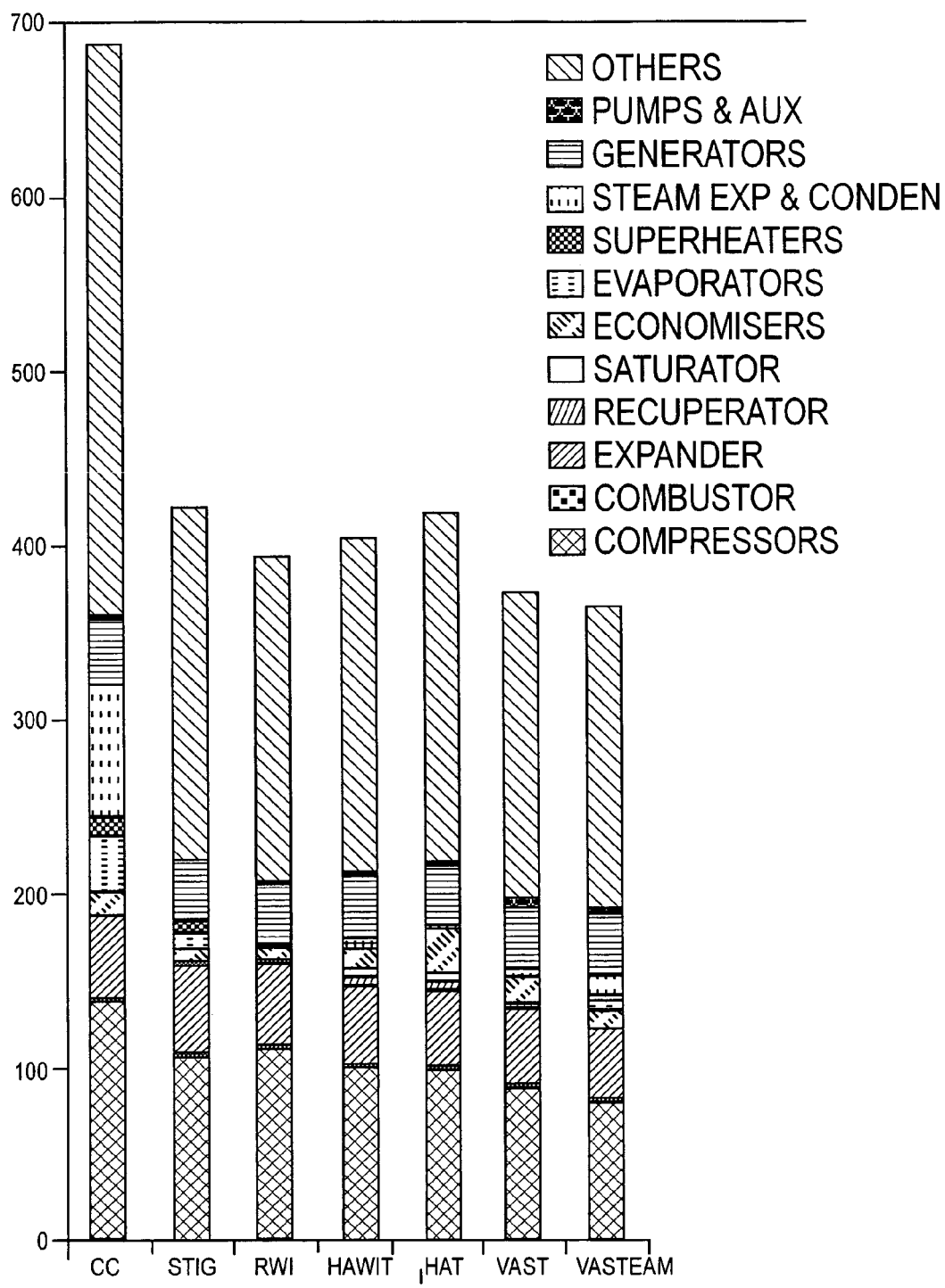
FIG. 37 is a graph showing capital cost comparison of installed VAST-W, VAST-WS and relevant art "wet" cycles.

With the VAST Economizer Cycle, preferably operate near stoichiometric conditions by using a suitable combustor, and by configuring the oxidant delivery system relative to the expander to accommodate the thermal diluent delivered to the combustor without causing surge etc. As shown in FIG. 37 and Table 1, with such VAST-W configurations, users may use a substantially smaller less expensive compressor than relevant art configurations. Similarly the area and cost for the economizer alone in the VAST-W cycle is substantially smaller and less expensive than those of the Combined Cycle, the STIG, HAWIT and HAT cycles shown in Table 1.

Figure 55:
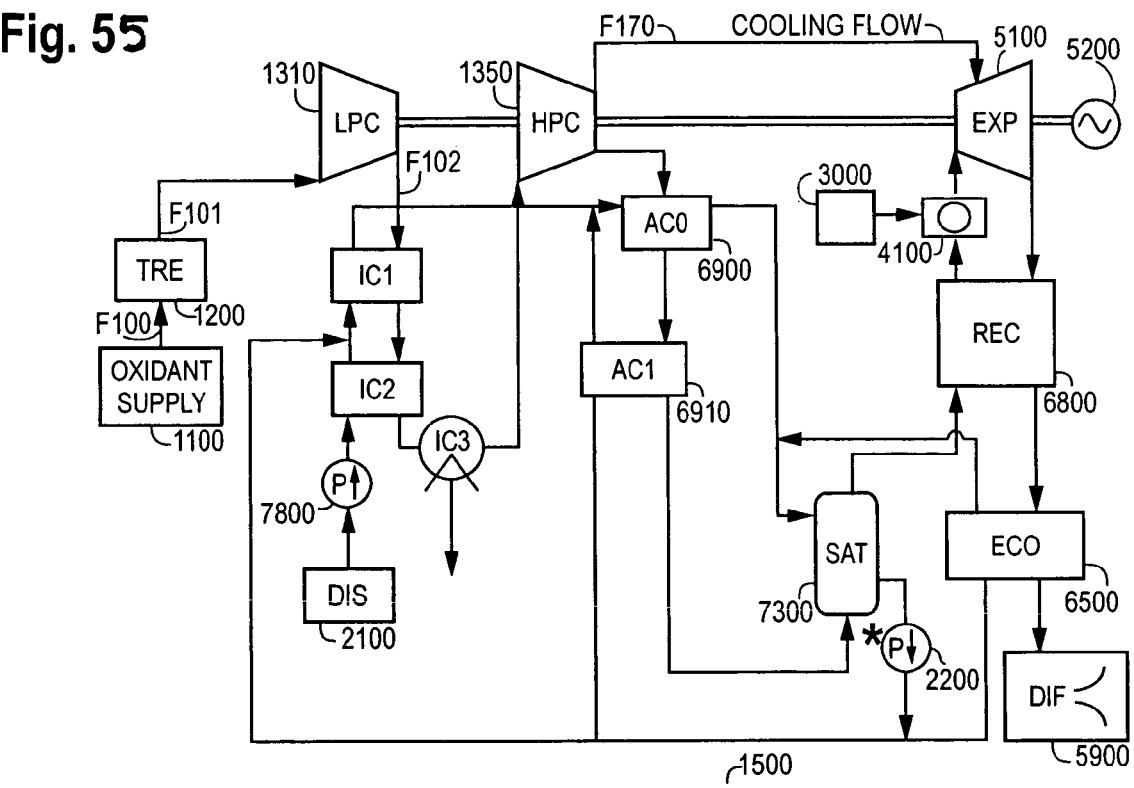
FIG. 55 is a schematic of the intercooled Humid Air Turbine® (HAT®) cycle relevant art.
Figure 56:
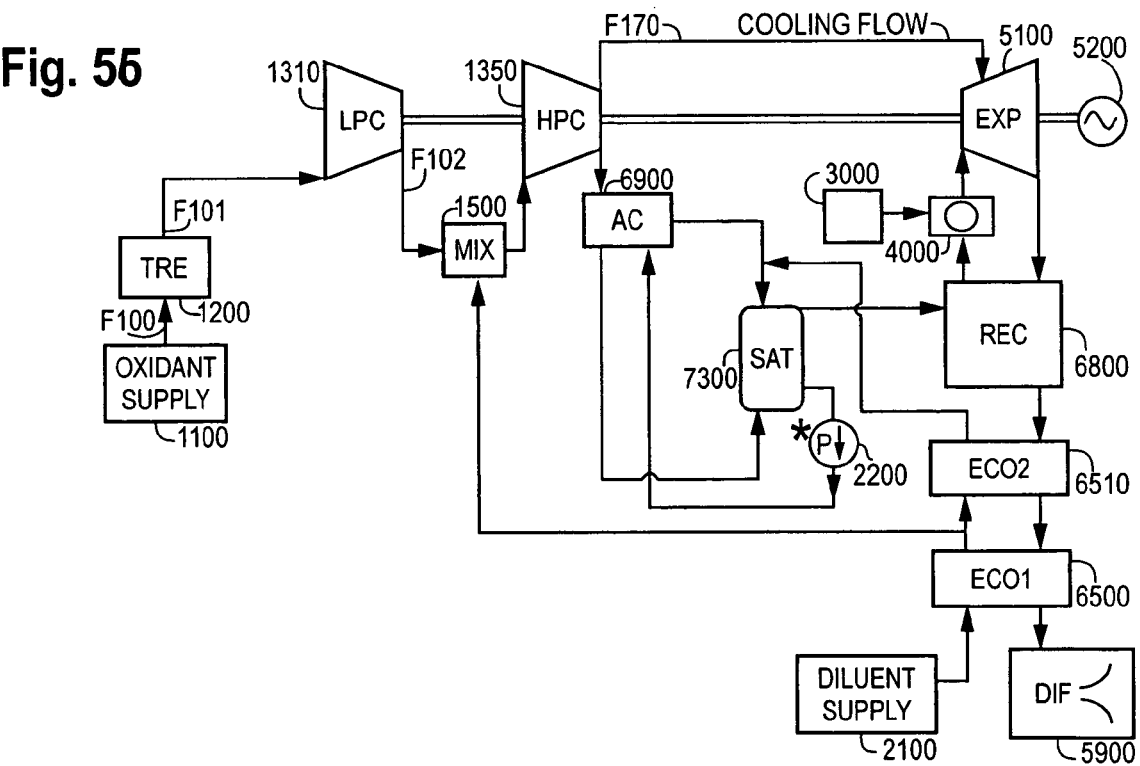
FIG. 56 is a schematic diagram of the intercooled Humid Air Water Injected Turbine (HAWIT) cycle relevant art.

The relative installed capital costs shown in FIG. 37 and Table 1 demonstrate substantial economic advantages of the VAST-W system compared to the relevant art "wet" cycles of the Combined Cycle (CC), Steam Injected Gas Turbine (STIG or equivalent CHENG cycle—FIG. 53), Recuperated Water Injection (RWI—FIG. 54), Humidified Air Turbine® (HAT® or equivalent Evaporated Gas Turbine EvGT cycle—FIG. 55) and Humidified Air Water Injection Turbine (HAWIT—FIG. 56) "wet" cycles. FIG. 37 and Table 1 assume a 50 MW electrical power system with a common 1300° C. Turbine Inlet Temperature operating with a compressor pressure ratio of 30 (i.e., about 30 Bar combustor inlet pressure.) These assume 4000 or 8000 hours operation per year with NO benefit from additional recovery and use of heat such as for district heating or steam. In these cycle comparisons the same component cost equations and proportional installation assumptions are used for each of the cycles based on Traverso and Massardo (2003) and similar to Traverso and Massardo (2002). These assume the mean industrial natural gas and electricity prices in the USA for 2000 (see Table 2).

TABLE 2

| Thermoeconomic Scenario Assumptions | | |
|---|---|---|
| Inflation | 2.5% | |
| Nominal Escalation Rate of Purchased Equipment Cost | 2.5% | |
| Nominal Escalation Rate of Fuel Cost | 3.0% | |
| Construction initial year (1Jan) | 2001 | |
| Construction time | 2 | years |
| Plant Economic Life (Book Life) | 20 | years |
| Plant Life for tax purposes | 10 | years |
| Debts - financing fraction | 50% | |
| Preferred stocks - financing fraction | 15% | |
| Common equities - financing fraction | 35% | |
| Debts - Required annual return | 5.5% | |
| Preferred stocks - Required annual return | 6% | |
| Common equities - Required annual return | 6.5% | |
| Average Income tax rate | 30% | |
| Fuel price (natural gas) | 4.0E−6 | $/kJ |
| Demineralised water price | 0.5 | $/m$^3$ |
| Sale Price of Electric Power | 1.32E−5 | $/kJ |
| Number of Equivalent Operating Hours per Year | 8000 | h |
| Operating and Maintenance Cost | 4% | of FCI |

Figure 38:
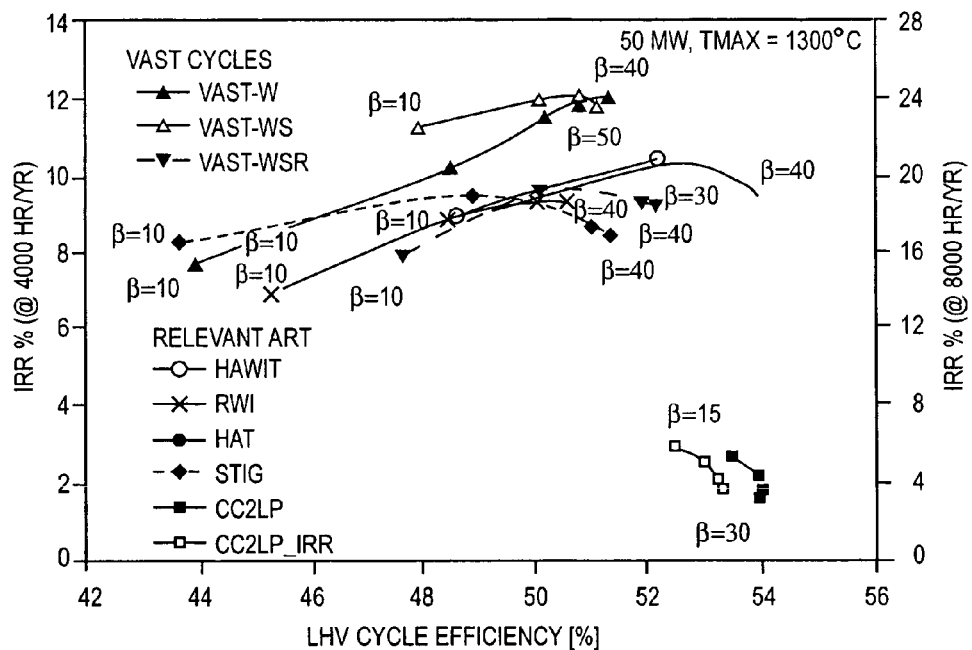
FIG. 38 is a graph showing Internal Rate of Return versus LHV cycle efficiency of VAST-W, VAST WS and relevant art cycles.

With reference to FIG. 38, users achieve higher thermoeconomic benefits using the VAST-W cycle with competitive efficiencies compared to conventional humid cycles. In FIG. 38, the scale on the right refers to base load operation of 8000 hours/year. That on the left refers to part load operation assuming 4000 hours per year. i.e. 50% load. From these configurations, users may competitively operate the VAST-W cycle with pressure ratios Beta greater than 15, preferably greater than 30, and more preferably greater than 40. In the VAST-W Cycle configuration evaluated, the Internal Rate of Return % is substantially higher than the relevant art "wet" cycles over the range of pressure ratios Beta shown, particularly for pressure range Beta in the range of 20 to 30. The Lower Heating Value (LHV) cycle efficiency of the VAST-W cycles shown are competitive with the STIG and HAWIT cycles that showed the closest economic benefits.

Further referring to FIG. 38, the Internal Rate of Return for the VAST-W Cycle is higher than the STIG cycle at all pressure ratios above about 15 for the assumed mean industrial fuel and electricity prices in the USA 2000. Further refinement and reducing the water delivery pressure from the 165 Bar assumed in the VAST-W configuration is expected to further improve these benefits. Note that the VAST-W configuration shows superior returns compared to the two pressure level Combined Cycle configurations at this power, particularly at part load operations. The Combined Cycle configurations with higher efficiency where adjusted to seek the highest efficiency while those with lower efficiency and higher IRR were adjusted to seek the highest life cycle economic returns. The VAST-W and other cycles shown were adjusted to seek the highest efficiency at the given pressure ratio. Modified configurations may further improve the returns for these cycles.

Evaporator (Boiler)

VAST Steam Cycle (VAST-WS)

Figure 3:
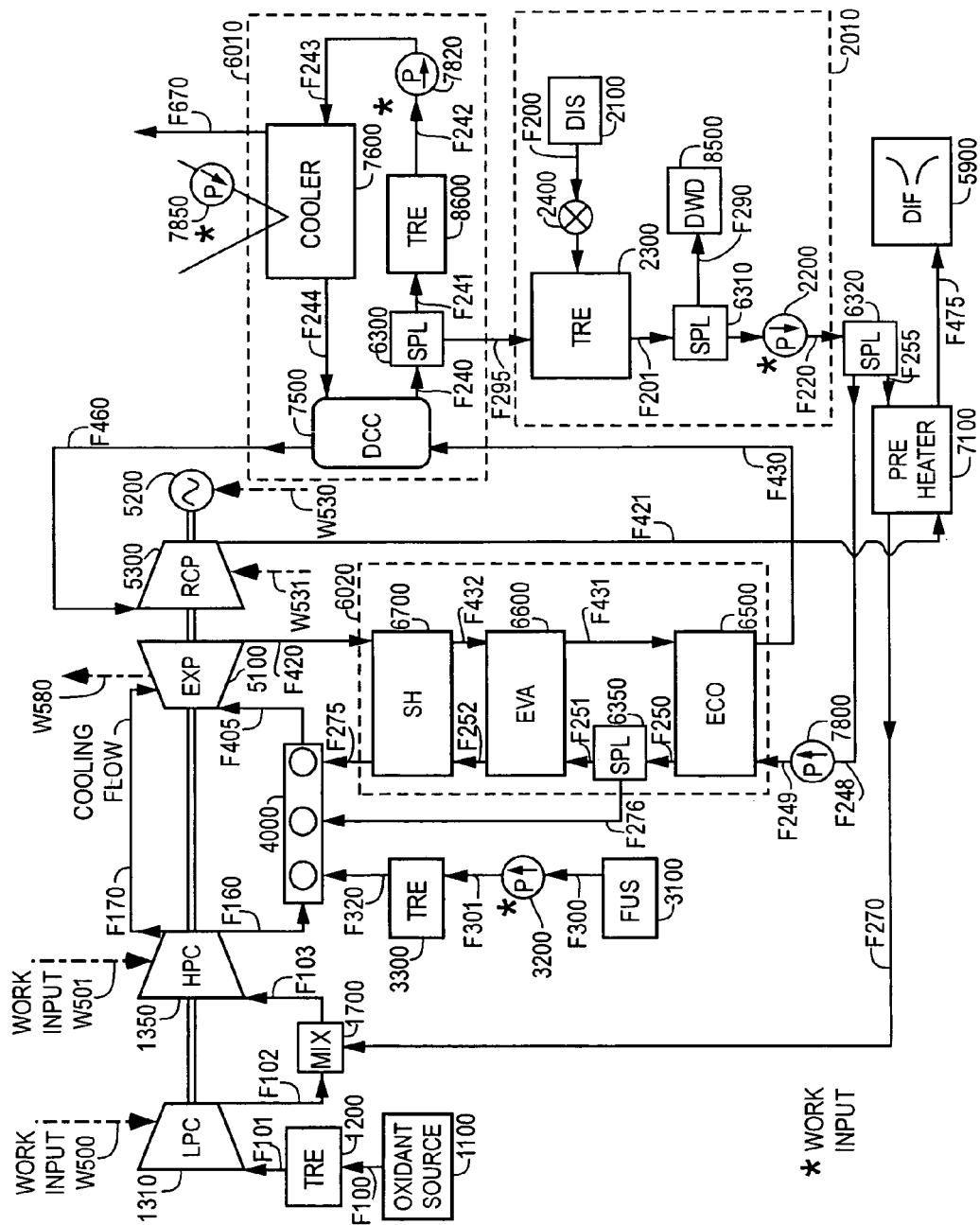
FIG. 3 is a schematic diagram of the VAST Water and Steam Cycle (VAST-WS or VASTEAM) with an intercooler, direct contact condenser, recompressor and preheater.

With reference to FIG. 3 (relative to FIG. 2) in some embodiments, users preferably utilize heat exchangers designed to boil diluent to form a vapor diluent while recovering heat from the expanded fluid. Some heat exchangers operable to boil diluent may be particularly configured as a separate Evaporator (EVA) 6600 to evaporate the thermal diluent F251 while recovering exhaust heat from the expanded fluid F420 exiting the expander 5100. This Evaporator 6600 is placed upstream of the Economizer 6500 relative to the expanded energetic fluid exiting the expander, (or downstream relative to the diluent fluid F250 leaving the economizer.)

Figure 44:
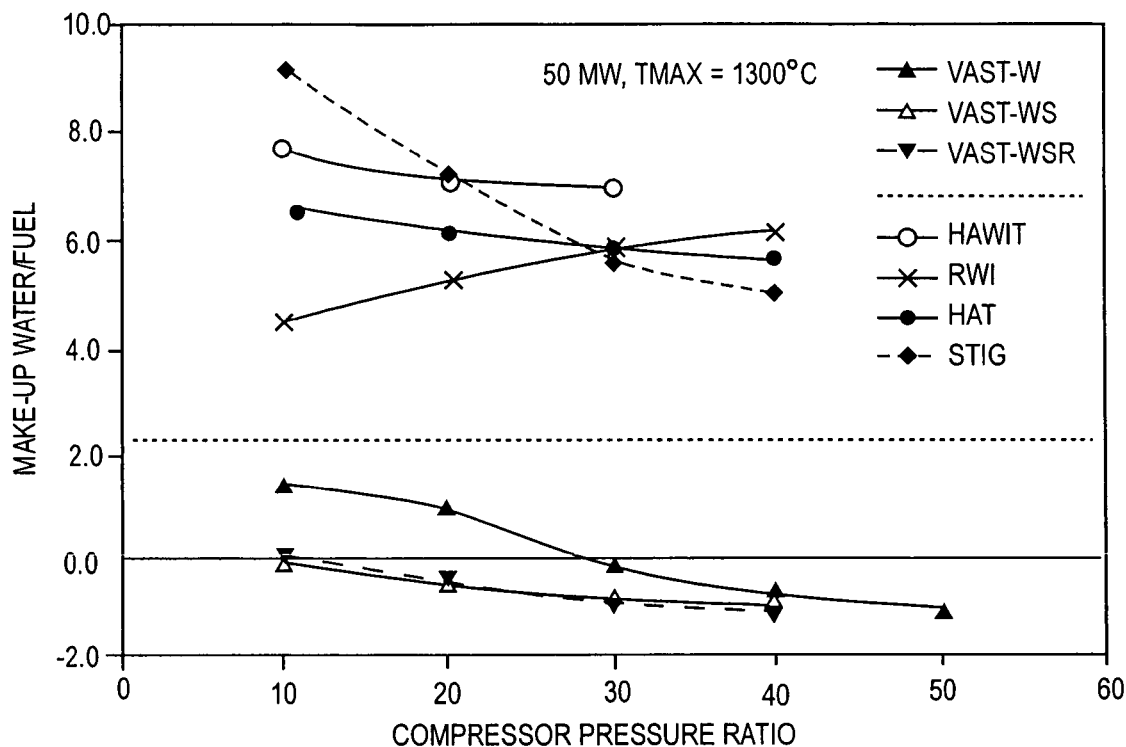
FIG. 44 is a graph showing compressor Make Up Water to Fuel ratio versus Pressure Ratio Beta for VAST and relevant art cycles at 50 MW, TIT=1300° C., 1.05 Lambda.

With further reference to FIG. 3, users may configure the heat exchangers to provide a separate Superheater (SH) 6700 to superheat the diluent vapor F252 formed in the evaporator 6600 and form a superheated diluent F275. This Superheater 6700 is preferably positioned upstream of the Evaporator 6600 relative to the expanded energetic fluid flow F420 exiting the expander 5100. In this configuration, superheated vapor diluent F275, saturated vapor diluent F252 and hot liquid diluent F251 are formed in recovering heat from the expanded fluid F420. These are preferably delivered to the combustor and/or used for other heat applications. E.g., with reference to FIG. 3, users preferably configure a VAST Steam Cycle (VAST-S) by boiling diluent (e.g., water) while recovering heat from the expanded fluid F420 downstream of the turbine 5100, and thereby forming two or more of hot water F251, saturated steam F252, and optionally superheated steam F275. Referring to FIG. 44, in some configurations users may adjust the compressor pressure ratio Beta to adjust the portion of liquid diluent to vaporized diluent formed.

In some configurations, users preferably deliver only part of the thermal diluent heated by the Economizer 6500 through the Evaporator 6600. With further reference to FIG. 3, users preferably provide at least portion of the thermal diluent as liquid diluent to the Combustor. They preferably provide at least a portion of the evaporated thermal diluent to the combustor. This improves the thermoeconomics of heat recovery and the efficiency of the system.

With reference to FIG. 29, in modified configurations, users preferably provide a variable flow splitter 6350 to control the diluent flow between the Economizer (ECO) 6500 and the Evaporator (EVA) 6600 to control the portion of diluent directed to the Evaporator compared to other locations. E.g. users preferably use the splitter 6350 to control the portion of liquid diluent going from the economizer 6500 to the Combustion System 4000 versus to the evaporator 6600. This permits adjusting the amount of the thermal diluent flow through the evaporator and thus the amount of vapor formed as well as the temperature of the flow heated diluent exiting the economizer. Users preferably control this ratio to control the temperature of the fluid exiting the economizer to be a few degrees below the boiling point. E.g. a differential temperature of 3° C. below the boiling point was assumed for the temperature of the heated liquid diluent exiting the economizer. This indirectly affects the temperature of the expanded fluid F420 exiting the economizer.

Superheater (Gas-gas Heat Exchanger)

In modified embodiments, users preferably configure a heat exchanger operable to form superheated diluent while recovering heat from expanded fluid exiting the expander 5100. For example, referring to FIG. 3, users may add a Superheater (SH) 6700 upstream of the economizer 6600 (and evaporator 6500) to heat the evaporated thermal diluent vapor F252 while recovering higher temperature heat from the expanded energetic fluid F420 exiting the expander 5100. The VAST Steam Cycle (VAST-WS) preferably includes both an Evaporator (EV) 6600 and Superheater (SH) 6500.

Heated Diluent to User Applications

With reference to FIG. 29, in some configurations the heat recovery system used in VAST-WS shown in FIG. 3 is preferably modified to include a variable flow splitter 6360 between the Evaporator 6600 and Superheater 6700. This may be used to direct part or all of the diluent vapor flow F252 (e.g., saturated steam) to a thermal application (such as heating or cooling), and to direct the remaining flow of evaporated diluent to the Superheater 6700. This flow splitter 6360 permits adjusting the amount of the vapor flow through the Superheater 6700. Users may use this flow splitter to control the temperature of the superheated thermal diluent flowing from the superheater.

With reference to FIG. 28, the VAST-S cycle shown in FIG. 3 may be modified by adding one or more splitter valves to optionally or selectively supply one or more of warm diluent, hot warm diluent, saturated steam and/or superheated steam to the Heat and Mass Transfer System 6000 for other internal or external heat applications. E.g. a splitter valve 6310 may be configured between the Diluent treatment system (DTS) 2010 and the Economizer (ECO) 6500 to deliver warm water to a warm water use; a splitter valve 6340 may be configured between the Economizer (ECO) 6500 and the Evaporator (EVA) 6600 to divert a portion of hot diluent fluid flow to a hot water use; a splitter valve 6360 may be configured between the Evaporator (EVA) 6600 and the Super Heater (SH) 6700 to deliver evaporated diluent to a steam use; and a splitter 6370 may be configured between the Super Heater (SH) 6700 and the Combustion System 4000 to deliver superheated diluent to a super heated steam use.

With reference to FIG. 1, one or more of these diluent flows is preferably used within the energy conversion system for cooling heated or heat generating components as desired. For example, cooling one or both of the combustor and the expander. With reference to FIG. 28, one or more of these flows may similarly be used outside the energy-conversion system for other user applications of warm water, hot water, saturated steam, or supersaturated steam.

With further reference to FIG. 28, to provide control over providing heated diluent flows to user applications while controlling the combustion process, users preferably provide a flow splitter valve 6320 before the heat exchanger where heated fluid is desired to direct cooler diluent to the combustor to control the combustion process while still recovering sufficient heat to provide the user desired heat flows. Where warm water is also desired, this splitter valve 6320 or a similar splitter valve may be positioned further downstream (with respect to the expanded fluid) nearer the cooler portions of the diluent recovery system (DRS) 6010. The liquid diluent flows with differing temperatures may be merged as shown with a mixer 6190 and directed into the combustor together as shown in FIG. 28. They could also be directed into the combustor in multiple streams according to control desired over thermal gradients.

Such control measures permit users to utilize some or all of the heat recoverable from the expanded fluid. The flow of diluent into the combustor is adjusted accordingly to account for the difference in temperature of the diluent. Users preferably use this in conjunction with a VAST combustor operable to accommodate diluent temperatures from very hot to cold according to the users heat provided.

One or more desuperheaters with or without attemperators may be employed to reduce at least one parameter of pressure or temperature where downstream users (e.g., District Heating) desire or require reduced pressure or temperature or both. Thermal diluent from within the Cycle and external sources (e.g., returned fluid from District Heating) can be used as the source of attemperating water Recuperator (Gas-gas Heat Exchanger)

Figure 4:
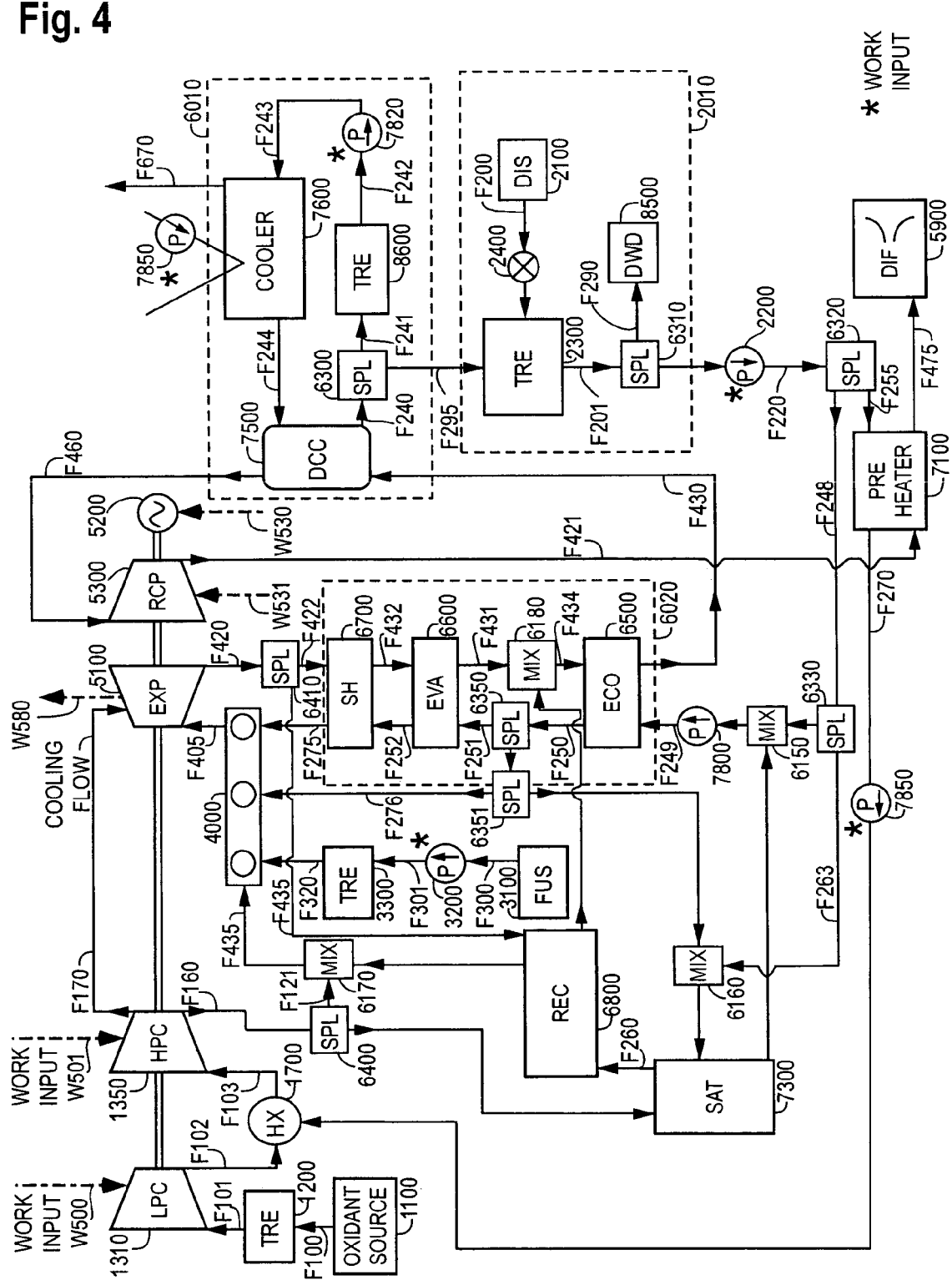
FIG. 4 is a schematic diagram of the VAST Recuperated Steam cycle (VAST-WSR) like FIG. 3 with a humidifier and recuperator.

With reference to FIG. 4, users may modify the VAST-WS cycle (such as shown in FIG. 3) by adding a Recuperator (REC) 6800 to recover heat from the expanded fluid into the oxygen containing fluid being provided to the Combustor 4000. This modification is further shown in FIG. 32. For example, a splitter 6410 may be provided to direct the hot expanded fluid into two streams. One hot expanded fluid stream F422 is used through one or more heat exchangers to recover heat into diluent to evaporate and superheat diluent-containing fluid. (e.g. one or more superheaters, and evaporators as shown in FIG. 4). The other hot expanded fluid stream F435 is directed through the Recuperator (REC) 6800 to heat incoming oxidant-containing fluid F160 from the oxidant delivery system (e.g., from compressor 1350) before delivering the heated oxidant containing fluid F435 to the combustor 4000.

With further reference to FIG. 4 the two cooled expanded fluid streams from the Recuperator 6800 and Evaporator 6600 may be combined in a Mixer 6180 and directed through an Economizer 6500 to recover further heat from the combined partially cooled fluid stream and heat diluent-containing fluid. (e.g. to heat water). The Economizer 6500 recovers heat from the re-combined expanded stream to heat the diluent-containing fluid. The heated diluent stream exiting the economizer is preferably directed through a Splitter 6350 to apportion diluent flow between the Evaporator 6600 and other applications.

The diluent flow diverted by the Splitter 6350 is preferably directed through another Splitter 6351 to direct some diluent flow to be mixed with oxidant containing fluid upstream of the Recuperator 6800. The other portion of the flow from Splitter 6351 is shown in this embodiment as being delivered to the Combustor 4000.

Figure 33:
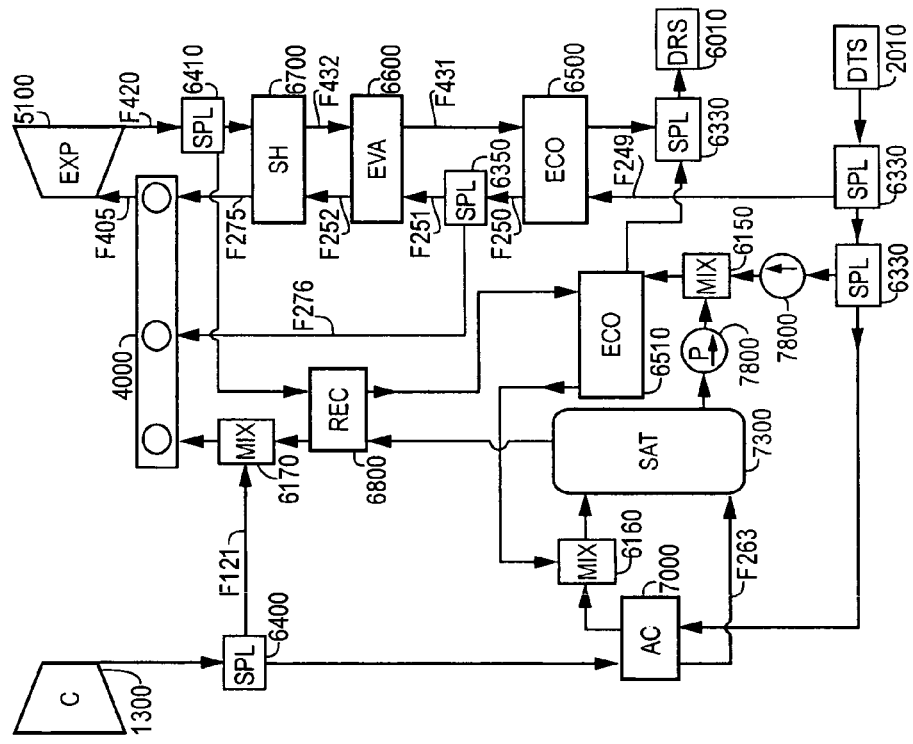
FIG. 33 is a schematic diagram of the heat and mass transfer system using a recuperator, aftercooler, humidifier, two economizers, evaporator and superheater.

With further reference to FIG. 4 and FIG. 33, this liquid diluent-containing fluid may also be mixed with additional diluent-containing fluid used to after-cool the oxidant-containing fluid leaving the last compression stage, and this combined diluent-containing fluid is passed to the humidifier or "saturator". This humidifier or saturator may be a packed bed contactor. User preferably configures a direct contactor to distribute vaporizable diluent into the compressed oxidant containing fluid. E.g. spraying water through streamlined direct contactors. This may reduce the volume required and the pressure drop across the humidifier.

With reference to FIG. 33, in a modification of the recuperated VAST cycle embodiment described above, a second economizer 6510 may used to recover heat from the second expanded fluid stream downstream of the recuperator 6800 and heat liquid diluent being delivered to the humidifier or saturator.

In some embodiments, users provide direct contactors to deliver thermal diluent into the compressed oxidant containing fluid being delivered into a recuperator to assist recovery of heat from the expanded fluid downstream of the turbine expander. Users preferably deliver liquid diluent into the compressed fluid stream to increase the specific heat capacity of the compressed fluid, thereby improving surface heat transfer, and reducing the recuperator size and cost.

Preheater

In some embodiments, users may utilize a preheater 7100 to preheat the thermal diluent to moderate temperatures (e.g., water) from lower temperature diluent and recover heat from the cooled expanded fluid (or "flue gas") that is heated by the recompressor 5300 before it is discharged to ambient conditions. (See, for example, FIG. 02, FIG. 03, and FIG. 04). In some configurations, the contribution of the preheater may be relatively small, and users may form one or more of the VAST-W, VAST-WS and VAST-WSR cycles without it.

In modified configurations, users preferably direct only part of the total recovered diluent through the preheater 7100. They preferably duct some or all of the balance of the recovered thermal diluent to parts of the system requiring or desiring lower temperature fluids to cool flows or equipment and to improve efficiency. (See, for example, FIG. 02, FIG. 03, and FIG. 04 where a portion F270 of the flow is directed to the oxidant delivery system to cool the compressed oxidant flow.

E.g. users preferably direct a portion of the cooler flows to a spray entrainer into the compressor, or a spray intercooler between the low and high pressure compressor and/or to cool pressure vessel. In some configurations, directing part of the flow through the preheater provided higher thermoeconomic benefits than directing all of the thermal diluent through the preheater to heat it. Thus, users preferably provide lower temperature thermal diluent F248 to the economizer 6500 than to flows F270 to intercool the compressor to improve the cycle efficiency.

In other configurations, users preferably replace the recuperator in a heating or power system by an economizer in some configurations. They preferably include a recompressor. One or both of these measures substantially reduce the temperature of the expanded fluid exiting the expander. These measures very substantially reduce the operating temperatures of the heat recovery equipment and the associated costs. In some configurations, users preferably include an evaporator and superheater.

One or more of these measures significantly increase the thermodynamic efficiency of a heating or power generation system. For example, in conventional microturbines, recuperators are often provided to increase the system efficiency from about 23% for a simple cycle to about 30% to 31% for a recuperated microturbine at about 80 kW to about 100 kW. A VAST Cycle improves the efficiency to about three percentage points or about 10% to about 33% assuming an 80% combined efficiency for generator, power converter and bearings.

Similarly, with improved power electronics, the VAST-W Economizer and VAST-WS Steam cycles improve system efficiency by about 3 to 4 percentage points or about 10% improvement in efficiency. This assumes about a generator efficiency of about. 98%, a variable frequency power conversion electronics efficiency of about 95%, and about 93%-95% efficiency for bearings and other components. E.g., these give about 32.5% to about 35.7% efficiency (LHV) for the VAST Economizer and VAST Steam cycles at about 100 kW.

These efficiencies improve significantly with Turbine Inlet Temperature E.g. for a 100 kW VAST microturbine system with only an economizer, is expected to show efficiencies of about 32.5% at 950° C. these rise with Turbine Inlet Temperature to about 33.8% at 1000 C., about 36.1% at 1200° C. and about 36.9% at 1200° C.

These configurations of heat recovery methods similarly reduce the costs of a thermodynamic system. For example, in microturbine systems, the recuperator alone often costs about as much or more than the compressor and turbine combined e.g., at about 200 kW and smaller. Furthermore, high temperature recuperators cause a major portion of the repairs and maintenance (reportedly about 80% in some systems.) By preferably replacing the recuperator with an evaporator, using higher pressures and expansion, users reduce the costs of the micro-turbine power system by about 20% to about 25%.

Such combinations of improving efficiency and reducing costs significantly improve the capital cost per preferably provide one or more of the following condensors and achieve the corresponding parameters and benefits.

The expanded cooled fluid F460 is preferably directed through the condensor against cool thermal diluent. Both the condensed diluent-containing fluid and the liquid diluent-containing fluid used to cool and condensed diluent-containing fluid from the cooled expanded fluid may be recovered.

With reference to FIG. 34, a counter-flow configuration for a surface heat exchanger 7400 is preferably selected. This provides benefits of lower temperature and pressure in the condensed flow, while obtaining higher recovered coolant or diluent temperatures. In addition to condensing the diluent, the surface heat exchanger is preferably configured to recover some heat from the incoming expanded fluid. Some of the heat is thus recovered in the coolant flow. Diluent is preferably used as the coolant flow. E.g., high purity water. In modified embodiments users may provide cross or co-flow configurations.

The condensed diluent is pumped up from the low pressure of the expanded cooled fluid in the condensor to the desired return pressure. A barometric leg may be added and the pump placed at the bottom of the leg to reduce or avoid cavitation.

The hottest portion of condensate from the condensor is preferably recycled to the heat and mass transfer system with a flow about equal to the amount of diluent-containing fluid delivered upstream of the exit of the expander and directed from the heat exchangers to various user heat applications. This warm diluent flow is treated and redirected back towards the compressor 1300, combustor 4000 and expander 5100, through one or the heat exchangers to again recover heat as desired. Sufficient warm diluent or coolant fluid is collected from the coolest part of the surface heat exchanger 7400 and circulated around the cooling cycle.

Combustion with oxygen or oxygen enriched air eliminates some or substantially all nitrogen and other non-condensable gaseous thermal diluents in some embodiments. Reducing or removing nitrogen and other diluents in air in some embodiments similarly reduces the energy, equipment, and costs of separating out the carbon dioxide formed by combustion from the cooled expanded fluid.

With reference to FIG. 35, users preferably use distributed direct contact condensors 7500 in some embodiments. This reduces the approach temperature difference between the expanded fluid and the coolant and cools the expanded fluid to a lower temperature. Both these measures increases the power cycle's thermal efficiency compared to using conventional heat exchangers. Use of direct contact condensers is expected to reduce the cost of diluent recovery, thus improving the thermo-economics of the power cycle.

Users more preferably use direct contactors in forming the direct contact condensers as taught in the '191 patent application, with particular reference to FIG. 83. This reduces the pressure drop in the expanded fluid across the condensor. A vertical counter flow configuration as shown in FIG. 83 of the '191 patent application further provides recovery of heated diluent up to the saturation temperature of the entering expanded fluid flow.

These cooling methods condense a major portion of the steam and water vapor in the expanded and cooled energetic fluid. This leaves nitrogen and carbon dioxide and a small portion of oxygen and water vapor in the condensed expanded fluid. By eliminating almost all excess air in combustion, and then condensing and removing the water formed and injected, these embodiments probably create the highest concentration of carbon dioxide in the cooled exhaust gas of all conventional technology that does not use oxygen enriched air or oxygen for combustion. (See, for example, Table 3.)

TABLE 3

Residual Oxygen and Carbon Dioxide versus Inlet Air

| Inlet Air | Exhaust Non-condensable Residual Gas Concentrations - Dry | | | |
|---|---|---|---|---|
| % of Stoichiometric | $O_2$ mol % (vol %) | $CO_2$ mol % | $O_2$ mass % | $CO_2$ mass % |
| 334% | 15.00% | 4.26% | 16.39% | 6.40% |
| 300% | 14.31% | 4.74% | 15.61% | 7.11% |
| 250% | 12.94% | 5.70% | 14.07% | 8.52% |
| 200% | 10.87% | 7.15% | 11.75% | 10.64% |
| 150% | 7.34% | 9.63% | 7.87% | 14.20% |
| 110% | 2.04% | 13.34% | 2.16% | 19.42% |
| 105% | 1.07% | 14.02% | 1.13% | 20.36% |
| 100% | 0% | 14.77% | 0% | 21.40% |

For example, combusting diesel fuel with 110% of stoichiometric oxidant in the oxidant containing fluid, (e.g., oxygen in compressed air) the resulting carbon dioxide ($CO_2$) forms about 13.34% of the non-condensables by volume in the condensed expanded fluid (dry basis excluding water vapor, assuming Diesel #2 can be represented by C12H26—or 19.42% by mass.) This compares with about 4.26% carbon dioxide by volume (6.40% by mass) using lean combustion with intake air at about 334% of stoichiometric air, where oxygen forms about 15% by volume of the residual non-condensable gases on a dry basis (about 16.39% by mass.)

In some embodiments, users then compress and separate the remaining carbon dioxide. The higher concentration of carbon dioxide in the cooled expanded fluid results in significantly lower energy use and costs to separate out the carbon dioxide compared to conventional processes. For example, with the Diesel #2 combustion in about 110% of stoichiometric air, users obtain about 303% of the concentration of carbon monoxide by mass obtained by conventional lean combustion systems operating with about 334% of stoichiometric air. Users thus use about 67% less pumping power etc. in recovering this high carbon dioxide concentration.

Filtering and absorptive processes are preferably used to remove contaminants from the cooled expanded fluid. Some embodiments utilize compression and condensation to separate and recover the carbon dioxide. Other embodiments utilize pressure swing absorption or vacuum pressure swing absorption using absorptive materials and methods preferably configured to carbon dioxide. Some applications use chemical absorption processes using amines or other absorptive materials. Other embodiments use physical, electrochemical or conductive membrane separation methods to recover the carbon dioxide.

Hot Water—District Heating

In addition to shaft power and/or electricity, users preferably provide equipment to provide heated thermal diluent, thermal diluent vapor, and/or superheated thermal diluent vapor, in some configurations. With reference to FIG. 28 for example, hot water, and/or low or high pressure steam may be produced in an economizer and/or through a steam generation system. Similarly, with reference to FIG. 34, hot water may be produced in the process of condensing liquid diluent-containing fluid from the expanded fluid in a surface condenser. This may be delivered to a hot water or "District Heating" application. E.g., nominally at 80° C. supply and 40° C. return. Warm or hot water may similarly be recovered through a direct contact condenser as shown in FIG. 35 and FIG. 36. Users may select a surface or direct contact condensor according to the degree of heat recovery desired from the energetic fluid before directing the flow to one or more of the economizer and oxidant delivery system and District Heating or other heat application.

Figure 45:
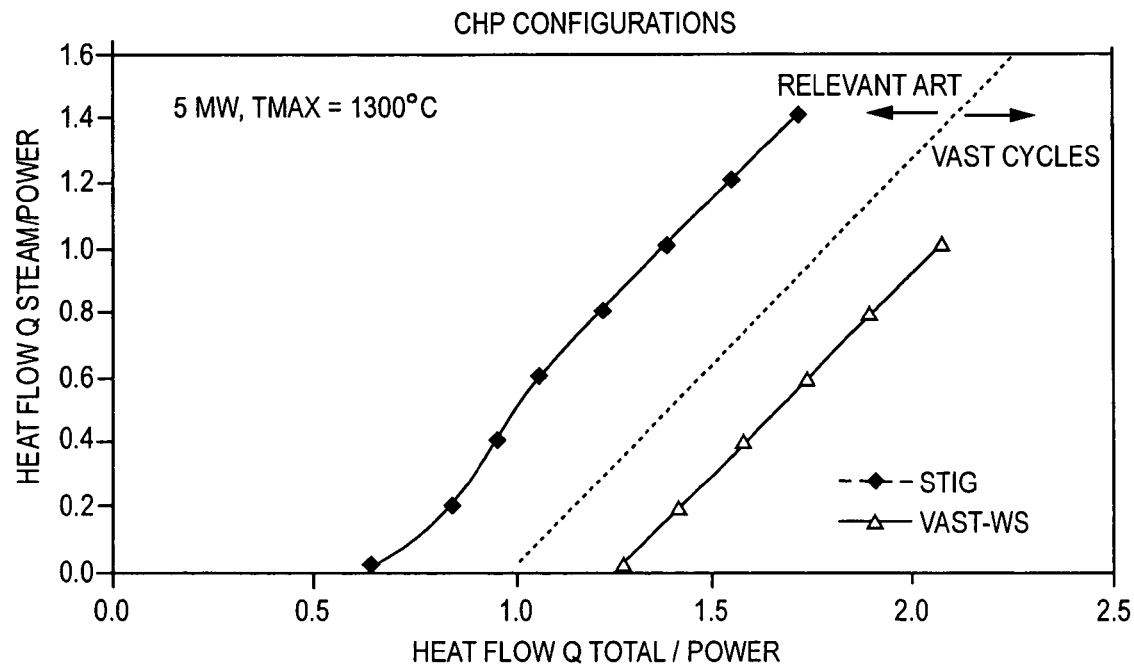
FIG. 45 is a graph showing Steam demand "Q" to Net Power ratio versus Total Heat Demand "Q" to Net Power ratio for VAST and STIG cycles at 5 MW, TIT=1000° C.
Figure 46:
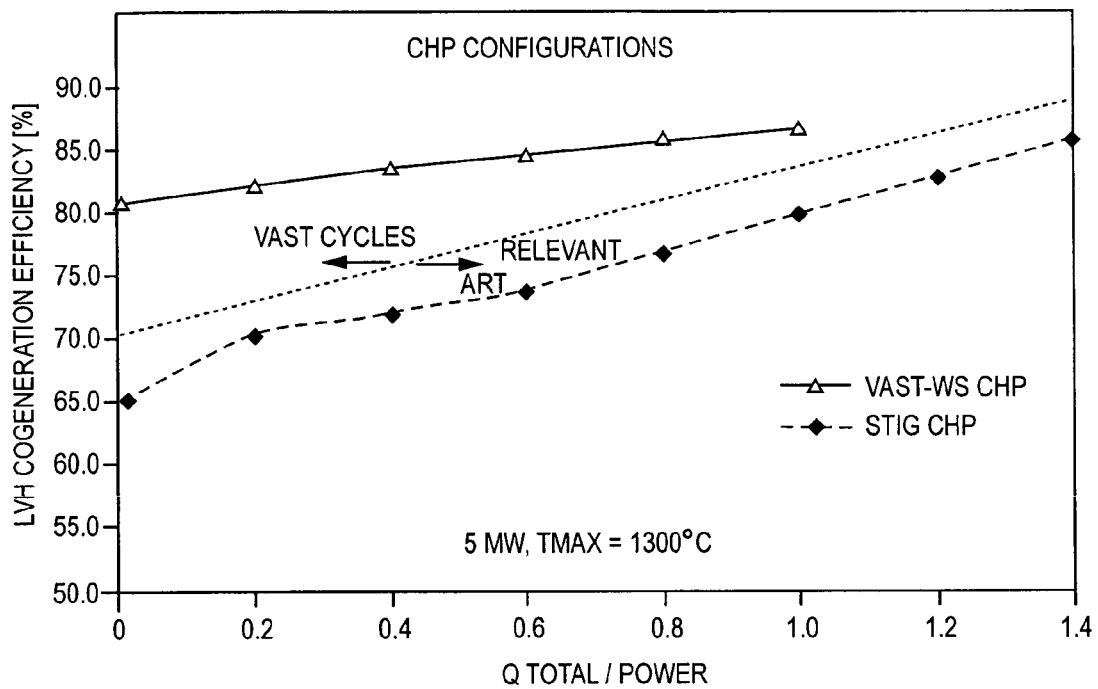
FIG. 46 is a graph showing LHV Cogeneration efficiency versus Total Heat Demand "Q" to Net Power ratio of VAST-W, VAST-WS and the STIG relevant art cycle at 5 MW and TIT=1000° C.

With reference to FIG. 28, users preferably configure and/or control the portion of thermal diluent flowing to or bypassing one or more of the surface condenser, the preheater, the economizer, the evaporator and/or the superheater to adjust the flows and temperatures as desired or specified for heat use applications or cooling flows. With reference to FIG. 45 (see also FIG. 46), by such measures, users may adjust the ratio of lower temperature heat "Q" to Net Power and the ratio of Steam to Net Power across a wide range.

With further reference to FIG. 45, for the same Steam heat flow Q Steam, the VAST Steam Cycles provide substantially higher Total Heat Q to Net Power than relevant art STIG cycles. E.g. about 1.1 to 1.3 heat/power for VAST compared to about 0.6 to 0.4 for STIG cycles for ratios of Steam/Power from about 0 to 1.0. These results are modeled for a 5 MW industrial steam turbine operating at about 100° C. Here the STIG Cycle is modeled to give the maximum possible steam with the compressor maximum flow adjusted accordingly. The VAST Steam cycle is assumed to operate at a relative air/fuel ratio Lambda of 1.05. These higher ratios of heat/power are significantly closer to the requirements a large portion of commercial and light industrial applications.

When District Heating is desired or required, users may select one of the VAST Water or VAST Steam Cycles according to the amount of steam also required. Users preferably configure one or more of the preheater and economizer and/or the relative flows thorough those components to adjust the temperature and amount of hot water delivered to District Heating in some configurations. (See, for example, FIG. 28, FIG. 36, and/or FIG. 45)

In District Heating applications using hot water, after the hot water is cooled, it is preferably returned to the energy conversion system. Some water is commonly lost in the District Heating system. In some embodiments, users recover excess water from the expanded fluid and use this to provide makeup water for the District Heating. This earns an value equivalent to the avoided cost of providing makeup water. In some modified embodiments, a regenerative heat exchanger may be used to recover residual heat from the returned fluid, thereby recovering heat and adding heat to the VAST Cycle, such as in heating the diluent.

Steam for other Applications

Users preferably use the VAST Steam Cycles when low pressure steam is desired or needed. With the VAST Steam Cycle, users preferably configure one or more of the preheater, economizer, evaporator and/or the relative flows thorough those components to adjust the temperature and amount of low pressure steam hot generated and/or the amount of hot water to District Heating in some configurations. (See, for example, FIG. 28 and FIG. 45)

Refrigeration Apparatus

Users preferably use the VAST Steam Cycles when high pressure steam is desired or needed. With the VAST Steam Cycle, users preferably configure one or more of the preheater 7100, economizer 6500, evaporator 6600 and superheater 6700, and/or the relative flows thorough those components to adjust the temperature and amount of high pressure steam delivered as desired or configured. They also configure the system to provide hot water and/or low pressure steam as desired or needed in some configurations. (See, for example, FIG. 28 and FIG. 45)

In some configurations, users provide cold storage systems. E.g., cold water tanks, ice storage, and/or cold rock storage. Users preferably operate the cooling equipment during off peak hours to cool a coolant fluid and use that to cool the cold storage system. E.g. cold water, cold air, or refrigerant.

Where there are substantial fluctuations in demand for cold services and/or mechanical or electric power, users modify a VAST Cycle configuration to preferably provide means to draw from the cold storage and deliver cooling service as desired. In some configurations, users preferably use the cool storage to cool the intake oxidant containing fluid. This helps increase the density of the intake air and compressor capacity, especially on hot days.

Power Boost

Users preferably provide diluent to cool the combustion and/or energetic fluid in the combustor prior to the expander. By such means, they increase the amount of fuel and oxidant that can be combusted and the power capacity of the system. They preferably maintain the temperature of the energetic gases while so doing.

This capability of the VAST Cycles to change or boost power while maintaining temperature provides particular benefits compared to conventional relevant art lean combustion systems using excess air as the thermal diluent. In those systems, combusting additional fuel increases the temperature of the energetic gas exiting the combustor, thereby increasing the damage rate to turbine blades and other hot section components. With VAST Cycles, users preferably control the temperature independently of the fuel flow and power levels.

Under some conditions, users preferably increase temperature of the energetic fluid at the combustor exit to increase the power generation capacity of the turbine and/or the efficiency of the turbine. E.g., under emergency power demand conditions. By the improved temperature control methods described in the '191 patent application and the Trifluid patent application, users preferably precisely control the exit temperature and duration of such temperature increases. These are carefully monitored relative to the degradation rate of the turbine blades.

Given the flexibility of the VAST Cycle, users preferably adjust the cooling flows and coolant temperatures of the steam and/or water coolant flows to the turbine blades to increase blade cooling when and as the temperature of the energetic fluid is increased in some configurations. This cools the turbine blades more than in conventional relevant art, reducing the damage rate of high temperature operation. Users thus reduce blade replacement frequency and improve system life cycle costs compared to conventional relevant art.

Flow Controls

Users preferably provide actuators and controls to adjust the flow ratio in one or more of the preheater, economizer and evaporator splitter valves to adjust these flows as desired or needed in some configurations. Users preferably provide dynamic actuators, controls and sensors to dynamically control the relative portions of hot water, low pressure steam, high pressure steam and power as desired by the application with time or as processes vary etc. e.g., these may use electrical, hydraulic, pneumatic, or mechanical actuators.

In some embodiments, users provide multiple recycled thermal diluent flows and heat these to multiple temperatures by recovering heat from the expanded fluid. E.g. users preferably provide cool water to cool liquid fuel-delivery systems to prevent coking. Complementarily, users provide hot water and/or steam into the combustor to control combustion temperature profiles to constrain NOx emissions while oxidizing most carbon monoxide and other combustable components and achieve desired Turbine Inlet temperatures. Users preferably deliver fine droplets of heated water and/or steam help extend combustion stability limits. Users preferably deliver liquid diluent so that a substantial portion evaporates after the onset of combustion.

In applications desiring air conditioning or refrigeration, users preferably provide absorption cooling equipment and configure the equipment and/or relative flow rates in the VAST cycle to provide the requisite temperatures and flows for the absorption cooling equipment in some configurations. E.g., for air conditioning or refrigeration. Alternatively, users provide mechanical compression/expansion air conditioners instead of or in addition to the absorption air conditioners.

In other applications, users provide all three of electrical or mechanical power, heat and air conditioning by appropriately configuring VAST Cycles.

Such combined power and cooling configurations provide substantial thermo-economic and environmental advantages over conventional relevant art.

In some embodiments, users produce excess water (or achieve a net positive water balance) with VAST Steam Cycles (VAST-WS), and/or VAST Economizer Cycles (VAST-W). (See, for example, FIG. 44.) i.e. hydrogen in the fuel forms water during combustion. Some of this additional water is preferably condensed and recycled to achieve the net positive water balance.

For example, with the 50 MW industrial aeroderivative example, with VAST Steam Cycles, user achieved net positive water balance for all air compressor pressure ratios Beta calculated from about 10 to about 50 with about 105% of stoichiometric air flow. They achieve similar net positive water balances for VAST Steam Cycles with no air cooling. These flows amount to about 0.5 to about 1.5 times the flow of the fuel depending on the type of fuel, the air compressor ratio Beta and environmental parameters of relative humidity and the temperature of the ambient cooling fluid. (e.g., from deep sea water at about 7 degrees C. to hot desert air at about 45 degrees C. or higher.)

Configuring the VAST Steam Cycle to improve the Internal Rate of Return and considering the excess water as a revenue stream results in a configuration that condenses and recovers about twice as much water for sale as in some configurations without water sales.

Similarly, users achieved net water balance for VAST Economizer Cycles for air compressor pressure ratios of about 28 and larger with about a 105% of stoichiometric air flow in this example.

By contrast, all the relevant art humid cycles modeled required very substantial make up water. These make up water flows amounted to about 4 to 9 times the flow rate of fuel. The excess water produced of the VAST Cycles (net positive water balance) compared to the make up water required (negative water balance) of the relevant art cycles CC2L, STIG, RWI, HAT and HAWIT, provide substantial environmental and thermoeconomic advantages.

Such VAST Cycle power systems can be configured with air cooling systems. Consequently, they can be sited anywhere without any requirements for an ambient water supply other than that sufficient to prime the system on startup until a positive water balance is obtained.

With VAST Cycles achieving a net positive water balance (excess water), most of the particulates and contaminants in the intake oxidant containing fluid, fuel and thermal diluent are condensed with the thermal diluent in the condensor. The concentration of these components in the excess condensed thermal diluent is of a similar magnitude or less than the concentration of these contaminants in the intake fuel. The flow of these contaminants into the expander from the combustor is correspondingly about the intake amount in the fuel and oxidant flows, plus the amount of contaminant flows recycled with the thermal diluent (e.g., the water.)

Where the contaminants in these combined flows are less than the desired or required concentrations for the expander at the temperatures considered, users preferably manage the buildup of contaminants by discharging the contaminants from the system in the excess thermal diluent formed. E.g. via the excess water discharged. In such configurations, users achieve substantial reductions in system cost by displacing almost all the water treatment equipment required for conventional relevant art.

Water volume for storage is provided to contain excess recovered water or for storage of makeup water from an external source, for use in the VAST Cycle to facilitate startup to use water before water recovery commences or otherwise available. In modified embodiments, a bladder system is used to provide a higher pressure volume than otherwise available.

One or more Charging Pumps may be employed to provide water to fill the VAST Cycle components or to increase header pressure under predetermined conditions.

Users preferably control the temperature profile of the combustion fluids and/or of the energetic gas leaving the combustor by adding thermal diluent. They preferably pumping it into the thermal system as liquid diluent. User preferably deliver liquid and/or vaporized or superheated thermal diluent through one or more distributed contactors as described herein. Users preferably create water/fuel and air/fuel spatial distributions using the present embodiments that are significantly more uniform than conventional technologies. This results in significant reduction in spatial temperature variations.

In some configurations, users provide additional nozzles about, along and within the combustor 4000 downstream of the flame to increase the water or steam delivery.

Users preferably control the proportions of thermal diluent delivered to fuel delivered to control the temperature of the resultant reacted mixture or energetic fluid. Users preferably account for any excess oxidant and/or gaseous thermal diluent or other reactant, and the temperatures, pressures and heat capacities of each of the fluids that change the temperature of reaction or of the energetic fluids.

For example, Table 4 shows the typical temperatures achieved by delivering water as thermal diluent at various water/fuel ratios when burning #2 Diesel fuel provided at about 350 K (about 77° C. or 171° F.) with about 110% of the stoichiometric ratio of compressed air at a pressure ratio of about 10 (e.g., 10 bar) at about 788 K (about 515° C. or about 959° F.) with about 60% relative humidity in the intake air. The inlet water is provided at ambient conditions of about 300 K (about 27° C. or 81° F.).

TABLE 4

REACTED MIXTURE TEMPERATURE CONTROL by WATER to FUEL RATIO
Diesel Fuel (C12H26) at 350 K, 110% of stoichiometric air at 10 bar, 788 K ambient ISO conditions, water at 300 K

| Water/Fuel (mass/mass) | Water/Fuel (mol/mol) | Temperature K | Temperature ° C. | Temperature ° F. |
|---|---|---|---|---|
| 0 | 0.176 | 2,230 | 1,957 | 3,555 |
| 1 | 1.658 | 2,102 | 1,829 | 3,323 |
| 1.5 | 2.588 | 1,993 | 1,719 | 3,127 |
| 2 | 3.168 | 1,884 | 1,611 | 2,931 |
| 2.67 | 4.428 | 1,752 | 1,479 | 2,695 |
| 3 | 4.975 | 1,692 | 1,419 | 2,586 |
| 4 | 6.633 | 1,524 | 1,251 | 2,284 |
| 5 | 8.292 | 1,367 | 1,094 | 2,001 |
| 6 | 9.95 | 1,236 | 963 | 1,765 |
| 7 | 11.61 | 1,119 | 846 | 1,555 |

For example, at about 110% excess air, users preferably provide about 7:1 water/fuel m/m with Diesel #2 to control the temperature to about 846° C. Similarly, users preferably provide about 2:1 water/fuel m/m to control the exit temperature to about 1,611° C. This range of 7:1 to 2:1 covers the range of Turbine Inlet Temperatures of most commercial gas turbines (i.e., about 900° C. for uncooled blades to about 1,525° C. for the projected H class technology).

In another example, users preferably provide a ratio of about 1.5:1 water/fuel with Diesel #2 at about 110% excess air to achieve a temperature in the energetic fluid of about 1720° C. This is similar to Turbine Inlet Temperatures used in high temperature experimental ceramic turbines. A ratio of about 1:1 water/fuel with Diesel #2 achieves an energetic fluid temperature of about 1829° C.

Users readily calculate similar water/fuel ratios for other temperatures, for other ratios of excess oxidant or excess gaseous diluent, differing inlet conditions or heat recovery, or for natural gas or other fuels, using commonly available thermochemical reaction or computational fluid dynamics programs.

With the embodiments described herein or in the previous application, users deliver thermal diluent to control the temperature of the energetic fluid exiting the combustor to below about 2,073 K (about 1,800 C, or about 3,272° F.). Users control the temperature above the temperature of cooled fluid diluent. (E.g. about 1° C. or about 34° F. for water.)

In many configurations, the mass flow rate of thermal diluent is preferably higher than the mass flow of fuel. E.g. users provide diluent to fuel ratios of about 2:1 to about 7:1 for water/Diesel #2 to control the temperature of the energetic fluid to the range of about 1,611° C. to about 846° C. This covers the preferred design Turbine Inlet Temperature range of most commercial gas turbines.

Conventional technologies are limited in the amount of water they can deliver without quenching the flame or causing high CO emissions or pressure oscillations in the combustor. E.g. typically less than about 1.1:1 water/fuel by mass. In the present embodiments, users preferably achieve at least about 1.5:1 water/fuel by mass.

By injecting thermal diluent into the combustion system 4000 and reducing excess air, thermodynamic models of the VAST cycle show that there is insufficient vapor concentration for the thermal diluent (steam) to condense within the gas turbine as the energetic fluid is expanded and cooled, even when expanding to sub-atmospheric pressures. This results in very little erosion of turbine blades due to condensate within the expanding fluid. By contrast, heat recovery with a Heat Recovery Steam Generator with consequent expansion of steam through a condensing turbine results in condensed diluent or water within the turbine which causes substantial blade erosion, particularly at higher expansion and lower pressures.

Users preferably cool the expanded turbine exhaust gas using a coolant fluid near ambient temperature in some embodiments. The coolant fluid is cooled by ambient cold water or an air heat exchanger as available.

Cooling Hot Components

Energy conversion systems commonly have components that require cooling which are often air cooled with corresponding loss of the heat. In some configurations, users preferably use diluent cooling flows to cool such components and recover this low to medium grade heat. Users preferably rank components in order of thermal sensitivity to damage and cooling requirements. They preferably rank cooling flows by the life cycle benefits and/or damages. Users preferably cool components in order of thermal sensitivity and economic benefits in some configurations.

With reference to FIG. 22, one of the VAST cycles such as the VAST-WS cycle shown in FIG. 3, may be configured to cool heat generating components. They may similarly cool components heated by fluids such as the energetic fluid or the compressed oxidant containing fluid. Users preferably provide one or more splitter valves or selectively supply one or more of cool diluent, warm diluent, hot warm diluent, diluent vapor or superheated diluent vapor to the Heat and Mass Transfer System 6000 as desired for these cooling requirements. For example these may range from cool, warm or hot water, saturated steam and/or superheated steam as available. The heated diluent is preferably used for internal or external heat applications.

For example, a splitter valve 6450 may be configured between the Diluent treatment system (DTS) 2010 and the Low Temperature heat source. This are commonly temperature sensitive electronic components and some electrical components such as electromagnetic converters, transformers, frequency converters, electronic drives, electronic controllers that generate heat.

E.g. Power conversion electronics are very sensitive to cooling temperatures that allow the electronics junction temperature to rise above desired or required values. These are preferably controlled to less than 1° C. or a similar design temperature based on the cooling flow and heat sink. Higher temperatures rapidly reduce reliability, cause failure, reduce availability and increase replacement costs. However water much colder than desired cooling does not farther benefit the electronics as significantly as reducing applying cooler water elsewhere.

The coldest thermal diluent (e.g., water or refrigerant) is preferably used in one or more of the coldest part of the economizer, the preheater, direct contact spray filtering/cooling of the intake air, direct contact entrainment cooling into the compressor spray, direct contact spray inter-cooling, and/or surface cooling between compressors. Users preferably evaluate the relative benefits and distribute the cooler thermal diluent amongst these applications in order of and in proportion to these benefits. Warmer thermal diluent (e.g., water) can be directed to Medium Temperature Heat Sources requiring or benefiting from cooling but with less stringent temperature requirements. E.g., water that has been heated to near 90° C. to 95° C. by cooling the power conversion electronics is then preferably used to cool the generator and the pressure vessel.

Similarly, a splitter valve 6460 may be configured between the Low Temperature Heat Source and a Medium Temperature Heat Source to direct hot water as desired to a hot water use such as District Heating. Another splitter 6470 may similarly be provided to direct this hot water to the combustor 4000 as desired. These Medium Temperature Heat Sources are often electrical components that generate heat such as the Generator, Motors, Bearings, Pumps and Mechanical Drives.

These Medium Temperature Heat Sources may be classified into lower temperature components such as bearings, gear trains and variable speed drives that use lubricants. (Note that lubricants are now available to operate at 500° F.) The Pressure Vessel is a heated component that is preferably controlled below 500° F. Motors and Generators may similarly be limited by the temperature of insulating coatings and the melting temperature of solder.

The heated diluent may then be directed to High Temperature Heat Source to cool the respective components. For example, the hot path within the combustion system and the expansion system. These may include one or more of the combustion chamber liner, the equilibration or transition zone, turbine vanes, turbine blades, the turbine hub and the turbine shroud for one or more stages. A splitter valve 6480 may be configured between the Medium Temperature Heat Source and the High Temperature Heat Source(s) to deliver hot or evaporated diluent (e.g., steam) to a corresponding high temperature use (or steam use);

Similarly, a splitter valve 6490 may be configured between the High Temperature Heat Source, and the Combustor 4000 to deliver superheated diluent to a super heated diluent or steam use. The remaining high temperature or superheated diluent is preferably delivered to the combustor. Here it is preferably mixed with one or more of the oxidant, diluent and/or fuel fluids upstream of the combustion zone. In some circumstances, users may provide higher flows of diluent or cooler diluent sufficient to avoid evaporating or superheating the diluent. E.g. by using pressurized water.

These methods effectively recover lower grade heat and recycles it into the energetic fluid. This heat recycling method reduces the problems in the relevant art of using excess oxidant fluid to cool the hot section components and in doing so to cool the energetic fluid and loose cycle efficiency.

Combustor Configuration

Users provide and configure a combustor in the energy conversion system selected to provide control over the combustion and diluent delivery process according to one or more desired measures. In some embodiments, users may use a combustor operable to deliver and mix diluent in with the oxidant containing fluid, preferably comprising at least a portion of liquid diluent. For example, the combustors taught by Ginter in U.S. Pat. Nos. 3,651,641, 5,617,719, 5,743,080 and 6,289,666 may be used. The fluid delivery to these combustors is preferably controllable to maintain a combustible mixture prior to the start of combustion and operate with stable combustion.

Users preferably configure a combustor operable to deliver further diluent after the start of combustion. Combustors with such capability can deliver diluent that exceeds the diluent saturation limit common in most relevant art, thus displacing a larger portion of the oxidant containing fluid. E.g., cycles may use combustors such as those taught by Ginter that overcome the common air saturation limit in cycles evaporating water such as are used in the STIG, HAT (or "EvGT"), HAWIT, RWI, and Combined Cycles.

The combustor is more preferably selected to be operable to control the spatial delivery of diluent within the combustor so as to control the amount of diluent evaporated prior to the start of combustion to maintain a combustible mixture and stable combustion within the combustor. Correspondingly, the diluent delivery is preferably controllable to evaporate further diluent downstream of the start of combustion. For example, the VAST combustors taught in the Trifluid patent application are preferably used. In some configurations, these VAST combustors enable more liquid diluent delivery upstream of combustion than the conventional combustion stability limit. These combustors are preferably configured with the transverse spatial control of fluid delivery and mixing. This enables greater control over fluid composition and combustion, thus enabling reliable operation closer to stoichiometric operation.

The combustor is preferably operable to also deliver evaporated or gaseous diluent. For example, combustors with such capabilities such as are taught in the Trifluid patent application are preferably used. These are preferably operable to deliver both evaporated diluent and liquid diluent. E.g., steam and heated (or cooled) water. This enables delivery of more diluent and provides the ability to recover and recycle more heat from the expanded fluid than the diluent evaporation capability of relevant art cycles. For example, the VAST combustors as taught in the Trifluid patent application may be configured to deliver two to four times as much total diluent as evaporated diluent. E.g., as steam and regular or heated water. This exceeds the amount of steam deliverable to the combustor in a STIG cycle.

They preferably deliver to the combustor 4000 the maximum amount of vaporized diluent that can be recovered from the heat recovery system 6000 that is not otherwise used in other applications. Users more preferably operate the combustor with less oxidant and more diluent than would sustain a combustible mixture were the fuel containing fluid, oxidant containing fluid and diluent containing fluid premixed at the fluid delivered conditions. i.e., they displace more gaseous non-condensable diluent such as oxidant containing fluid or as air used as diluent.

Note that in the figures given herein, the combustor is shown as a thermodynamic "black box" operable to deliver mix and combust fuel containing fluid, oxygen containing fluid and diluent containing fluid. These diagrams are not intended to show the order or location of diluent and fuel delivery. Further detail on actual fluid spatial delivery may be found in the Trifluid patent application, the '191 patent application, and in one or more of the patents to Ginter.

Users more preferably use a VAST Trifluid combustor which is operable to control the transverse spatial distribution of fluids, such as is taught in the complementary Trifluid patent application. They preferably configure this combustor to control the transverse distribution of temperature in at least one direction. E.g, in the radial direction of an annular combustor to control the temperature distribution or profile of the energetic fluid entering the turbine from the hub to tip of the turbine blades and vanes.

Users preferably use a combustion system operable with high precision control over the fluids and fluid ratios as taught in the Trifluid patent application. This enables operating the combustor to reliably deliver an energetic fluid with peak temperature closer to the design peak temperature of the expander.

They more preferably control the transverse distributions of fluid delivery and control the transverse temperature distribution near to the design temperature distribution. This enables operating at a higher mean temperature while staying within the spatial temperature design uncertainties.

Users preferably configure and control the combustor so that the transverse fluid composition is near to the stoichiometric combustion within numerous regions across the combustor exit as is taught in the complementary Trifluid patent application. This composition is preferably controlled to displace oxidant containing fluid diluent and to control at least one pollutant below desired limits. E.g., carbon monoxide, residual or partially reacted fuel components, and oxides of nitrogen. This enables users to operate closer to stoichiometric while achieving pollutant emission limits.

Cycle Specifics

VAST Water Cycle: VAST-W

An embodiment of the thermodynamic cycle may configured as shown in FIG. 2 (VAST-W).

In this configuration, a portion of liquid diluent F275, which may include H2O, is injected directly into the combustor, 4000. As shown the diluent flow F429 may be used to recover heat from expanded fluid F420 from the expander 5100 using the diluent heat exchange sub-system 6020 with an economizer 6500. (See also FIG. 27). In some embodiments, the diluent may come directly from the diluent treatment 2300 via splitter valves 6310 and 6320 and pumps 2200 and 7800.

Pumps, splitter valves, and combining valves may be added or removed as desired or needed to achieve desired results. While flow control is shown as using a variable ratio or splitter valve, it will be appreciated that other components or combinations of components may accomplish similar results. E.g., by using one or more controllable valves, pumps, and flow restrictions.

With liquid diluent being added to the combustion chamber 4100 diluent vapor is produced and combines with the combustion products to produce an energetic fluid flow F405. In some embodiments, heat from this process may be recovered using the economizer 6500 in the diluent heat exchange sub-system 6020 after or downstream of the expander 5100.

The diluent that is in the expanded fluid F420 may be recovered by directing at least a portion of the expanded fluid F420 directly from the expander 5300 to the diluent recovery system 6010. Other embodiments may direct this expanded fluid through the economizer 6500 prior to delivering the cooled diluent F460 it to the diluent recovery system 6010.

In the diluent recovery system 6010, the expanded fluid is processed to recover the diluent and in some embodiments, recycle this diluent back into the thermodynamic cycle. In some embodiments the diluent recovery system may be configured with a surface condenser 7400 (As shown in FIG. 34). A cooling apparatus 7600 may be employed to reject heat from the cooling fluid used to cool the expanded fluid in the surface condenser 7400. Recovered diluent may be removed from the surface condenser 7400 and, if desired, recycled back into the system F295. In some embodiments, this may be through a diluent treatment system 2010.

Another embodiment FIG. 35 of the diluent recovery system 6010 may use a direct contact condenser 7500 to separate the diluent from the expanded fluid. In this configuration the cooling fluid makes direct contact with the expanded fluid and in the process removing the diluent. The diluent and cooling fluid may then be recovered F240 and in some embodiments cooled with a cooling apparatus 7600 before being reused in the direct contact condenser 7400.

In embodiments of the diluent recovery system, the heated cooling fluid and recovered diluent may be used in applications that desire or require heat. The cooling and diluent fluids may be distributed to these applications and if desired, in some embodiments be returned for recycling into the system. One embodiment, with cooling and diluent fluid being used for district heating, is demonstrated in FIG. 36

In some embodiments the diluent and cooling fluid recovered from the direct contact condenser may be recycled back into the system F295. In some embodiments, this may be through a diluent treatment system 2010.

A recompressor 5300 in FIG. 02 may be employed in some embodiments of this thermodynamic cycle. With the recompressor, the expansion system may have a greater expansion ratio and more work energy W580 recovered from the energetic fluid F405. The expanded fluid with at least a portion of diluent removed (expanded fluid) F460 may then be delivered from the diluent recovery system to the recompressor 5300. The recompressor 5300 then brings the fluid pressure near to same pressure as the environment so that it may be released from the system.

VAST Water and Steam Cycle: VAST-WS

An embodiment of the VAST thermodynamic cycle may configured to recover heat from the expanded energetic fluid into heated liquid diluent and diluent vapor using one or more heat exchangers as shown in FIG. 03 (VAST-WS).

In this configuration, a portion of liquid diluent and a portion of the vapor diluent, are preferably delivered into the combustor 4000. (These may include fluid water as hot water and steam.) As shown in FIG. 29, diluent may be heated with expanded fluid F420 from the Expander 5100 using the diluent heat exchange sub-system 6020 wherein the heat exchanger is shown as economizer 6500, an evaporator 6600, and a super heater 6700. The diluent is shown as being provided from the diluent treatment systems 2300, while the expanded fluid from the expander is shown as being delivered to the diluent recovery system 6010 after the heat is recovered.

With the diluent being added to the combustion chamber 4100 diluent vapor is produced and combines with the combustion products to produce an energetic fluid flow F405. Once the energetic fluid is expanded in the expander 5100, the resulting hot expanded fluid F420 may be delivered into a heat exchanger array or diluent heat exchange sub system 6020 to heat the diluent going to the combustion system 4000.

In FIG. 29, the hottest expanded fluid is preferably directed through a heat exchanger 6700 that takes hot diluent vapor F251 from near the boiling point, and superheats it prior to delivery to the combustion system 4100. In some embodiments a heat exchanger 6600 may take hot liquid diluent and boil it using hot expanded fluid, creating a vapor against expanded fluid delivered from the upstream prior Super Heater heat exchanger 6700 or in some embodiments from the Expander 5100.

An economizer may be employed prior to the boiling heat exchanger 6600 to heat the liquid diluent to a higher temperature.

As demonstrated in FIG. 28 and FIG. 29, VAST Cycles may be configured operable to extract heated diluent for use in other heat or cooling applications before and after the heat exchanger array. In some embodiments, heated diluent may be extracted between the heat exchangers as shown.

This heated diluent may be used in some embodiments as the at least a portion of the diluent being introduced into the combustion system 4000 or to other areas of the thermodynamic cycle.

Expanded fluid from the economizer 6500 may be delivered to the Diluent Recovery System (DRS) 6010. In the diluent recovery system 6010, the expanded fluid is processed to recover the diluent and in some embodiments, recycle this diluent back into the thermodynamic cycle. In some embodiments the diluent recovery system may be configured FIG. 34 with a surface condenser 7400. A cooling apparatus 7600 may be employed to reject heat from the cooling fluid used to cool the expanded fluid in the surface condenser 7400. Recovered diluent may be removed from the surface condenser 7400 and, if desired, recycled back into the system F295. In some embodiments, this may be through a diluent treatment system 2010.

Another embodiment FIG. 35 of the diluent recovery system 6010 may use a direct contact condenser 7500 to separate the diluent from the expanded fluid. In this configuration the cooling fluid makes direct contact with the expanded fluid and in the process removing the diluent. The diluent and cooling fluid may then be recovered F240 and in some embodiments cooled with a cooling apparatus 7600 before being reused in the direct contact condenser 7400.

In embodiments of the diluent recovery system, the heated cooling fluid and recovered diluent may be used in applications that desire or require heat. The cooling and diluent fluids may be distributed to these applications and if desired, in some embodiments be returned for recycling into the system. One embodiment, with cooling and diluent fluid being used for district heating, is demonstrated in FIG. 36.

In some embodiments the diluent and cooling fluid recovered from the direct contact condenser may be recycled back into the system F295. In some embodiments, this may be through a diluent treatment system 2010.

A recompressor 5300 in FIG. 2 may be employed in some embodiments of this thermodynamic cycle. With the recompressor, the expansion system may have a greater expansion ratio and more work energy W580 recovered from the energetic fluid F405. The expanded fluid with at least a portion of diluent removed (expanded fluid) F460 may then be delivered from the diluent recovery system to the recompressor 5300. The recompressor 5300 then brings the fluid pressure near to same pressure as the environment so that it may be released from the system.

Some of the benefits of this VAST Steam Cycle (VAST-WS) are shown, for example, in FIG. 38, 50 MW aeroderivative industrial turbines operating at 1300° C. The fuel and electricity prices assumed are USA mean industrial gas and electricity for the year 2000 published by the US Department of Energy. The same equipment component cost equations are used for all cycles, as developed by Traverso and Massardo of 2003 (submitted for publication to International Gas Turbine Institute Turbo 2004). (These are similar to the comparative analysis by Traverso, 2002 with some adjustments.)

Note that the VAST Steam cycle has comparable efficiencies but substantially lower capital costs than conventional relevant art cycles. In this example, the VAST Steam Cycle has about an Internal Rate of Return (IRR) of about 24% at base load of 8,000 hours/year and an IRR of about 12% at part load (50%) of about 4,000 hours/year at these conditions at about pressure ratios of 20 to 30 (with one spray intercooler between a low and high pressure compressor.)

This VAST Steam Cycle example, gives about two to four percentage points advantage in Internal Rate of Return (IRR %) compared to the Relevant art STIG cycle at these conditions for base vs 50% load. (i.e., about a 20% to 40% higher IRR %.) Similarly, for comparison, a relevant art two pressure level Combined Cycle (CC2L) in a similar 50 MW turbine operating at 4000 to 8000 hours per year achieves only about 2% to 4% Internal Rate-of Return in contrast to the VAST Steam Cycle at 12% to 24%.

The VAST Steam Cycle appears to have similar advantages over the RWI, HAWIT and HAT cycles. (See, for example, FIG. 38.)

VAST Steam Cycle with Steam Blade Cooling (No Air Cooling)

Figure 49:
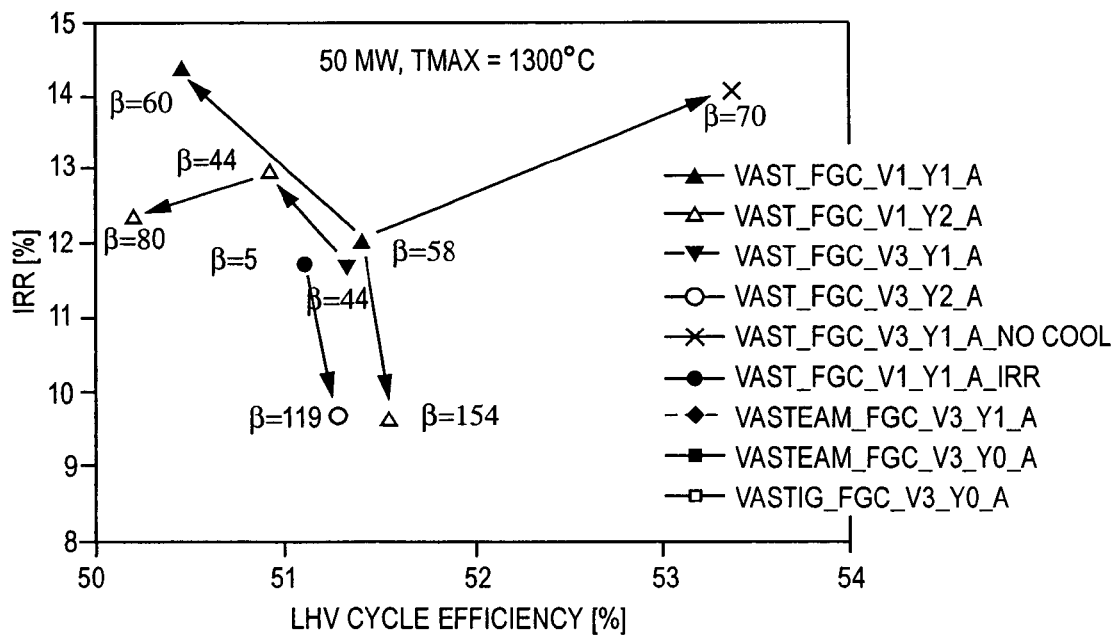
FIG. 49 is a graph showing Internal Rate of Return %, versus LHV cycle efficiency for different configurations of the VAST Cycle.

With the VAST Steam Cycle, users preferably configure the flows and/or temperature of the thermal diluent vapor or superheated thermal diluent vapor. They preferably direct one of these flows to use as coolant to the expander hot sections. E.g. to one or more of turbine vanes, blades and shroud. This substantially improves system efficiency compared to using compressed air as the expander hot section coolant. This also reduces system cost and improves the thermoeconomics of the system. (See, for example, FIG. 49.)

For example, with a 50 MW industrial aero-derivative gas turbine operating on the VAST Steam cycle, displacing the air cooling with steam cooling increased the thermal efficiency from about 51.3% to about 53.3%. This assumes that after cooling the expander hot section(s), (e.g., turbine blades & vanes,) the heated steam is directed back into the combustor upstream of the expander.

In modified configurations, users use steam to cool the hot section components (e.g., blades) and then deliver it into the energetic fluid flow within the turbine. This combination will increase the efficiency to between the 51.3% and 53.3% in these relative calculations.

In the VAST Cycle, the excess air used for turbine blade cooling was assumed to use about 18% of the air flow used for combustion at about 110% of stoichiometric flow. Thus, eliminating the excess compressed air may reduce the compressor size in the VAST cycle by about 15%.

Displacing air cooling with steam cooling with this VAST cycle, reduces equipment cost and increases the Internal Rate of Return by about two percentage points from about 12% IRR to 14% IRR at air compression pressure ratios of about 20 to 30 in these relative calculations.

VAST Water and Steam with Recuperation Cycle: VAST-WSR

An embodiment of the thermodynamic cycle may configured as shown in FIG. 4 (VAST-WSR). This is embodiment adapts the VAST-WS cycle to recover heat with the oxidant containing fluid.

Figure 32:
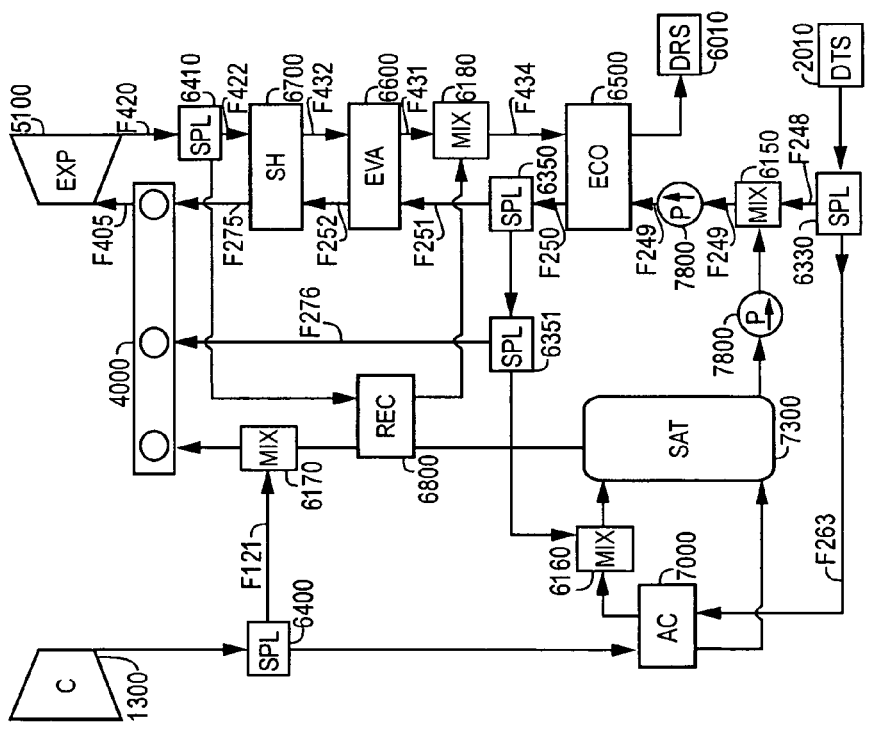
FIG. 32 is a schematic diagram of the heat and mass transfer system using a recuperator, aftercooler, humidifier, economizer, evaporator and superheater.

In this configuration the diluent heat exchange sub-system 6020 includes a gas-gas heat exchanger or recuperator 6800 and a packed bed humidifier 7300 as shown in FIG. 32. A further embodiment may include a second economizer 6510 and an after-cooler 6900.

Advantages and results of these cycle embodiments are demonstrated in FIGS. 37-46.

Oxidant Supply System

Oxidant Source

For the complementary co-reactant fluid, in many embodiments users use an oxidant containing fluid, commonly an oxygen containing fluid or oxygen. Some oxidant containing fluids include one or more thermal diluents, such as nitrogen, water, carbon dioxide, and noble gases such as argon etc.

Many embodiments utilize air as the oxidant containing fluid to provide oxygen to the combustion system 4000 or reactor. Users preferably compensate for variations in the air humidity, temperature and pressure in some embodiments.

In some embodiments, users use liquid oxygen, oxygen prepared by vaporizing liquid oxygen, oxygen formed by electrolysis, solid electrolyte oxygen separation, or oxygen prepared by other methods.

Conventional oxygen fuel combustion produces a very hot energetic fluid F405. The very high temperature makes it very difficult to make durable long lasting combustor liners. In some embodiments, thermal diluent distribution tube arrays distribute fuel and thermal diluent in close proximity. This substantially constrains the temperature of the hot energetic fluid F405. In configurations using liquid oxygen, users preferably deliver the oxygen through direct contact tubes to improve intimate fairly uniform mixing of fuel, oxidant and diluent.

Lower peak fluid temperatures obtained by such embodiments make it much simpler to make combustion system 4000 that will reliably tolerate the combustion. Similarly, the thermal diluent distribution tubes and radiation shielding fins strongly reduce the heat fluxes experienced by the fuel distribution tubes.

In some embodiments, users prefer a heat exchanger for vaporization of liquid oxygen, using the heat of at least one of the expanded combustion fluid, heated diluent, District Heating fluid, or electrical energy, generated from within the VAST Cycle or externally or both.

Some embodiments use oxygen "enriched" air where the oxygen concentration is increased over standard air by one or more of a variety of enrichment methods. These include pressure swing zeolite concentration systems and vacuum pressure swing concentration systems. Membrane oxygen enrichment methods may also be used. As with oxygen combustion, the perforated fuel and oxidant containing fluid distribution tube arrays substantially constrain the combustion temperatures and simplify combustor design.

Filter

Figure 12:
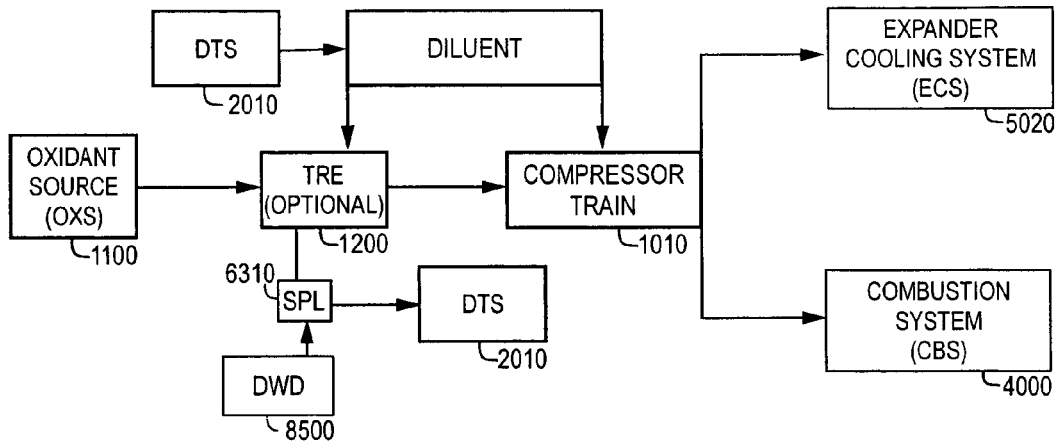
FIG. 12 is an oxidant-delivery system using a compressor train with diluent spray pre-treatment, diluent injection into compressors, and expander cooling.

With reference to FIG. 12, users preferably use a spray direct fluid contactor filter in the Oxidant fluid Treatment (TRE) 1200 to spray liquid thermal diluent to remove particulates and fibers from the intake oxidant containing fluid. E.g., intake air. This direct contact filter preferably uses a direct contactor with numerous orifices as taught in the '191 patent application. These are preferably configured as the multi passage spray system shown in the '191 patent application FIG. 82. The diluent used need not have as high quality as that entering the combustor. It may be drawn from the diluent recovery directly with filtration to remove particulates smaller than the distributed orifice size. It may have partial treatment if spray entrainment contributes significantly to the contaminant load into the combustor. The collected liquid diluent (e.g. cool water) may be returned to the diluent treatment system 2010 for use within the energy conversion system or may be withdrawn via Diluent Discharge (DWD) 8500 for other applications or discharged. Such spray filtering is preferably used instead of or may be in addition to a gas/air filter.

In some configurations, users preferably provide a differential pressure sensor to monitor the pressure drop across the intake gas/air filter to decide when to clean or replace the air filter. In some embodiments, more than one filter with flow control devices (valves, dampers, et al) may be employed, enabling on-line switching of intake sources such as when one filter is awaiting maintenance due to high differential pressure from build-up of particulates and other material that increase resistance to flow and thus decrease overall. Cycle efficiency.

Users preferably use a cold liquid diluent to both cool and filter the air. Such filtering reduces the rate of fiber accumulation in the compressor 1300 (e.g., on compressor vanes and blades), and in the Expander 5100 (e.g., on expander vanes and blades.) Cooling the air gives compressors greater capacity, particularly on hot days. Filtering reduces the rate of compressor and expander fouling, thus reducing downtime, cleanup costs, and average compressor and efficiency. It reduces the pressure drop across the fluid (gas/air) filters, reducing the pumping power of the compressor.

When using water sprays with a direct contact filter to filter the air, users preferably control diluent delivery prior to combustion to compensate for variations in moisture composition from variations in humidity and from using diluent through a spray direct contact filter.

Compressor

Figure 5:
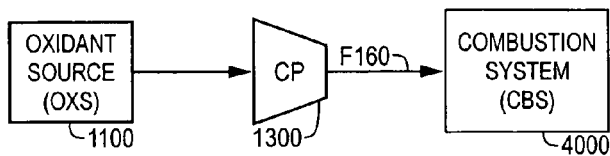
FIG. 5 is simple oxidant-delivery system break-out with a single compressor.
Figure 7:
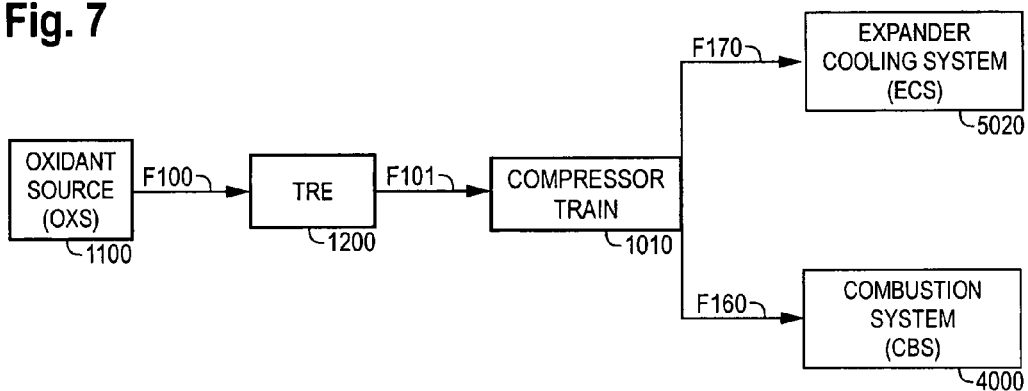
FIG. 7 is an oxidant-delivery system break-out with treatment, multiple compressor components, and potential cooling flow to the expander hot section.

In medium to large gas turbine power systems, the compressor is the largest single capital expense in high pressure ratio systems, costing more than the expander. In lower pressure ratio systems, the compressor is still a substantially significant expense. Referring to FIG. 5, users may configure a compressor (CP) 1300 with multiple compressor stages in series to take oxidant containing fluid from the Oxidant Source 1100 achieve their desired overall compression ratio in delivering that fluid to the Combustion System 4000. Referring to FIG. 7, users preferably provide a diluent containing fluid and reduce the excess oxidant containing fluid used by one or more measures described herein, in the Trifluid Reactor patent application, in the '191 patent application and in the previous patents to Ginter. E.g., by using a combustor such as a Ginter VAST combustor or a VAST Trifluid combustor operable near stoichiometric conditions. Complementing these measures, users preferably resize the compressor(s), reducing the flow capacity of the compressor(s) relative to the turbine(s). This substantially reduces the cost of the compressor(s) and of the energy conversion system.

For example, by preferably reducing the compressed air flow from ultra lean combustion at about 334% (for about 1300° C.) to about 110% of stoichiometric flow, users reduce that portion of the flow through the compressor by about 67%. Similarly, users preferably displace the compressed air commonly used to cool the expander hot sections (e.g. turbine blades, vanes & shroud) by providing a diluent such as steam and water. By these measures, they displace about 10% to 18% of the oxidant containing fluid flow commonly used to cool the expander. (e.g. compressed air.) These measures can reduce the size of the compressor by about 67% to about 72%. This reduction in the compressor size provides the largest reduction in capital costs when converting to the VAST Cycles.

Users preferably apply the substantial cost savings in compressor size at pressures commonly used, to increasing the overall effective pressure ratio Beta, and thus the turbine expansion ratio, thus improving system efficiency in some embodiments. In modified embodiments, the same compressors are used to feed multiple expanders compared to common configurations.

Users preferably provide a base low pressure compressor (LPC) 1310 to pressurize the oxidant containing fluid.

Users preferably add one or more high pressure compressors (HPC) 1350 to increase the pressure of the compressed oxidant containing fluid to the combustor 4000 and expander 5100 in some configurations. This increases the overall pressure ratio Beta as the product of the pressure ratio Beta of the low pressure compressor times the pressure ratio Beta of each of the high pressure compressor(s).

In some embodiments, users preferably adjust the pressure ratios of one or more compressors (e.g. comprising the low pressure compressor 1310 and the high pressure compressor 1350 and the recompressor 5300) to control the gross expansion ratio of the energetic fluid. This may be controlled to adjust one or more of the net specific power, the system power efficiency, system gross heat efficiency, and/or reduce life cycle thermo-economic costs.

For example, consider 50 MW gas turbines configured for VAST-WS (VAST Steam Cycle) using water spray intercooling between low and high pressure compressors, operating at 1300° C. Turbine Inlet Temperature, using mean industrial costs of natural gas and prices of electricity in the USA for 2000. The efficiencies of turbines are taken as the mean between the GE and Rolls Royce aeroderivative turbines of 1990 class technology.

Figure 47:
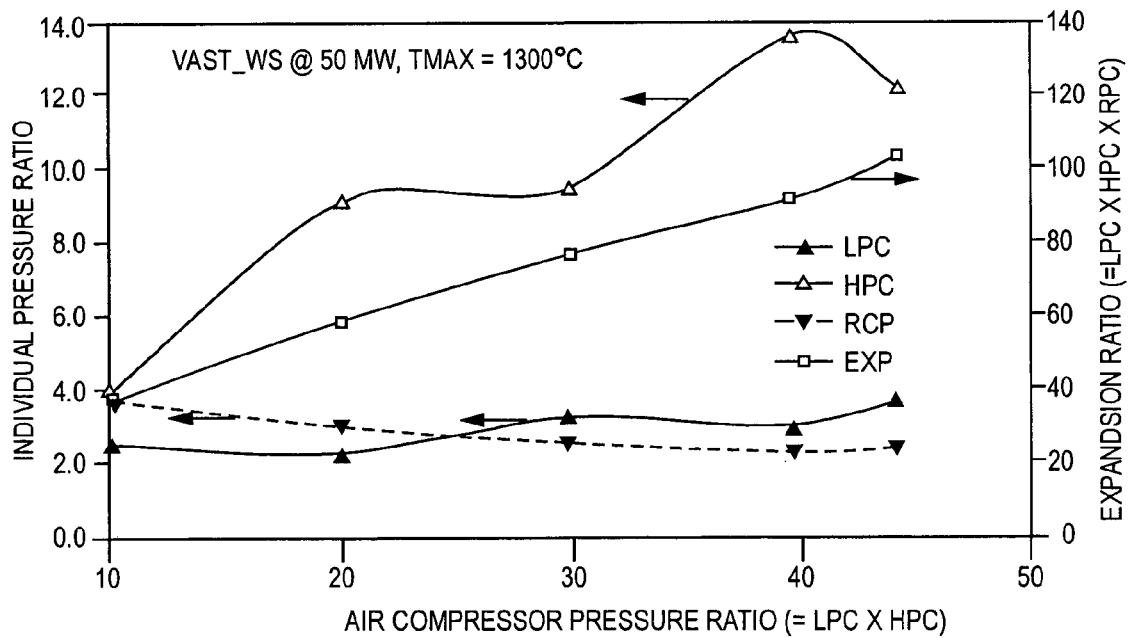
FIG. 47 is a graph showing expander pressure ratio and individual compressor pressure ratio versus air compressor pressure ratio of the VAST Steam Cycle (VAST-WS)
Figure 50:
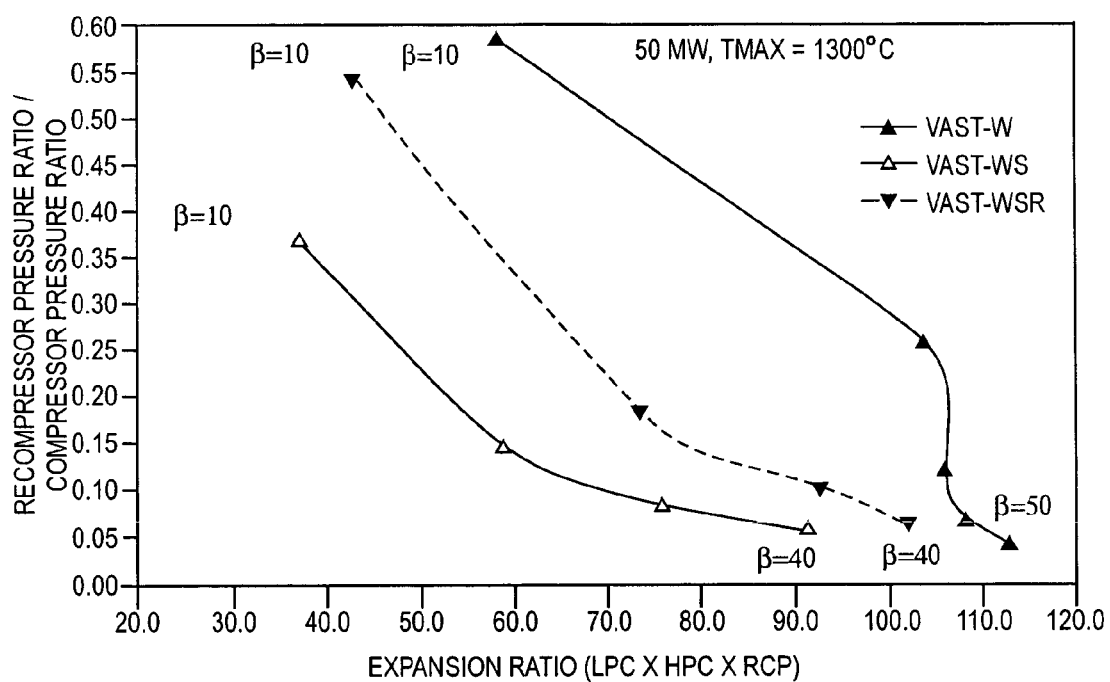
FIG. 50 is a graph showing the expansion ratio versus the ratio of recompressor pressure ratio to compressor pressure ratio.

Some typical distribution of pressure ratios for the low pressure compressor, high pressure compressor, and recompressor for such a configuration are shown in FIG. 47 and FIG. 50, for air compressor pressure ratios ranging from 10 to 44.

In a similar fashion, the low pressure compressor ratio is configured at about 3.16 for a pressure ratio Beta of about 30 for the oxidant containing fluid in typical spray intercooled industrial 50 MW aeroderivative turbine configuration.

Similarly, they preferably set the low pressure compressor ratio to about 2.53 for an air compressor pressure ratio Beta of about 10. They preferably increase this to about 3.64 for an air compressor pressure ratio Beta of about 44.

Similarly, for a pressure ratio Beta of about 30 for the oxidant containing fluid in typical industrial 50 MW aeroderivative turbine configuration, users preferably configure the high pressure compressor ratio to about 9.47 in some embodiments. (See, for example, FIG. 47.)

Similarly, they preferably set the recompression ratio to about 3.94 for an air compressor pressure ratio Beta of about 10. (See discussion of recompressor in Expansion System.) They preferably drop this to a pressure ratio Beta about 2.2 for an air compressor pressure ratio Beta of about 44.

Note that with these preferred results for the spray intercooler, the pressure ratios of 3.16 and 9.47 for the two compressors are substantially different from the optimum pressure ratio for a surface intercooler of the square root of the total pressure ratio or about 5.47.

Users preferably adjust the recompressor 5300 ratio to improve or optimize the system economics (e.g. higher Internal Rate of Return %) which is near the optimal thermal efficiency. (See discussion of recompressor in Expansion System.) The curve of Internal Rate of Return vs. Thermal Efficiency (FIG. 38) is appears like a skewed inverted parabola with both economic benefits and thermal efficiency declining with recompression ratios higher and lower than near the configurations found with high Internal Rate of Return (IRR %) for the assumptions used.

E.g., for a pressure ratio Beta of about 30 for the oxidant containing fluid in typical industrial 50 MW aeroderivative turbine configuration, users preferably configure the recompressor ratio to about 2.6 in some embodiments. i.e., the pressure in the cooled (condensed) expanded fluid at the recompressor intake is about 38% of ambient pressure. (See, for example, FIG. 47.)

Similarly, they preferably set the recompression ratio to about 3.9 for an air compressor pressure ratio Beta of about 10. They preferably drop this to about 2.3 for an air compressor pressure ratio Beta of about 44. I.e., the pressure in the condensed expanded fluid at the recompressor intake is about 25.6% (1/3.9) to about 44% (1/2.3) of the ambient pressure. (e.g., % of one atmosphere or about 26 kPa to 44 kPa.)

Figure 43:
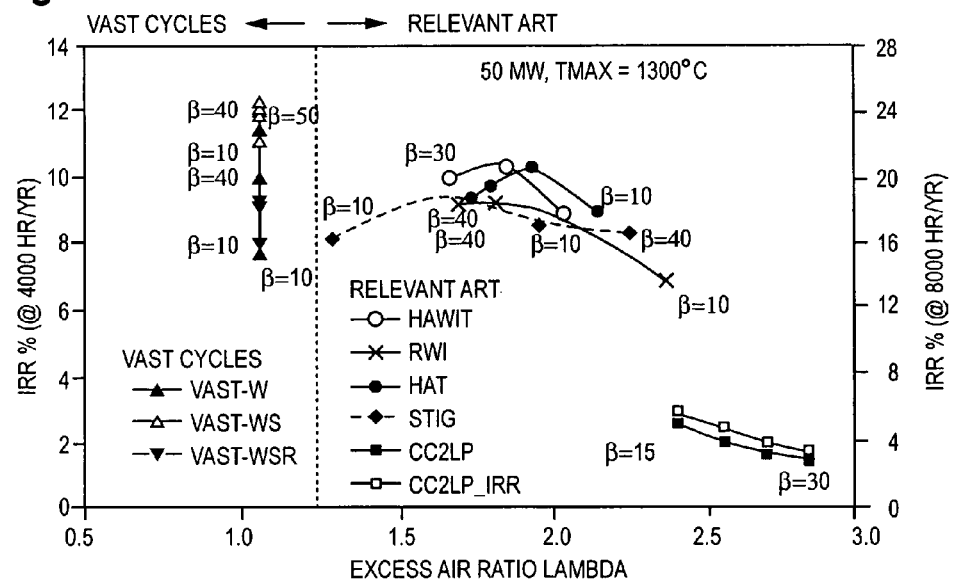
FIG. 43 is a graph showing Internal Rate of Return versus relative air/fuel ratio Lambda of VAST and relevant art cycles at 50 MW and TIT=1300° C.
Figure 48:
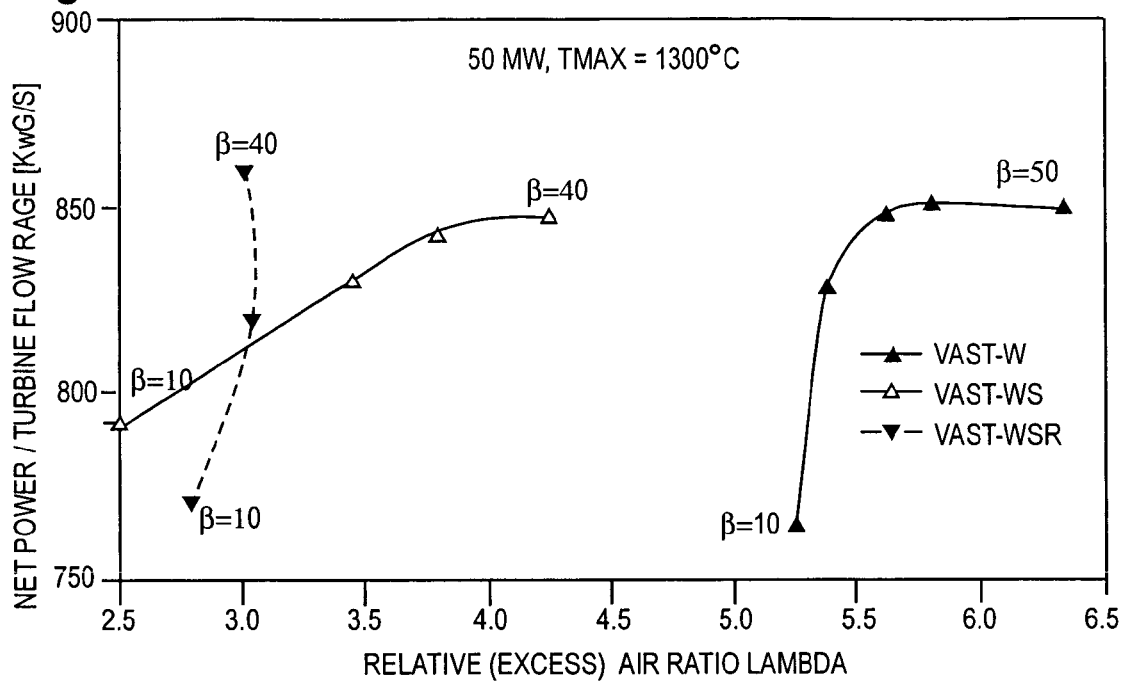
FIG. 48 is a graph showing Net Power to turbine flow rate vs water to air ratio.

By preferably displacing gaseous compression with liquid compression, users substantially reduce the gross pumping work required to deliver the energetic fluid to the inlet to the expander inlet in some embodiments. (See, for example, FIG. 42 and FIG. 48.) This substantially increases the net power (and IRR as shown in FIG. 43) available from the system. I.e., the gross turbine power less all pumping work and efficiency losses. Correspondingly, this reduces the flow through the gaseous compressors.

Figure 39:
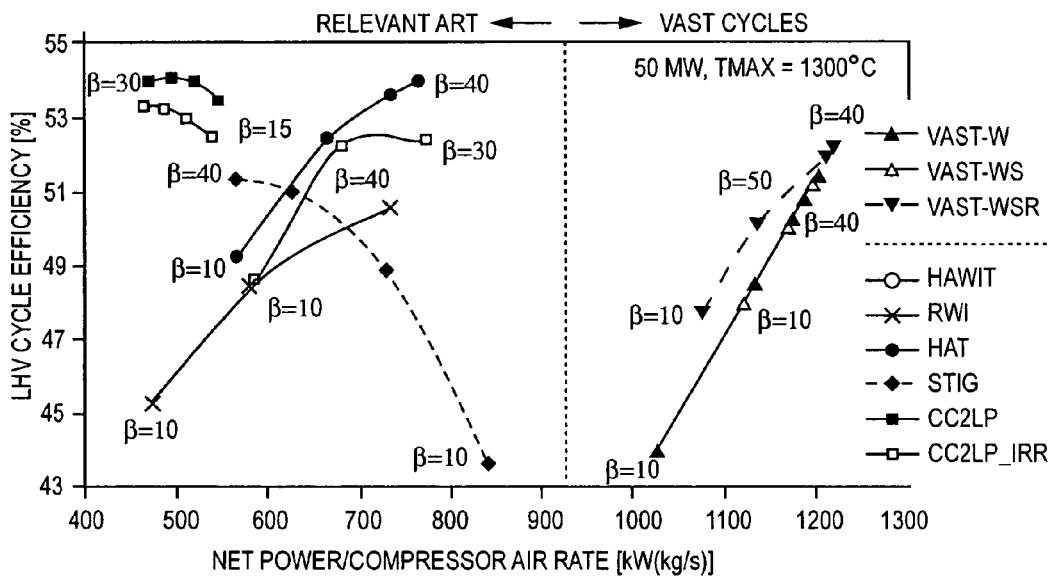
FIG. 39 is a graph showing the LHV Cycle Efficiency versus Net Power to Compressor Air Flow Rate ratio of VAST-W, VAST-WS, VAST-WSR and relevant art cycles at 50 MW, 1300° C.
Figure 40:
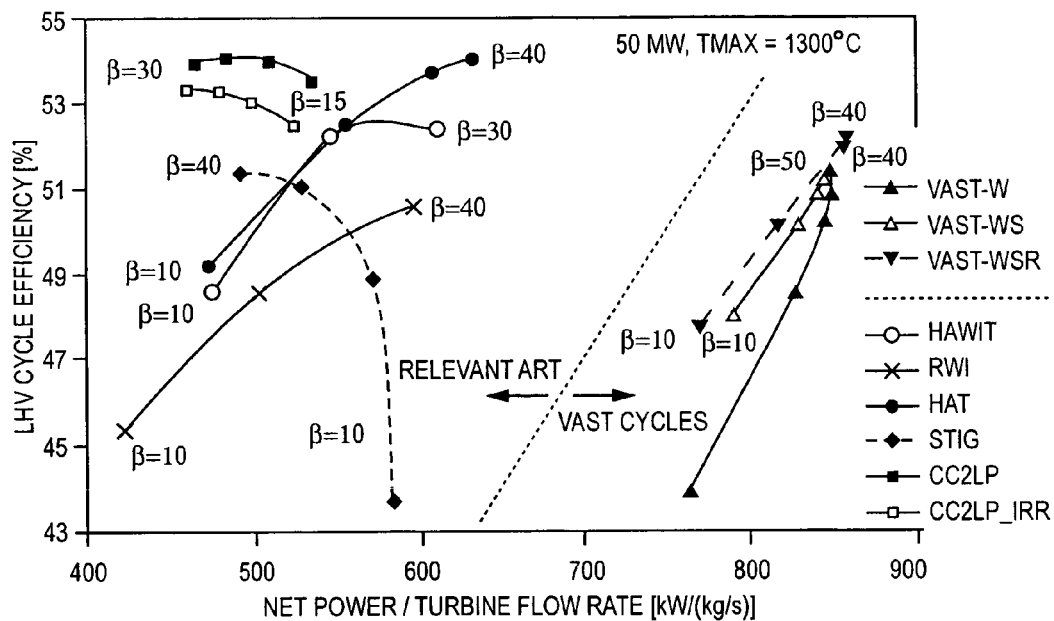
FIG. 40 is a graph showing the LHV Cycle Efficiency vs Net Power to Turbine Flow Rate ratio of VAST and relevant art cycles at 50 MW and TIT=1300° C.
Figure 41:
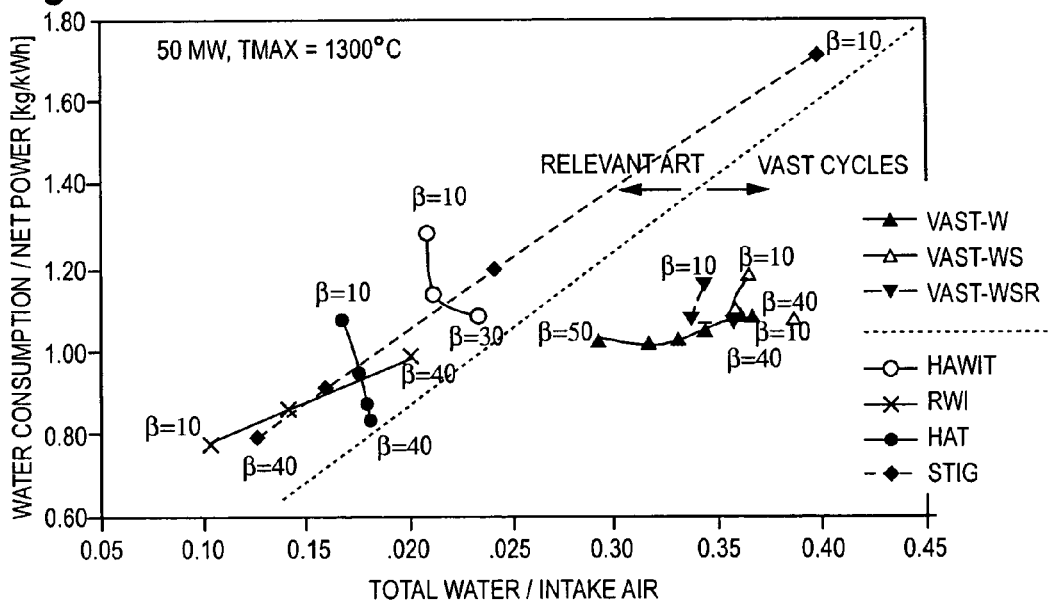
FIG. 41 is a graph showing Water Flow per Net Power versus Water to Intake Air ratio of VAST and relevant art cycles at 50 MW and TIT=1300° C.
Figure 42:
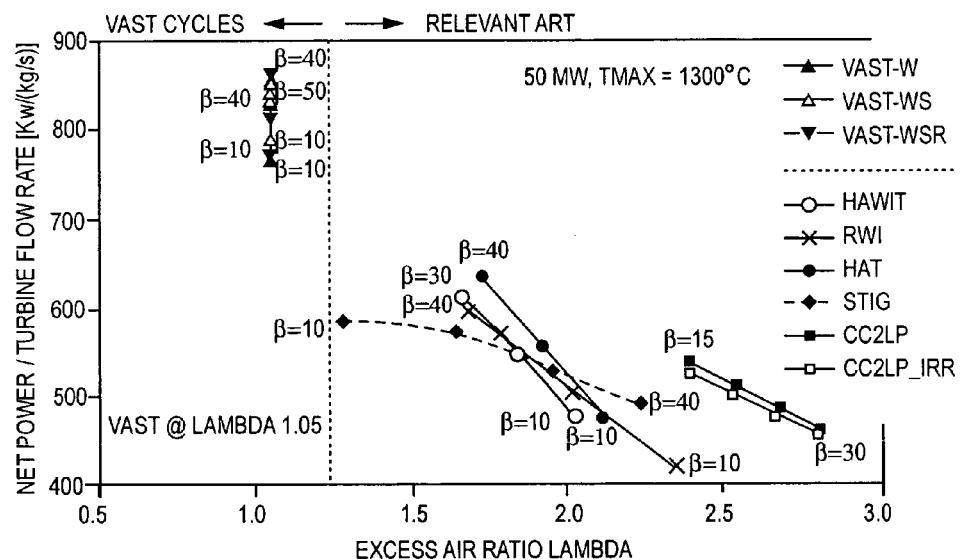
FIG. 42 is a graph showing Net Power to Turbine Flow Rate ratio versus Relative Air/Fuel ratio Lambda for 50 MW VAST-W, VAST-WS and relevant art cycles.

By the measures of increasing the system net power while reducing oxidant containing fluid flow, users increase the ratio of the system net power to the mass flow through the compressor exit or the Compressor Exit Specific Net Power (Gross turbine power less the pumping power of the compressor(s) and pump(s) divided by the fluid mass flow through the exit of the compressor including water from relative humidity, fogging, water entrainment, intra-compressor water spray or inter-compressor water spray.) This reduces the corresponding compressor capital costs per net power delivered. With reference to FIG. 39, the benefits from these improvements in Compressor Exit Specific Net Power can be visualized by a graph of system thermodynamic efficiency (% LHV basis) versus the Compressor Exit Specific Net Power. FIG. 39 shows the LHV Cycle Thermodynamic Efficiency % versus for the Compressor Exit Specific Net Power ratio in kW/(kg/s) or kJ/kg (i.e. the net power in kW or kJ/s divided by mass flow in kg/s is equivalent to the specific work kJ/kg to pressurize a unit mass of oxidant containing fluid or air). This compares the VAST-W and VAST-WS cycles with a surface condensor, and the VAST-WS with a direct contact condensor. These VAST Cycles are further compared with the major relevant art "wet" cycles over a range of pressure ratios Beta from about 10 to 40. e.g., at 50 MW, and TIT=1300° C. Note that each of the relevant art cycles are extended to the air saturation limit with corresponding resized compressors for a conservative comparison, not just to the conventional compressor surge limit.

Note that in the relevant art with ultra-lean combustion, the flow through the compressor is commonly similar to the mass flow through the turbine. However in relevant art "wet" cycles, and the VAST Cycles, the compressed flow of air and water vapor exiting the compressor is substantially smaller than the mass flow through the expander or turbine. In "wet" cycles, the Turbine Specific Net Power is substantially higher than in conventional lean combustion systems. This Compressor Exit Net Specific Power is shown separately in FIG. 39 relative to the Turbine Inlet Specific Net Power shown in FIG. 40 to clearly compare the advantages of these parameters for the VAST Cycles compared to the relevant art.

The VAST-W (VAST Water Cycle) delivers hot water to the combustor. As the pressure ratio Beta increases from about 10 to about 50, VAST Cycle 2 shows substantial increases in Compressor Exit Specific Net Power from about 1020 kJ/kg (kW/kg/s) to about 1200 kJ/kg (kW/kg/s). This correspondingly increases the LHV Cycle Efficiency from about 43.7% to about 51.3%.

Similarly VAST-WS (VAST Steam Cycle) delivers both steam and water into the combustor. It similarly increases Compressor Exit Specific Net Power from about 1120 kJ/kg (kW/kg/s) at a pressure ratio Beta of about 10, to about 1200 kJ/kg (kW/kg/s) at pressure ratio Beta of about 40.

With further reference to FIG. 39, by comparison, all relevant art "wet" cycles evaluated (STIG, HAT, HAWIT, RWI and CC2LP) show Compressor Exit Specific Net Power values of less than about 840 kJ/kg (kW/kg/s). These two VAST Cycles VAST-W and VAST-WS show about a 50% improvement in Compressor Exit Specific Net Power compared to the HAWIT and HAT cycles at pressure ratios Beta of about 30 to 40 for similar LHV Cycle efficiencies. This demonstrates the benefits of the VAST cycles' capabilities to exceed the air saturation limits of diluent addition and correspondingly to reduce the compressed oxidant containing fluid flow (e.g., air) from greater than about 150% to about 110% or less of the stoichiometric air flow.

In these initial calculations of the VAST cycle with economizer only, the water was assumed to be pressurized to 165 bar. The water injection pressure was reduced in the VAST Steam generation cycles The systems efficiency, IRR % and electricity costs may be improved by reducing the excess water delivery pressure.

One embodiment of the VAST Steam cycle (VAST-WS) may be configured to provide no compressed air to cool turbine blades, and the compressor is sized accordingly. When operating near stoichiometric conditions, this increases the Compressor Exit Specific Net Power. E.g., to about 1380 kJ/kg (kW/kg/s) at pressure ratio Beta of about 10 at a relative air ration Lambda of 1.05. As the pressure ratio Beta is increased to about 50, this Compressor Exit Specific Net Power increases to about 1480 kJ/kg (kW/kg/s). These measures increase the system efficiency from about 49.6% at Beta of about 10 to about 53% at pressure ratio Beta of about 50 in this VAST-WS cycle with the 1990's technology compressors and turbines assumed.

Lower Intake and Exit Losses

Turbulence in drawing oxidant containing fluid into the thermodynamic cycle creates a pressure drop and reduces system efficiency. There are similar turbulence mixing and pressure losses on the exit. E.g., the relevant art typically assumes about a 1% pressure drop on the air intake and another 1% pressure drop at the exhaust or stack. (See, for example, The Gas Turbine Handbook, 2003, LeFebvre 1998, or Dixon 1998 etc.) As the compressor comprises about 65% of net power, these intake and exhaust diffuser losses constitute about 1.3% of gross power or 3.7% of net power in an ultra-lean combustion system.

In some embodiments, users preferably use the preferred diluent to displace most of the gaseous excess oxidant containing fluid used as thermal diluent in the combustion system. E.g., users reduce air flow by about 67% from about a Lambda of 334% of the stoichiometric rate to a Lambda of about 110% or less of the stoichiometric rate.

Consequently, users reduce the total intake and exit pressure-volume parasitic diffuser losses by about 67% to about 72% or more in preferred embodiments. E.g., from 2% to about 0.67% of gross power or to about 1.9% of net power, assuming the smaller compressor requires about 35% of gross power. Thus preferred VAST embodiments reduce the cost of intake and exhaust diffusers by about 67% to 72%, and reduce these diffuser power losses from about 3.7% of net power to about 1.9% to 1.6% of net power. I.e. this alone gives a saving of about 1.8% to 2.1% of net power.

With lower inlet and exit flows, users may reduce the intake duct size and diffuser size to accommodate the smaller resultant flows of oxidant containing fluid into the VAST Cycles. This reduces capital costs as well as space and land requirements.

In modified embodiments, users preferably increase the length and shape of the intake and exit diffusers to improve diffuser efficiency relative to relevant art designs. This reduces the pressure-volume parasitic pumping losses relative to conventional lean combustion systems.

In modified embodiments, users may add and control at least one damper or valve to control the intake flow rate into the compressor. This enables reduction of the air flow delivered, and of the compression power, such as on reduced expander power operations.

Figure 6:
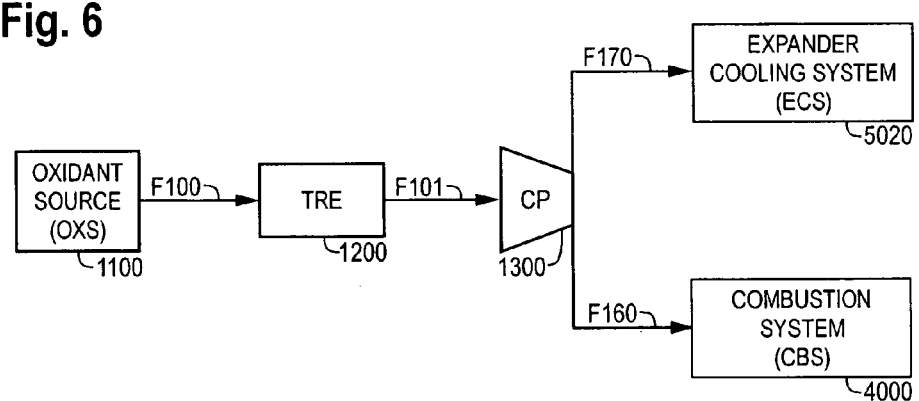
FIG. 6 is an oxidant-delivery system break-out with treatment and optional cooling flow to the expander hot section.

With reference to FIG. 6, in modified embodiments, users may add a duct to bypass some oxidant containing fluid from the Compressor 1300 around the combustion system 4000 to the expander cooling system 5020 to cool one or more expanders. Similarly, with reference to FIG. 7, users may similarly take the output of a compressor train and duct a portion to the Expander Cooling System (ECS) 5020. In the 50 MW embodiments evaluated, the flow to expander for cooling was assumed as 10.7% of the mass flow through the expander. The bypass duct, may include a damper/valve to control the excess oxidant fluid flow used as coolant.

Compressor/combustion system bypass flow may be used as an alternate or addition to using expanded combustion fluid such as for an economizer.

As with the intake and exit losses, by preferably reducing intake oxidant containing fluid flow, users similarly reduce the parasitic pumping losses through the intake gas filter in modified configurations. E.g. by about 67% to about 72% or more of the conventional air intake filter losses.

With substantially lower intake flows, users preferably resize the intake filter area about in relation to the intake flow. This results in significant net present value savings due to lower filter capital costs, lower size and land costs, and very significant lower life cycle operating costs of lower parasitic pumping costs and lower filter replacement and labor costs.

With these significant savings, users preferably increase the filter cross sectional area per unit gas flow and reduce the parasitic intake filtration pressure losses and parasitic pressure-volume to about near the life cycle optimum values for the VAST cycle in modified configurations.

Filtration

By preferably reducing the intake oxidant containing fluid relative to conventional systems, users substantially reduce the amount of particulates, (fibers, dust etc.) entrained into the energy conversion system in some embodiments. E.g. by about 67% to about 72% or more relative to conventional ultra lean combustion (at 15% O2 in the exhaust).

In some configurations, users preferably reduce intake air below the conventional of about 150% or more of stoichiometric air flow commonly used in relevant art systems using water to humidify the compressed air such as the STIG, HAT, HAWIT, RWI, EvGT and other wet cycles where the amount of diluent delivered is limited by the saturation of the oxidant containing fluid. E.g. from a Lambda of about 150% where the amount of water delivered is limited by air saturation to a Lambda of about 110% or lower in some configurations. This reduces the intake air and associated filterable particulate load by about 27% compared to those relevant art wet cycles.

With reference to FIG. 12, users preferably provide filtration equipment on the intake oxidant containing fluid (e.g., air intake.) By preferably operating with near stoichiometric air flows, and preferably reducing or eliminating compressed air cooling, users may reduce the cost of the air filtration equipment by about 65% to 72% compared to conventional systems. Users preferably take some of these savings and improve the intake air filtration to reduce life cycle costs by trading some higher capital costs for lower pressure drop, lower compressor fouling, higher efficiencies, with corresponding lower operating and maintenance costs.

In some embodiments, users preferably provide a direct contact delivery system to spray diluent into the intake oxidant containing fluid as taught in the '191 patent application.

E.g. to cool and/or filter the intake air. These preferably provide, lower filter pressure drops and lower pumping work than the relevant art. They provide direct contact Cooling Air flow. Such improved filtering is preferably sized and operated to reduce compressor fouling, reduce compressor cleaning maintenance, improve compressor efficiency and reduce life cycle costs.

Reduced Turbine Fouling

By reducing the oxidant intake flows by about 67% to 72% or more, users reduce the degree of turbine fouling caused by entrainment of particulates in the intake oxidant flows relative to ultra-lean combustion. This reduces the maintenance cleaning of turbine blades.

Compressor and Compression Cooling

With reference to FIG. 8, users preferably employ one or more measures to cool the oxidant containing fluid being compressed. Similar cooling measures in multiple locations before and/or within the compressor train are taught in FIG. 84 of the '191 patent applications. Such cooling provides "quasi-isothermal" compression and reduces the work of compression. The cooling is preferably before, within and/or between compression stages. An after cooler may be utilized in some configurations.

Users preferably provide surface heat exchanges between the oxidant-containing fluid and a cooler diluent-containing or other coolant fluid as shown in FIG. 8 and FIG. 9. In some configurations, users preferably use one or more surface intercoolers as shown in the lower portion of FIG. 8. These help to improve system efficiency and improve flow density. These surface heat exchanger systems may nominally be sized at about ⅓ the size of intercoolers in lean combustion systems based on the smaller oxidant flows. With a single surface heater between lower and higher pressure compressors, users expect about a one to two percentage point increase in cycle efficiency. This is similar to the difference in efficiency between the HAWIT and HAT cycles. (See Traverso, 2001; and Traverso & Massardo 2002.) By providing such surface intercooling configurations, users expect intercooled VAST Steam Cycle configurations to have efficiencies near to the HAT cycle and to the Combined Cycle (see Table 5).

requires less expensive systems than the surface heat exchangers but does not give as high improvements in efficiency.

Figure 16:
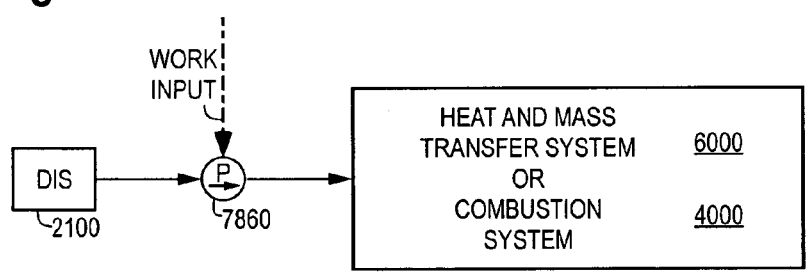
FIG. 16 is a diagram of the fuel-delivery system with simple fuel delivery.
Figure 17:
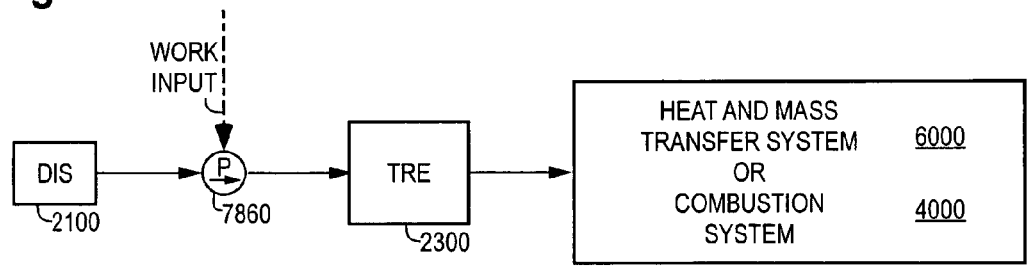
FIG. 17 is a diagram of the fuel-delivery system with fuel delivery and treatment.

In FIG. 2, FIG. 3, and FIG. 4, a single spray intercooler is shown schematically to represent diluent cooling as examples. Efforts to adjust the pressure ratio lambda between the first and second compressors to improve the efficiency or system cost are shown in Table 4. These suggest that the desired size of the low pressure compressor may range from about 1% of the combined cost of compressors for VAST-W at Beta of 60, to 38% for VAST-WS cycle at a Beta of 25, depending on the pressure and diluent cooling methods used to configure the particular embodiment of a VAST Cycle. Where only one diluent injection cooling flow is provided, in high pressure systems it is preferably configured into the first compressor stage (or between the first and second) to give the benefit of cooled fluid to all subsequent stages. With lower pressure configurations it may be configured about one third of the way along the system. Similarly diluent is preferably entrained into the compressor entrance using a direct contactor as shown in FIG. 16 of the '191 patent application.

More preferably, as depicted in FIG. 8, users provide spray intercooling for each compressor stage C1, C2 . . . CN. Users preferably control the fluid injection parameters to deliver about as much vaporizable diluent at each stage as may be evaporated within the next stage. The orifice diameters and fluid differential pressure across the orifices in the direct contactors are preferably adjusted to configure small liquid droplets that rapidly evaporate. The evaporation distance is preferably selected as about the stage to stage distance. Drop size is preferably selected to provide drops the move with the flow around the vanes and blades. Similarly they may be configured to be small enough to avoid significant impact erosion where the drops do impact the compressor components.

These evaluations preferably use the configuration methods taught in the Trifluid patent application and the '191 patent application to accommodate variations in the transverse distribution of the oxidant fluid velocity within the compressor. Heated diluent may be used to improve the vaporization rate while still providing cooling. In the last

TABLE 5

| | Heat Exchanger Surface Area (1300° C.) | | | | | | |
|---|---|---|---|---|---|---|---|
| | STIG | HAT | HAWIT | RWI | VAST-W | VAST-W | VAST-WS |
| Beta | 30 | 30 | 30 | 30 | 60 | 30 | 25 |
| | HX M^2 | HX M^2 | HX M^2 | HX M^2 | HX M^2 | HX M^2 | HX M^2 |
| REC | | 3,092.11 | 3,163.41 | 3,081.31 | | | |
| SH | 444.13 | | | | | | |
| EVA | 1,527.13 | | | | | | |
| ECO | 1,192.27 | 10,299.00 | 5,482.71 | 672.24 | 5469 | 5,827.45 | 3,882.26 |
| | | | | 301.88 | | | |
| FGC-Maffo | | | 2,840.28 | | | | |
| FGC-other | | | | | 3,400 | 2,115.87 | 3,687.10 |
| Total Area | 3,164 | 13,391 | 11,486 | 4,055 | 8,869 | 7,943 | 7,569 |
| Net Output (50 MWe) | 50 | 50 | 50 | 50 | 50 | 50 | 50 |
| Area/output (M^2/MWe) | 63 | 268 | 230 | 81 | 177 | 159 | 151 |

Figure 13:
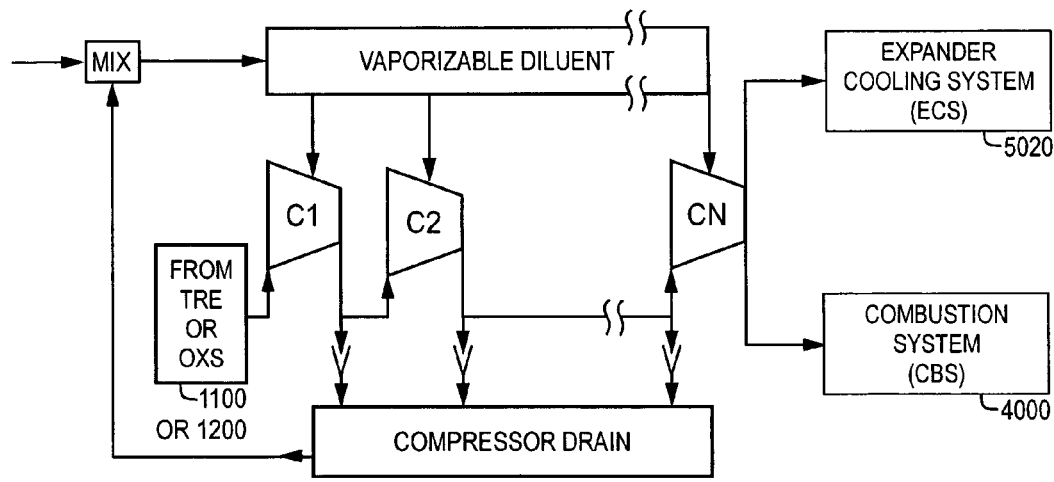
FIG. 13 shows further details of the compressor train with diluent injection into compressors.

With reference to FIG. 13, in some configurations users preferably inject liquid diluent-containing fluid directly into one or more locations in the compressor train. Such injection cools by evaporation and the latent heat absorbed. The vaporized diluent increases the volume of the flow. This method stage, the amount of fluid delivered may exceed the amount that can be evaporated by the exit of the compressor. The remaining fluid droplets will be smaller than droplets conventionally formed in sprays. These are preferably accounted for in configuring and controlling the combustor.

Care is preferably taken to see that the injected liquid evaporates fully in the oxidant-containing fluid stream. When shutting down the system, the compressor is preferably run without spray addition for a period of time to dry it out and reduce the probability of corrosion. As shown in FIG. 13, "overflow" drains may be provided within the compressor train where excess liquid diluent may fall out and collect within the compressor.

As shown in FIG. 10, users may use surface heat exchange 1900 and heat rejection to the environment F670 by means such as water or air cooling. More preferably, the heat from cooling is recovered in a coolant flow and recycled as shown in FIG. 8. With reference to FIG. 11, users may cool by direct injection of a vaporizable diluent-containing fluid F270 directly into the oxidant-containing fluid being F102 compressed using a direct contact heat exchanger 1700 to form a humidified compressed oxidant containing fluid F103. This direct contact heat exchanger preferably uses a direct contactor as taught in the '191 patent application. Some users use a combination of one or more of the means of cooling described above, as shown, for example, in FIG. 30.

VAST Steam Cycle (VAST-WS) with Expander Steam Cooling

In some configurations, users preferably use steam cooling of expander hot components and displace at least some and preferably all the excess air commonly used to cool blades. The excess air commonly used to cool expander hot section components such as turbine blades and vanes is often 10% to 18% of the flows through the turbine. Accordingly, in VAST cycles, providing steam cooling of blades enables users to reduce the size of the compressor by about 9% to 15% relative to air cooled systems.

VAST Steam Cycle with Expander Surface Steam Cooling Surface Intercooler(s)

In modified configurations, users preferably combine one or more surface intercoolers instead of steam mixing intercoolers and displace air cooling with steam cooling. The heated steam is preferably recovered from the expander hot sections and redirected upstream into the combustor. This reduces the cooling of the energetic fluid (working fluid) of conventional steam cooling. With such VAST Steam Cycle configurations, users expect about a three to four percentage point increase in efficiency relative to the VAST Steam Cycle with spray intercooling and using compressed air to cool turbine blades. e.g., users expect system efficiencies greater than 54% at 50 MW and 1300° C. with such VAST Steam Cycle configurations relative to about 51% without those measures with the component efficiency and parameter assumptions made by Traverso. i.e. about a 6% improvement in cycle efficiency for those configurations.

Diluent Supply System

Diluent Source

Thermal Diluent/Heater

Many embodiments preferably deliver fluid water through the direct contact distributors as the thermal diluent to cool the reacting fluids and constrain the temperature of the energetic fluid. Cooler components like electronic components may use liquid water to keep them cool. Others such as the evaporator boil water to form steam. The superheater heats the steam used to recover heat from the expanded energetic fluid.

Some embodiments recycle a portion of the carbon dioxide formed by the combustion, as a thermal diluent or a component of the diluent, to constrain the combustion temperature.

Conventional lean combustion power systems use excess air as thermal diluent. The present embodiments preferably displace most of the excess air used as thermal diluent to improve thermal efficiency. In some configurations, users may recirculate some combustion gases or spent gases exiting the diluent recovery system comprising nitrogen, carbon dioxide, water vapor and some excess oxygen as thermal diluent.

Some embodiments use a low vapor pressure natural or synthetic oil as the thermal diluent in one or more of the distributed direct contactors. Synthetic thermal fluids such as fluorocarbons are used in some configurations as desired or needed for their special properties by applications.

In some embodiments, distributed contactors may provide at least one cooled (or heated) reactant and/or product to the reacting components and mix them to constrain (or boost) the temperature. In particular some measures recirculate a portion of the spent or exhaust gas including at least a portion of the carbon dioxide, water vapor, nitrogen and/or associated noble gases. Such measures substantially simplify the product separation and purification system as well as the reactant recycling system.

Storage System

In some configurations, users preferably provide a storage system to buffer one or more flows of fuel (e.g. diesel #2), thermal diluent (e.g., supply water, treated water), or oxidant containing fluid, (e.g., compressed air, enriched air, and/or oxygen.) The storage system may include tanks, pipes, reservoirs and other related vessels. Tanks are preferably provided for treated and for untreated fluids.

In configurations providing net positive water balance but no water sales, users preferably reduce the size of the water supply storage tanks relative to conventional system configurations. E.g. they provide sufficient water to start up until a positive water balance is achieved, and/or to shut down a system after a positive water balance is no longer available. These measures significantly reduce the cost and footprint for the water supply system.

In configurations providing net positive water balance with water sales, users configure the size of the treated water supply storage tanks to buffer periods of peak demand relative to quieter periods or between water shipments. E.g., with diurnal demand or periodic tanker pickups.

Pump

Figure 14:
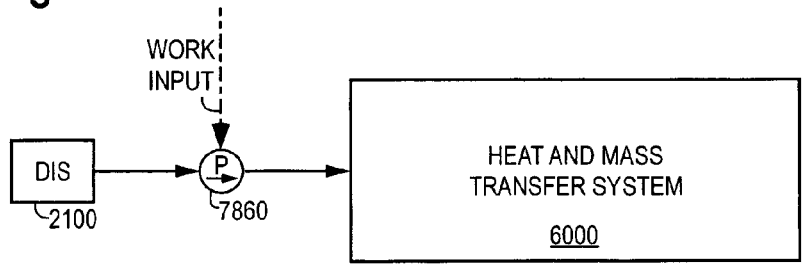
FIG. 14 is a diagram of the diluent-delivery system with simple diluent/coolant delivery.

In providing a diluent fluid to displace conventional gaseous thermal diluent, users preferably pump liquid thermal diluent into the Heat and Mass Transfer System 6000 within the energy conversion system. See, for example, FIG. 14. E.g. pumping in liquid water as thermal diluent and/or coolant to displace excess compressed air. Users preferably use high efficiency liquid pumps to pressurize the liquid diluent and deliver most or all of it into the oxidant containing fluid stream upstream of the turbine.

Users preferably pump at least some of the liquid diluent into one or more of the heat recovery components. E.g one or more of the economizer, evaporator, super-heater and recuperator. Users thence duct the heated diluent into the oxidant containing fluid flow or energetic fluid flow, usually upstream of the turbine. In some configurations, users provide the thermal diluent to the turbine blades, vanes and walls.

Users preferably size the liquid diluent pump(s) to provide the highest pressure needed to deliver it into the highest pressure location for the highest volume. E.g., the highest pressure ratio for the energetic fluid in the combustor plus the excess or differential pressure needed to deliver the diluent through the direct fluid contactors, plus sufficient to overcome the pressure losses between the pump(s) and the combustor.

Diluent Treatment System

Thermal Diluent Filtration

Figure 15:
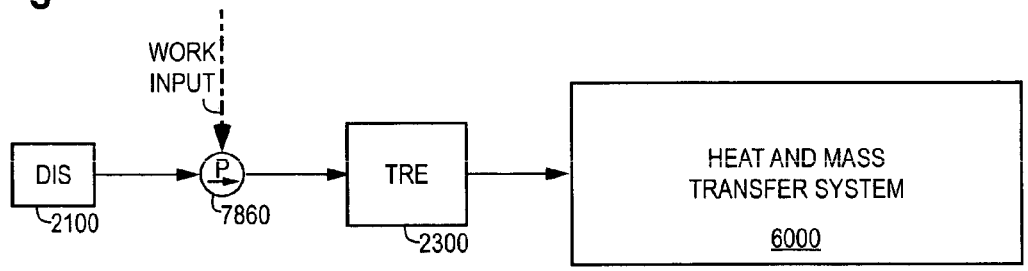
FIG. 15 is a diagram of the diluent-delivery system with diluent/coolant delivery with treatment.

With reference to FIG. 2, and FIG. 15, users preferably provide a fluid Treatment System (TRE) 2300 to treat thermal diluent before it is used in the energy-conversion system. For example, users preferably provide filters to remove particulates from thermal diluent pumped into the system as desired.

Where the VAST Cycles are configured with Trifluid Combustors, diluent spray into the oxidant containing fluid or other application of direct contactors, care is preferably taken to filter particulates from fluids that will be injected through distributed direct fluid contactor tubes, as taught in the '191 patent application, and in the Trifluid reactor patent application.

Users preferably provide maximum orifice filters in the fluid treatment sections, to remove particulates from the thermal diluent (e.g., water) larger than a desired size, that are capable of clogging the distributed contactor orifices, to a desired high probability. Such particulate removal benefits the system by removing components from the thermal diluent that could foul the turbine (e.g., suspended particulates in water.) This improves average turbine efficiency and availability, and reduces maintenance and repair costs.

Thermal Diluent Treatment

To preserve the service life of hot gas path parts, gas turbine manufacturers commonly prescribe limitations on contamination in the hot gas path to preserve their warranties. Similar values are recommended to constrain hot path corrosion.

Of most concern are trace metal contaminants, primarily vanadium, sodium, potassium, lead, and calcium. These contaminants can produce corrosive products of combustion. e.g., sodium sulfate, sodium vanadates, and vanadium pentoxide. Limits on these metals (typically in the 0.5-2 ppm range) are typically prescribed for each potential source of contaminates—air, water, and fuel.

With normal air filtration and proper operation to provide minimal carryover from inlet air or evaporative coolers, air sources are small and are typically within such prescribed concentration limits except in harsh environments. Natural gas sources in regulated markets are not known to contain these trace elements in quantities sufficient to be of concern. Thus with filtered air and natural gas, such contaminants are typically not of major concern for VAST Cycles.

Liquid fuels from most sources do contain high enough levels of contaminants to be of concern, particularly of vanadium. Thus liquid fuel treatment to reduce the trace elements to prescribed levels is typically included to assist in meet these contamination levels, regardless of recovery and reuse of diluent. For cycles such as the STIG and HAT cycles where more diluent is used than is recovered, ongoing treatment of both makeup water and recovered diluent may be required continuously.

Diluent Treatment in VAST Cycles

In most VAST Cycles, the system is preferably configured and operated to recover more diluent than is delivered into the oxidant and energetic fluid flows upstream of the expander 5100 exit. This eliminates the need for makeup water in most circumstances. VAST Cycles may recover more water than is desired to be recycled, generating makeup water to replenish other water losses. (Some makeup may be needed in situations where high water losses in leaky users heat applications exceeds the VAST Cycle excess water recovery capabilities.)

With clean fuels such as natural gas, and well filtered air intake, further treatment of the recovered and reused diluent appears unnecessary in typical VAST Cycles (See Table 6). This conclusion is based upon applying one gas turbine manufacturer's published contaminant limits and assuming all gas path contaminants from all sources end up in the recovered diluent (a very conservative assumption.). The general formula used to estimate the flows is:

$$(A/F)X_a + (W/F)X_w + X_f < Table\ 1\ limit$$

Where $X_a$, $X_W$, $X_f$ are the contamination limits for air, water, and fuel respectively, and W is the injected water flow and A, F are the air and fuel flows.

The results show that using natural gas, there is sufficient excess diluent produced by combustion and recovered to dilute the intake contaminant concentration enough that the recommended gas path contaminant limits are not exceeded. Thus no further diluent treatment to decrease contaminants may be needed in some embodiments beyond the concentration control by excess water discharge or "blowdown".

TABLE 6

VAST-W CYCLE WATER TREATMENT WITH SURFACE CONDENSOR

| | | | |
|---|---|---|---|
| Air flow (A) | 41.6 | kg/s | |
| Fuel (F) | 2.199 | kg/s | |
| Injection Water (W) | 15.33 | kg/s | |
| Recycled water | 17.88 | kg/s | |
| Air concentration limit; Xa | 5 | ppb | Assume per GEK 101944, GEI-41047 |
| VAST A/F ratio | 18.92 | | Lower than GE assumes @ 50 |
| Ξ (A/F + 1)/51 = | 0.391 | | Correction factor for GEK 101944 Table 2, A/F not 50 |
| Trace metals Xf = | 0 | | Assume nothing in gas; limits for trace metals applicable to liquid fuels. |
| Ca Xf = | 0 | | Assume nothing in gas; limits for trace metals applicable to liquid fuels. |

| Constituent | Limits* ppb | Xw limits ppb | Xa ppb | Total ppb | Recycled water ppb | Comment |
|---|---|---|---|---|---|---|
| Na + K | 1000 | 42.5 | 5.0 | 859 | 48.0 | |
| Pb | 1000 | 42.5 | 5.0 | 859 | 48.0 | |
| V | 500 | 14.4 | 5.0 | 429 | 24.0 | V improbable in air |
| Ca | 2000 | 98.5 | 5.0 | 1718 | 96.1 | |

TABLE 6-continued

VAST-W CYCLE WATER TREATMENT WITH SURFACE CONDENSOR

| | | |
|---|---|---|
| Ξ (A/F + 1)/51 = | 1.00 | Set to 1, no Correction factor for GEK 101944 Table 2, A/F not 50 |
| Trace metals Xf = | 0 | Assume nothing in gas; limits for trace metals applicable to liquid fuels. |
| Ca Xf = | 0 | Assume nothing in gas; limits for trace metals applicable to liquid fuels. |

| Constituent | Limits* ppb | Xw limits ppb | Xa ppb | Total Ppb | Condensate ppb | Comment |
|---|---|---|---|---|---|---|
| Na + K | 1000 | 130 | 5.0 | 2199.0 | 123.0 | |
| Pb | 1000 | 130 | 5.0 | 2199.0 | 123.0 | |
| V | 500 | 58 | 5.0 | 1099.5 | 61.5 | V improbable in air |
| Ca | 2000 | 273 | 5.0 | 4398.0 | 246.0 | |

*GEK 101944 Table 2

Where liquid fuels (or gas fuels) with sufficient contaminants (See Table 7) are used or where highly contaminated inlet air conditions exist, treatment of the recovered diluent may be desired to reduce flows to the desired levels. Mixed bed demineralizers may be used as the treatment of choice to remove the contaminants. Regeneration rates would be correspondingly low due to the low contamination levels.

TABLE 7

VAST-W CYCLE WATER TREATMENT WITH
SURFACE CONDENSOR - LIQUID FUEL
Converted to low HV liquid fuel

| | | | | |
|---|---|---|---|---|
| Air flow (A) | 41.6 kg/s | F | LHV gas kJ/kg | HV liquid kJ/kg |
| Liquid Fuel (F) | 2.29 kg/s | 2.20 | 44,237.44 | 42,498.05 |
| Injection Water (W) | 15.33 kg/s | | | 1 kcal = 4.187 kJ |
| Recycled water | 17.88 kg/s | | | |
| Air concentration limit; Xa | 5 ppb | Assume per GEK 101944 | | |
| VAST A/F | 18.9 | Much lower than GE assumes | | |
| Ξ (A/F + 1)/51 | 0.39 | Correction factor for GEK 101944 Table 2, A/F not 50 | | |
| Total Xw | 500 ppb | Per FIG. 22, GER 3428 | | |
| Trace metals Xf | 1000 ppb | Per FIG. 22, GER 3428 | | |
| Ca Xf | 10000 ppb | Per FIG. 22, GER 3429 | | |

| Constituent | Limits ppb | Xf limits ppb | Xa ppb | Xw ppb | Condensate ppb |
|---|---|---|---|---|---|
| Na + K | 1000 | 299 | 5.0 | 0.05 | 50.0 |
| Pb | 1000 | 299 | 5.0 | 0.05 | 50.0 |
| V | 500 | 104 | 5.0 | 0.05 | 025.0 |
| Ca | 10000 | 3814 | 5.0 | 0.05 | 500.0 |

| | | |
|---|---|---|
| (A/F + 1)/51 = | 1.00 | Set to 1, no Correction factor for GEK 101944 Table 2, A/F not 50 |

| Constituent | Limits* ppb | Xf limits ppb | Xa ppb | Xw ppb | Condensate ppb |
|---|---|---|---|---|---|
| Na + K | 1000 | 909 | 5.0 | 0.05 | 128.0 |
| Pb | 1000 | 909 | 5.0 | 0.05 | 128.0 |
| V | 0500 | 409 | 5.0 | 0.05 | 64.0 |
| Ca | 10000 | 9909 | 5.0 | 0.05 | 1280.2 |

*GEK 101944 Table 2; GER 3428 Table 22

In some embodiments, users more preferably provide "side-stream" treatment to treat just some of the diluent sufficient to control the contaminant levels. This provides a benefit of reducing the pumping work that would otherwise be required to push all the diluent through a treatment system. Excess diluent discharge plus side-stream treatment are preferable reduce diluent treatment costs.

Where the contaminant flows (or concentrations) delivered into the expander via recycled thermal diluent are substantial and life cycle costs can be reduced by reducing the concentrations or where such reductions in contaminant flows (or concentrations) are required, users preferably provide further treatment of the diluent in the treatment system 2300 to reduce those contaminants in some configurations.

Similarly, when treated water is desired or needed, it is preferable to treat the excess diluent flows formed to reduce these concentrations to the levels desired or needed. In some situations, the excess water available may be purified and sold for revenue, turning water treatment from a cost into an income generation source.

Water treatment such as by mixed-bed demineralizers may be used. Other types of treatment such as reverse osmosis and other types of demineralizers may be used where the chemistry is suitable. These treatment methods remove chemicals that are incompatible with the components into which it will be injected. e.g. the turbine hot path components which may include one or more of the turbine blades, turbine vanes and shroud.

Users preferably filter the condensed diluent through one or more filters to reduce the particulate load. They preferably use a uniform orifice filter sized smaller than the orifices in the distributed contactors to prevent the diluent particulates from contaminating those orifices.

Coarse filters can be duplex type such that filter media can be cleaned or replaced on-line when other filter in the duplex arrangement is used. Automatic backwash filters media filters down to 100 microns may be used in an embodiment.

Fine filters may be used on some embodiments to filter particulates greater than about 10 microns. These filters may include media filters such as sand and anthracite.

In some configurations, users preferably reduce the CO2 concentration in the diluent condensate prior to subsequent pH treatment. Users preferably provide a recompressor and pull the pressure after the condensor down to sub-ambient pressures as needed or desired to reduce carbon dioxide in the diluent and/or to improve system thermoeconomics. In some configurations, the recompressor provided with the VAST Cycles provide sufficient carbon dioxide stripping in itself.

Some of the acid gases formed dissolve and are recovered with the condensed thermal diluent. E.g. some portion of nitrogen dioxide, sulfur dioxide and carbon dioxide etc. The enhanced temperature control in VAST Cycle combustors significantly reduce the concentrations of the nitrogen oxides and carbon monoxide formed during combustion (NOx and the CO) compared to conventional relevant art, and similar to levels of catalyzed combustion.

In VAST Cycle configurations providing a net positive water balance, the concentration of these acidic components contaminants will come to equilibrium in proportion to the amounts formed divided by the amount of water discharged. Users preferably configure system from components sufficiently acid resistant to operate with these acid component concentrations.

In systems requiring acidic treatment, users preferably provide ion exchange membranes or similar acid treatment system, sized as needed to treat the acidic flows. Users expect to size the recycled diluent treatment systems significantly smaller and less expensively than conventional systems because of the lower contaminants formed and because a portion are discharged with the excess water formed.

Corresponding to smaller treatment requirements and smaller treatment equipment, users expect to spend significantly less to treat and recycle condensate than in conventional relevant art "wet" cycles. Almost all external makeup water requirements are eliminated in most configurations.

Combustion System

Combustion Chamber

With reference to FIG. 21 and for descriptions of preferred VAST combustor and temperature control methods, see the '191 patent application and the Trifluid patent application.

Combustor Exit/Turbine Inlet Temperature

With reference to FIG. 1, users preferably use the Diluent Delivery System 2000 to provide treated diluent to the combustor to control the temperature of the energetic fluid. The diluent is preferably utilized within the Heat and Mass Transfer system to cool components and recover heat from within the energy conversion system before being delivered to the combustor. The life of turbine blades reportedly is doubled or halved when the energetic fluid temperature is reduced or increased by about 10K (18° F.). Yet the uncertainty in temperature measurement in the relevant art is about +/−10K at typical turbine inlet temperatures of about 1300° C.

The VAST cycle preferably uses a combustor operable to more accurately control the magnitude of the Combustor Exit or Turbine Inlet Temperature (TIT).

Users preferably configure the combustor with high accuracy fluid control especially over the diluent flows. They preferably provide a Ginter VAST combustor, or more preferably and Trifluid VAST combustor as taught in the Trifluid patent application and in the '191 patent application.

For example, the VAST Trifluid combustor disclosed in the Trifluid Patent Application is preferably used as providing substantially more accurate control over the fuel containing fluid and diluent containing fluid, especially when these are liquid. Similarly the VAST combustor provides substantially more accurate control over the ratio of oxidant to fuel by monitoring the residual oxidant concentration while operating near stoichiometric conditions.

As described therein and herein, users preferably configure the combustor and control the thermal diluent flows to provide one or more of the following benefits:

Turbine Inlet Temperature Magnitude

Reduced uncertainty

Turbine Inlet Temperature Distribution

Reduced distribution/"profile factor"

Reduced or eliminated liner cooling

Reduced Uncertainty in temperature distribution

Higher Mean Temperature

Reduced Transverse Distribution of Temperature Uncertainty

With this preferred combustor and the fluid control measure provided, users preferably obtain substantially improved fluid flow control, and thus improved uncertainty in temperature control the energetic fluid. More particularly, the Trifluid combustor controls the transverse distribution of fluid delivery. Accordingly, users can configure and control the transverse distribution of temperature within the energetic fluid. This provides substantial improvement in the uncertainty of controlling the magnitude and location peak temperature of the energetic fluid. The Trifluid combustor further improves control of the temporal variations in fluid flow and thus in the energetic fluid temperature. These features provide both spatially and temporally reduced uncertainty in temperature control. They further achieve a transverse distribution of uncertainty across the energetic fluid.

Higher Transverse Temperature Distribution

Users preferably control the spatially peak temperature of the energetic fluid to a less than or equal to a desired peak temperature within a desired probability. This desired peak temperature is preferably prescribed as the desired peak temperature of the expander hot section components less one or more standard deviations of the spatial peak temperature within the energetic fluid according to the desired probability that this temperature not be exceeded.

In a similar fashion, users preferably configure and control the transverse temperature distribution in the energetic fluid to be offset from the desired transverse distribution of temperature entering the expander. E.g., the temperature profile across the turbine blade from hub to tip. The transverse distribution of temperature in the energetic fluid is further preferably configured as the desired transverse distribution of expander inlet temperature less the desired multiplier times the spatially local uncertainty in the transverse distribution of the temperature uncertainty.

By achieving a lower transverse distribution of uncertainty across the expander entrance, users preferably configure a higher allowable transverse distribution of temperature in the energetic fluid entering the expander. With such a higher transverse distribution of temperature, they achieve a higher mean temperature in the energetic fluid compared to the relevant art which has higher uncertainties in temperature control spatially and temporally. This higher mean temperature provides a higher thermodynamic efficiency in the energy conversion system.

Combustor Cooling System

Cool to warm cooling fluid is preferably used to first cool thermally sensitive components. With reference to FIG. 19, surface heat exchangers are preferably used in the Heat and Mass Transfer System 6000 to withdraw heat from thermally sensitive heated components. For example, a coolant is preferably ducted pas the pressure vessel surrounding the combustion chamber as taught in the Trifluid patent application. To help recover the heat, insulation may be provided to reduce heat loss to ambient conditions. E.g. to surround the combustor cooling system with insulation as depicted in FIG. 19. Users preferably design the pressure vessel cooling system to maintain the temperature of the pressure vessel below about 533 K (about 260° C. or 500° F.) to utilize less expensive pressure vessel components that comply with common ASME standards.

Users then preferably use direct fluid contactors to deliver the heated water as the thermal diluent into the combustion chamber 4100. This significantly reduces the thermal losses from the combustor.

Users preferably provide a combustor wall or "liner" capable of handling the constrained combustion provided by the VAST cycle operating near stoichiometric combustion together with added thermal diluent cooling, such as taught in the Trifluid reactor patent application and in the '191 patent application. Users, may additionally provide an liner cooling system to additionally cool the combustor liner and recover this high grade heat, such as shown in FIG. 21. The oxidant fluid(s) F160, fuel F320, Liquid diluent F276, and vaporized diluent F275 are usually provided to the combustor, the fuel is burnt, and an energetic fluid F405 is formed. Cooler fluids are ducted into the cooling system around the combustor to control the wall temperatures where desired. They are recovered as hotter fluids such as superheated steam. The thermal diluent so heated in the combustor walls is preferably delivered upstream into the combustor to provide more uniform temperature profiles.

Users preferably eliminate delivering excess oxidant containing fluid delivered as thermal diluent or coolant through the combustor liner walls. (e.g., compressed air and/or steam.) This provides the benefit of improving the temperature distribution across the combustor by not cooling the energetic gas with such liner cooling thermal diluent. (i.e., more uniform temperature profile, or the "Profile Factor" closer to unity.) Improving the "Profile Factor" in turn improves the system thermal efficiency.

In modified configurations, users provide thermal diluent to cool the walls of the combustor liner as desired or needed in some configurations. Further detail for such combustor cooling systems are provided in the Trifluid patent application, with particular reference to FIG. 28 and FIG. 30, and in the '191 patent application. The combustor liner is preferably located within a pressure vessel, so the pressure of the liner coolant need only be sufficient to deliver the diluent through the liner. For example steam may be used with internally lined coolant ducts to protect high temperature metals. Otherwise high temperature ceramics may be used.

In some embodiments radiation shields in the combustion system may be configured to remove heat from the combustion system to keep the system cool.

Where needed or desired, users preferably provide thermal diluent to cool the walls of the combustor-turbine transition zone in some configurations similar to the methods to cool the combustion chamber liner. The resulting heated diluent is preferably delivered upstream into the combustor to provide more uniform temperature profiles and recover this heat rather than dilute and cool the energetic fluid.

Fuel Delivery System
Fuel Source
Fluid Fuels, & Diluents/Heaters

VAST Cycle embodiments preferably utilize embodiments of Trifluid combustors capable of using at least one of a wide variety of fluid fuels or fluidized fuels as taught in the Trifluid patent application and in the '191 patent application, and as follows. Some embodiments preferably provide for multiple fuels selected from both liquid, and gaseous fuels. E.g., natural gas and diesel fuel. This reduces economic risks from fluctuations in fuel price or availability. Other configurations may use multiple liquid fuels. Trifluid combustors may improve dynamic performance using liquid fuels.

Some embodiments provide for mixing more than one fuel to reduce costs associated with delivery and mixing fuels of differing heating values to reduce costs of one or more parameters of costs of fuel, delivery, and storage, cost of fuel treatment, and cost to mitigate such affects as polymerization.

Figure 26:
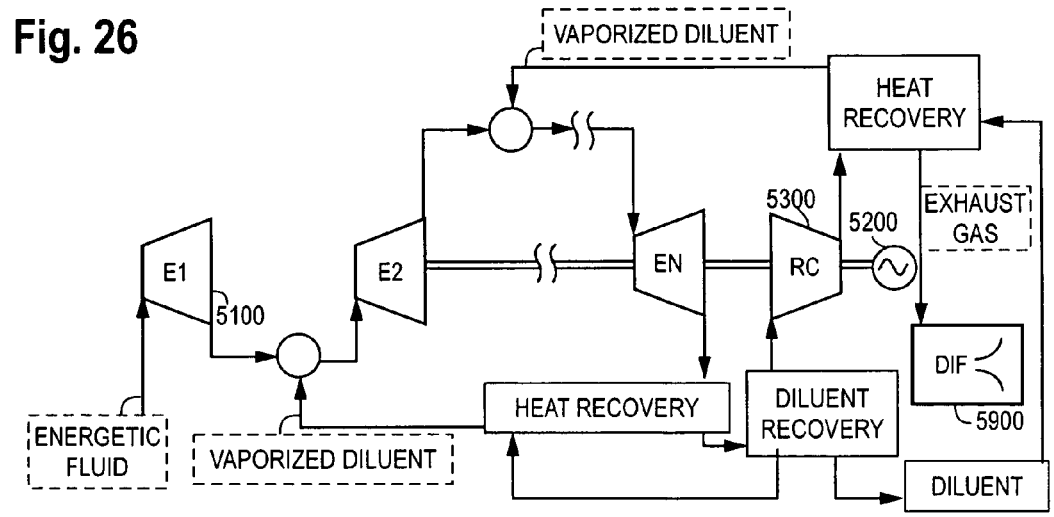
FIG. 26 is a schematic diagram of the expansion system with interstage steam injection, diluent recovery and recompression, and steam injection.

Pumps, compressors, and control valves are selectively used to provide flow and required pressure as desired for the combustion system. (See FIG. 26.) (Note that in some cases, some pumps or compressors may be reduced or eliminated where the external fuel supply pressure is adequate, such as from a pipeline or tank.)

Fuel Types

Some embodiments of the invention may use one or more of a wide variety of liquid fuels. For example:

Liquid petroleum fuels and distillate fuels, including aviation fuel, gasoline, kerosene, diesel fuels, fuel oils, bunker oil, crude oils, tar sand oils, shale oils, heavy fossil liquids, coal derived fuels, and liquefied natural gas (LNG).

Vegetable oils, including palm oil, coconut oil, soybean oil, rape seed oil, canola oil, and peanut oil.

Esters of such vegetable oils.

Pyrolysis fuels formed by heating biomass or fossil hydrocarbons.

Oxygenated fuels, including methanol, ethanol, and MTBE.

Non-carbon liquid fuels, including liquid hydrogen, liquid ammonia.

Some embodiments of the invention may use one or more of a wide variety of gaseous fuels. For example:

Most fossil or petroleum based gas including natural gas, coal bed methane, propane, and butane.

Producer gas or synthesis gas made by gasifying fossil fuels with air, oxygen enriched air or oxygen, including coal, tar sands, and heavy fuels, including varying quantities of carbon monoxide and hydrogen, with varying additional portions of methane and other hydrocarbons, and optionally residual unreacted fuels and/or diluents including nitrogen and carbon dioxide.

Producer gas or synthesis gas from gasifying biomass in air, oxygen enriched air or oxygen.

Hydrogen, or other non-carbon gaseous fuel etc.

Biogas or other gases emitted from biomass.

Fuel With Water

Some embodiments provide fluid water with one or more of the fuels. For example:

Oxygenated fuels such as ethanol and methanol which dissolve water.

Fuel water emulsions, including water emulsified with any of the above liquid fuels, optionally with emulsifiers or surfactants, e.g., "Orimulsion"®

Water mixed with a fuel, including water droplets within fuel, and fuel droplets within water.

Gaseous fuel mixed with water mist, water vapor or steam.

Mixtures of the above fuels.

Suspended Solid Fuels

Some embodiments preferably suspend, entrain or fluidize solid fuel particles with the oxidant containing fluid. For example:

Any finely comminuted coal entrained or fluidized in air or fluid fuel including pulverized brown coal, bituminous coal dust, anthracite coal dust Any finely comminuted biomass entrained or fluidized in air or fluid fuel including sawdust, wood dust, activated carbon dust, flour, rice husks, comminuted corn components, etc.

Fuel Treatment System

With reference to FIG. 4, users preferably provide fuel treatment equipment to treat fuel and prepare it for use in the energy-conversion system.

Fuel Filtration

As described in '191 patent application and in the Trifluid patent application, users preferably provide filters to remove particulates from the fluid fuel supplied. They preferably provide maximum orifice filters that remove particulates capable of clogging the distributed contactor orifices, to a desired probability. E.g., uniform filters with orifices sized about ⅔ the orifice size in the perforated direct contactors. Such particulate removal benefits the system by removing fuel components that could foul the turbine. This improves average turbine efficiency and availability, and reduces maintenance and repair costs. Fuel may be washed to remove salts.

In modified embodiments, users may heat the fuel to improve performance. For liquid fuels, preheating to a selected temperature range may reduce deleterious effects of polymerization and coking. For gaseous fuels adding heat can eliminate entrained moisture that could harm the fuel-delivery system or the combustion system components. Heat may be added from one or more of the following: energetic fluid, expanded fluid, compressed oxidant fluid, heated diluent fluid, or heated coolant fluid. The fuel may be heated using internally heated components such as the generator.

Figure 23:
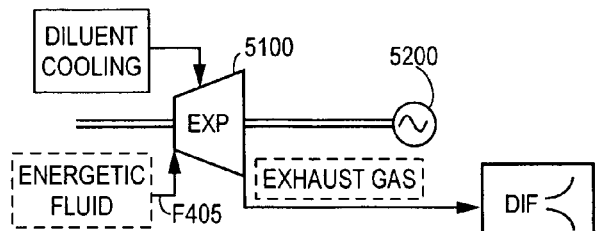
FIG. 23 is a schematic diagram of single expander expansion system with diluent injection for cooling.

Expansion System
Turbine
Turbine Expansion Ratio

Where mechanical energy or electrical energy is desired, users preferably deliver energetic fluid to an expander, and expand the energetic fluid from a higher pressure to a lower pressure. They may use some of the mechanical energy produced to drive a generator, and then exhaust the expanded fluid to a diffuser (or stack). (See e.g., FIG. 23.)

Figure 24:
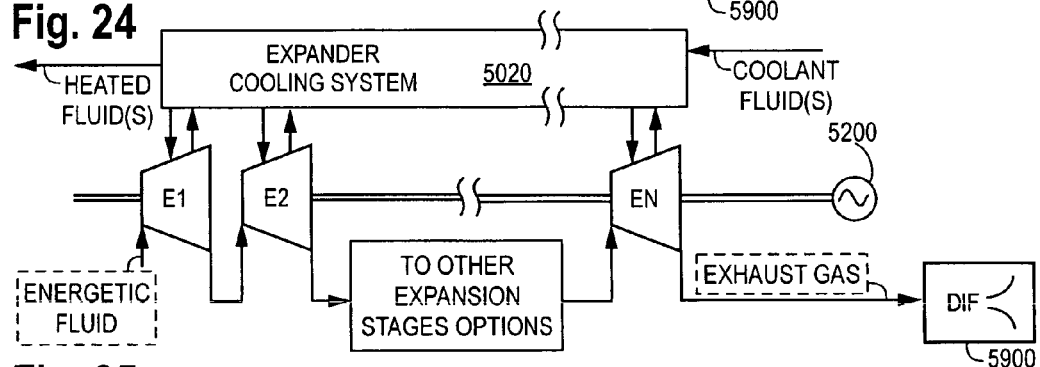
FIG. 24 is a schematic diagram of a multiple expander expansion system with an expander cooling system using surface heat exchange and heat recovery.

In larger systems, users preferably expand the energetic fluid through several expansion stages in series as depicted in FIG. 24.

With reference to FIG. 20, users preferable cool one or more or the hot components in the expansion stages of the expander using diluent delivered by the heat and mass transfer system 6000. For example one or more stages of turbine vanes, turbine blades the turbine shroud and turbine hub.

Figure 25:
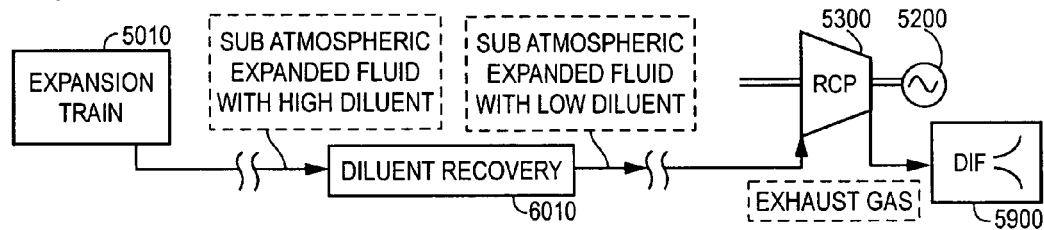
FIG. 25 is a schematic diagram of the expansion system with expansion to sub-atmospheric pressure, diluent recovery and recompression.

With reference to FIG. 8 and FIG. 25, in some embodiments, users preferably combine one or more compressors before the combustor with a recompressor after an expander and condenser. By doing so, they preferably achieve a net Turbine Expansion Ratio (Beta turbine) that is the product of the one or more compressor pressure ratios prior to the turbine (Beta lpc, Beta hpc), times the recompressor pressure ratio (Beta rec), less the effect of pressure losses between intake and exit. By this method, they achieve net turbine expansion ratios that are substantially higher than conventional pressure ratios between the combustor and ambient conditions.

By providing a recompressor with the VAST-WS Cycle, this gross Turbine Expansion Ratio is preferably configured from about 37 at a total oxidant compression ratio Beta of about 10 to about 102.8 at an oxidant compression ratio Beta of about 44. Thus, the addition of the recompressor substantially increases the total Turbine Expansion Ratio without the use of ultra high pressure components. It further enables compression at lower temperatures.

This overall turbine expansion ratio appears to vary approximately with the desired inlet oxidant compression ratio. More preferably, the recompression ratio is configured from about 3.7 at a compressor ratio of about 10, to about 2.3 at a compressor ratio of about 44.

Figure 51:
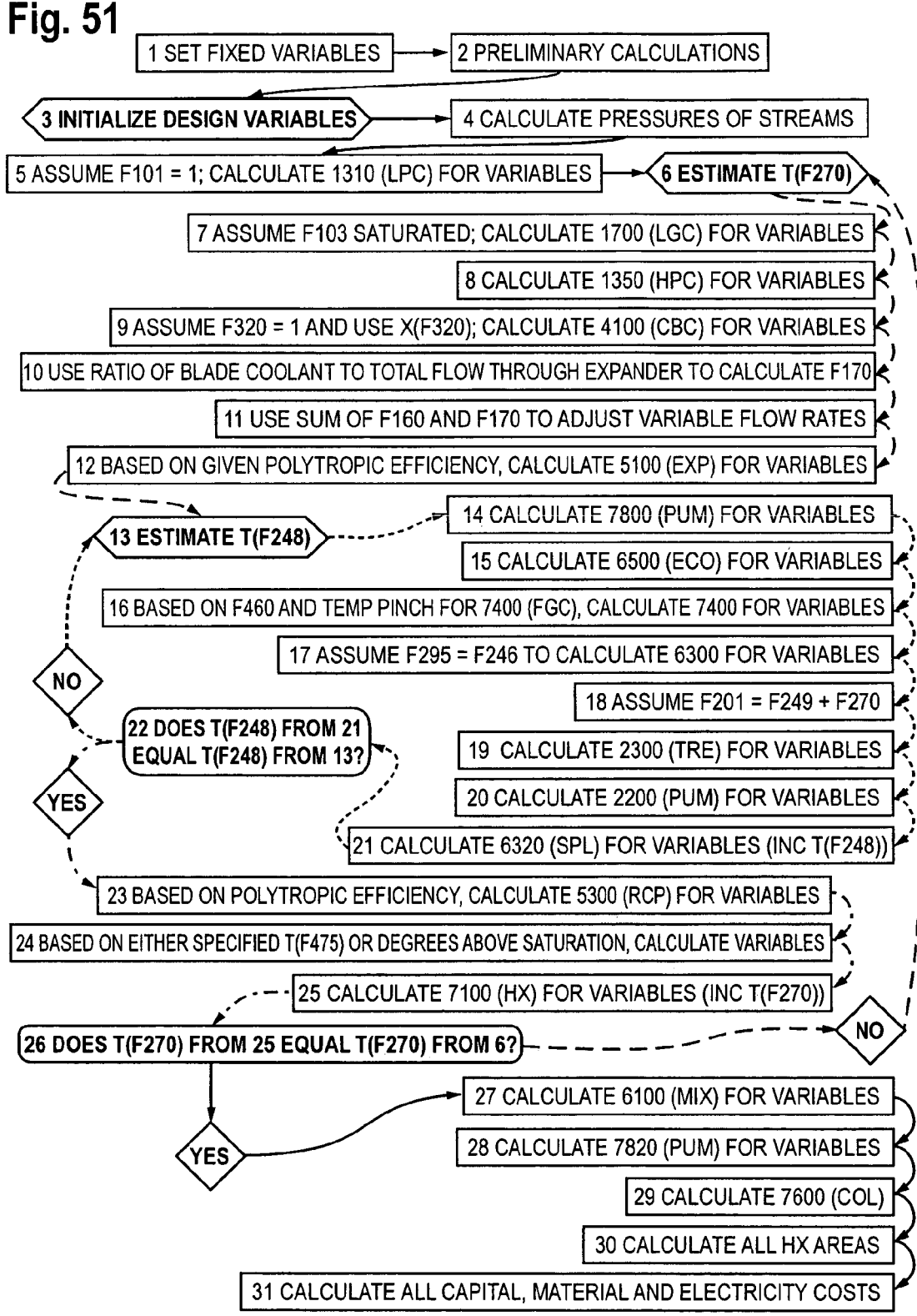
FIG. 51 is a flow diagram of the configuration method for the VAST-Water thermodynamic cycle configuration.

Users preferably configure the overall gross Turbine Expansion Ratio (Beta turbine) to help achieve the desired or improved performance with a VAST Steam Cycle (VAST-WS). Table 8, Table 9, and Table 10 show a configuration (the method of configurations is shown in Table 11 and FIG. 51) of a VAST Water Cycle (VAST-W) at a total oxidant compression ratio of about 30. The VAST-W cycle is more preferably adjusted to about a pressure ratio of about 60 (see Table 12, Table 13, and Table 14) to provide a configuration near the optimum economic return for about a 50 MW industrial turbine with about the mean USA industrial gas and electricity costs in 2000, assuming the parameters selected by Traverso and Massardo to compare the other wet cycles. The recompressor is preferably configured with a pressure ratio of about 1.71 to give a combined net turbine expansion ratio of about 102.5.

TABLE 8

Equipment Parameters Assumed & Calculated for VAST-Water Cycle (VAST-W) (30)

| | | Specified | | | Calculated | | |
|---|---|---|---|---|---|---|---|
| Part# | Label | Poly. Eff. | T. Pinch °C. | Other | Isen. Eff. | Effectiven. | Surface A m2 | Q Transf. kW |
| 1310 | LPC | 0.924 | | | 0.9144 | | | |
| 1700 | LGC | | | Saturation = 100% | | | | |
| 1350 | HPC | 0.924 | | | 0.8947 | | | |
| 4100 | CBC | | | Excess Air = 1.05 | | | | |
| 5100 | EXP | 0.8607 | | Mech. Eff. = 0.98 | 0.9121 | | | |
| | | | | Expander coolant to total flow = 0.1128 | | | | |
| 6500 | ECO | | | Max is 3° C. below boiling | | 0.9668 | 5,827 | 18,265 |
| 7400 | FGC | | 5 | Saturation = 100% | | 0.9401 | 2,116 | 42,975 |
| 5300 | RCP | 0.924 | | | 0.9102 | | | |
| 5200 | GEN | | | Electrical Efficiency = 0.985 | | | | |
| 7100 | HX* | | | | | 0.9128 | 161 | 522 |
| 7600 | COL | | 10 | | | 0.72 | 2720 | 41206 |
| | ALL PUMPS | | | Hydraulic Efficiency = 0.83; Mechanical Efficiency = 0.90 | | | | |

E.g., for 50 MW, TIT = 1300° C., Beta = 30
*This is added for generalities but may be removed in this configuration.

TABLE 9

Compositions of Streams: VAST-Water Cycle (VAST-W) (30)

| First Occurrence | | CH4 | H2O (L) | H20(V) | N2 | CO2 | O2 | Streams |
|---|---|---|---|---|---|---|---|---|
| Input Air | Mole Frac. | | | *0.01* | *0.782* | *0* | *0.207* | 100, 101, 102 |
| | Mass Frac. | | | *0.006* | *0.762* | *0.001* | *0.231* | |
| After Inter-Cooler | Mole Frac. | | | *0.052* | *0.749* | *0* | *0.199* | 103, 160, 170 |
| | Mass Frac. | | | 0.033 | 0.742 | 0.001 | 0.225 | |
| Fuel | Mole Frac. | *0.93* | | | | *0.07* | | 320 |
| | Mass Frac. | *0.884* | | | | *0.116* | | |
| After Combustor | Mole Frac. | | | 0.48 | 0.457 | 0.057 | 0.006 | 405 |
| | Mass Frac. | | | 0.358 | 0.53 | 0.105 | 0.008 | |
| After Expander | | | | Not Available | | | | 420, 430 |
| After Surface Condenser | Mole Frac. | | | 0.148 | 0.736 | 0.079 | 0.037 | 460, 421, 475 |
| | Mass Frac. | | | 0.095 | 0.738 | 0.124 | 0.043 | |
| | Dew Point Temperature = 53.95° C. | | | | | | | |

E.g. for 50 MW, TIT = 1300° C., Beta = 30. Values in italics are assumed values
All Other Streams are Pure Liquid H2O

TABLE 10

Stream Values: VAST-Water Cycle (VAST-W) (30)

| Unit # | Name | Stream # | Mass Flow Kg/s | Temp ° C. | Press bar | PwrMe MW | PwrEl MW | Delta P | Delta Q |
|---|---|---|---|---|---|---|---|---|---|
| Input Streams | | | | | | | | | |
| 1100 | OXS | 100 | 42.51 | 15 | 1.01 | | | | |
| 2100 | DIS | 200 | 0 | 15 | 3 | | | | |
| 3100 | FUS | 320 | 2.25 | 25 | 41.88 | | | | |
| Equipment and Streams | | | | | | | | | |
| 1200 | TRE | 100 | 42.51 | 15 | 1.01 | | | | |
| | | 101 | 42.51 | 15 | 1 | | | 1% | |
| 1310 | LPC | 101 | 42.51 | 15 | 1 | | | | |
| | | 102 | 42.51 | 101.8 | 2.36 | | | | |
| | | 500 | 0 | 0 | 0 | −4 | | | |
| 1700 | LGC | 102 | 42.51 | 101.8 | 2.36 | | | | |
| | | 270 | 1.17 | 157.5 | 97 | | | | |
| | | 103 | 43.68 | 49.8 | 2.36 | | | | 1% |
| 1350 | HPC | 103 | 43.68 | 49.8 | 2.36 | | | | |
| | | 160 | 37.03 | 415.4 | 29.91 | | | | |
| | | 170 | 6.65 | 415.4 | 29.91 | | | | |
| | | 501 | 0 | 0 | 0 | −17 | | | |
| 4100 | CBC | 160 | 37.03 | 415.4 | 29.91 | | | | |
| | | 320 | 2.25 | 25 | 41.88 | | | | |
| | | 230 | 13.05 | 344.4 | 160 | | | | |
| | | 405 | 52.32 | 1300 | 29.01 | | | 3% | 1% |
| 5100 | EXP | 405 | 52.32 | 1300 | 29.01 | | | | |
| | | 170 | 6.65 | 415.4 | 29.91 | | | | |
| | | 420 | 58.98 | 354.4 | 0.29 | | | | |
| | | 580 | 0 | 0 | 0 | 80 | | | |
| 6500 | ECO | 420 | 58.98 | 354.4 | 0.29 | | | | |
| | | 430 | 58.98 | 124 | 0.29 | | | 2% | |
| | | 249 | 13.05 | 53.35 | 165 | | | | |
| | | 230 | 13.05 | 344.4 | 160 | | | 4% | 1% |
| 7400 | FGC | 430 | 58.98 | 124 | 0.29 | | | | |
| | | 460 | 44.25 | 30 | 0.29 | | | 2% | |
| | | 243 | 378.3 | 25.01 | 2.88 | | | | |
| | | 240 | 378.3 | 51.93 | 2.77 | | | 4% | |
| | | 244 | 14.73 | 30 | 0.29 | | | | 1% |
| 5300 | RCP | 460 | 44.25 | 30 | 0.29 | | | | |
| | | 421 | 44.25 | 167.5 | 1.03 | | | | |
| | | 531 | 0 | 0 | 0 | −7 | | | |
| 5200 | GEN | 530 | | | | 52 | 50 | | |
| 7100 | HX | 421 | 44.25 | 167.5 | 1.03 | | | | |
| | | 475 | 44.25 | 156.9 | 1.02 | | | 2% | |
| | | 247 | 0.25 | 70.93 | 100 | | | | |
| | | 270 | 1.17 | 157.5 | 97 | | | 4% | 1% |
| 5900 | STA | 475 | 44.25 | 156.9 | 1.02 | | | | |
| | | | 44.25 | 156.9 | 1.01 | | | 1% | |
| 7600 | COL | 242 | 378.3 | 51.08 | 3 | | | | |
| | | 243 | 378.3 | 25.01 | 2.88 | | | 4% | |

TABLE 10-continued

Stream Values: VAST-Water Cycle (VAST-W) (30)

| Unit # | Name | Stream # | Mass Flow Kg/s | Temp ° C. | Press bar | PwrMe MW | PwrEl MW | Delta P | Delta Q |
|---|---|---|---|---|---|---|---|---|---|
|  | PUM | CWIN | 374.5 | 15 | 1.01 |  |  |  |  |
|  |  | CWINP | 374.5 | 15.01 | 2 | −0.05 |  |  |  |
|  |  | CWOUT | 374.5 | 41.08 | 1.92 |  |  | 4% |  |
| 7820 | PUM | 246 | 378.3 | 51.08 | 2.77 |  |  |  |  |
|  |  | 242 | 378.3 | 51.08 | 3 | −0.009 |  |  |  |
| 6100 | MIX | 241 | 363.5 | 51.93 | 2.77 |  |  |  |  |
|  |  | 245 | 14.73 | 30.02 | 3 |  |  |  |  |
|  |  | 246 | 378.3 | 51.08 | 2.77 |  |  |  |  |
| 7810 | PUM | 244 | 14.73 | 30 | 0.29 |  |  |  |  |
|  |  | 245 | 14.73 | 30.02 | 3 | −0.005 |  |  |  |
| 6300 | SPL | 240 | 378.3 | 51.93 | 2.77 |  |  |  |  |
|  |  | 295 | 14.73 | 51.93 | 2.77 |  |  |  |  |
|  |  | 241 | 363.5 | 51.93 | 2.77 |  |  |  |  |
| 2300 | TRE | 295 | 14.73 | 51.93 | 2.77 |  |  |  |  |
|  |  | 201 | 14.22 | 51.93 | 2.65 |  |  | 4% |  |
| 2100 | DIS | 200 | 0 | 15 | 3 |  |  |  |  |
| 8500 | DWD | 290 | 0.51 | 51.93 | 2.77 |  |  |  |  |
| 2200 | PUM | 201 | 14.22 | 51.93 | 2.65 |  |  |  |  |
|  |  | 220 | 14.22 | 52.78 | 100 | −0.184 |  |  |  |
| 6320 | SPL | 220 | 14.22 | 52.78 | 100 |  |  |  |  |
|  |  | 248 | 13.05 | 52.78 | 100 |  |  |  |  |
|  |  | 247 | 1.17 | 52.78 | 100 |  |  |  |  |
| 7800 | PUM | 248 | 13.05 | 52.78 | 100 |  |  |  |  |
|  |  | 249 | 1.17 | 52.78 | 100 | −0.112 |  |  |  |
| NET ELECTRIC OUTPUT |  |  |  |  |  |  | 50 |  |  |

E.g. for 50 MW, TIT = 1300° C., Beta = 30. Values in bold are assumed values

TABLE 11

Computational Method for VAST-W (Beta = 30) and VAST-W (Beta = 60)

1   Set Fixed Variables: (Values shown are those for this actual configuration.)
        T(F100) = 15° C.      P(F100) = 1.01 bar    X(F100) = [See Composition Specifications]
        T(F200) = 15° C.      P(F200) = 3 bar
        T(F320) = 25° C.      For Beta = 30: P(F320) = 41.88 bar
                                      For Beta = 60: P(F320) = 83.96 bar
        X(F320) = [See Composition Specifications]
        Pressure Drops (Delta P) and Heat Losses (Delta Q) for all equipment shown in
        Stream Value Tables.
        Delta T Subcool in F275 = 3° C.
        T(Cooling Water) =
        15° C.
        Temp. Pinch in 7600 (COL) = 10° C.
        Polytropic Efficiency 1310 (LPC) = 0.9240
        Polytropic Efficiency 1350 (HPC) = 0.9240
        Polytropic Efficiency 5100 (EXP) = 0.8607
        Polytropic Efficiency 5300 (RCP) = 0.9240
        P(F275) = 160 bar
        T(F275) subcool = 3° C.
        Stream F103 is saturated with H2O
        Ratio of Actual O2 Over Stoichiometric = 1.05
        T(F405) = 1300° C.
        Ratio of blade coolant to total flow in expander = 0.1067
        Mechanical Efficiency of Expander 5100 (EXP) = 0.98
        Temp. Pinch in 7400 (FGC) = 5° C.
        Steam F460 (Gas stream leaving FGC) is saturated.
        Electrical Efficiency of Generator 5200 (GEN) = 0.985
        Hydraulic Efficiency of all pumps = 0.83
        Mechanical Efficiency of all pumps = 0.9
        For Beta = 30: T(F475) = 156.90
        For Beta = 60: T(F475) = 82.55
        For Beta = 30: Take the pressure ratio over the two compressors to be 30
2   Preliminary Calculations
        Calculate 1200 (TRE) to give X(F101), P(F101) and T(F101)
        Calculate T(F275) based on subcooled amount.
        T(F244) = T(Cooling Water) + Temp Pinch in 7600 (COL)
3   Initialize Design Variables: (Values shown = Chosen Values)
        For Beta = 30: P(F102) = 2.36 bar                                    P(F420) = 0.29 bar
        For Beta = 60: P(F102) = 1.22 bar        P(F160) = 59.97 bar    P(F420) = 0.62 bar TABLE 11-continued Computational Method for VAST-W (Beta = 30) and VAST-W (Beta = 60)

| | | |
|---|---|---|
| 4 | Calculate pressures of all streams from the assumed Pressures, Delta P's and the design variables. | |
| 5 | Assume a basis of F101 = 1 kg/sec, and based on X(F101) calculate 1310 (LPC) to give W500, F102 and T(F102). | |
| 6 | Guess T(F270) (Final value after iteration: | For Beta = 30: T(F270) = 157.50 |
| | | For Beta = 60: T(F270) = 72.59° C.) |
| | (Note: Because of the small value of F270, the calculation is not very sensitive to this value) | |
| 7 | Assume Stream F103 is saturated and calculate 1700 (LGC) to give F270, F103, X(F103) and T(F103). | |
| 8 | Calculate 1350 (HPC) to give F160, T(F160), W501 and T(F170) | |
| 9 | Assume as a basis of F320 = 1 kg/sec. fuel. Based on X(F320), the assumed ratio of excess O2 and T(F405) Calculate 4100 (CBC) to give the actual F160, F405, X(F405) | |
| 10 | Based on the ratio of blade coolant to total flow through expander, calculate F170. | |
| 11 | Based on the sum of F160 and F170, adjust F103, F102, F270, F101. F100 = F101 | |
| 12 | Based on specified polytropic efficiency, calculate 5100 (EXP) to give F420 and T(F420). | |
| 13 | Guess T(F248) (Final value after iteration: | For Beta = 30: T(F248) = 52.78 |
| | | For Beta = 60: T(F248) = 70.93° C.) |
| 14 | Calculate 7800 (PUM) to give F249, T(F249) | |
| 15 | Calculate 6500 (ECO) to give F430, T(F430) | |
| 16 | Based on Saturated Stream F460 and temp. pinch for 7400 (FGC), calculate 7400 to give T(F460), F460, X(F460), F244, F240, T(F240), F246, T(F246). | |
| 17 | Take F295 = F246 and calculate 6300 to give T(F295), F241, T(F241) | |
| 18 | Take F201 = F249 + F270. | |
| 19 | Calculate 2300 (TRE) to give F200 or (F290 and T(F290)) | |
| 20 | Calculate 2200 (PUM) to give F220, T(F220) | |
| 21 | Calculate 6320 (SPL) to give T(F248), F255, T(F255) | |
| 22 | Does T(F248) match the assumed T(F248) in Step 13? If not, adjust T(F248) and repeat from Step 13. If so, continue. | |
| 23 | Based on its polytropic efficiency, calculate 5300 (RCP) to give F421 and T(F421). | |
| 24 | Based either on a specified T475 or a specification of a number of degrees above saturation, calculate T475 and Q(7100) | |
| 25 | Calculate HX(7100) to give F270 and T(F270) | |
| 26 | Does T(F270) match the assume T(F270) in Step 6? If not adjust T(F270) and repeat from Step 6. If so, continue. | |
| 27 | Calculate 6100 (MIX) to give F242, T(F242) | |
| 28 | Calculate 7820 (PUM) to give F243, T(F243) | |
| 29 | Calculate 7600 (COL) | |
| 30 | Calculate all heat exchanger areas. | |
| 31 | Calculate all capital costs and material costs and the value of electricity produced. | |

TABLE 12

Equipment Parameters Assumed & Calculated: VAST Water Cycle (VAST-W) (60)

| | | Specified | | | Calculated | | |
|---|---|---|---|---|---|---|---|
| | | | | | | Surface | |
| Number | Label | Poly. Eff. | T Pinch °C. | Other | Isen. Eff. | Effectiven. | A m2 | Q Transf. kW |
| 1310 | LPC | 0.924 | | | 0.9219 | | | |
| 1700 | LGC | | | Saturation = 100% | | | | |
| 1350 | HPC | 0.924 | | | 0.8779 | | | |
| 4100 | CBC | | | Lambda A/F rel = 1.05 | | | | |
| 5100 | EXP | 0.8607 | | Mech. Eff. = 0.98 Expander coolant to total flow = 0.1067 | 0.9114 | | | |
| 6500 | ECO | | | Max T set to 3° C. below boiling | | 0.9013 | 5,469 | 21,224 |
| 7400 | FGC | | 5 | Saturation = 100% | | 0.9380 | 3,400 | 53,738 |
| 5300 | RCP | 0.924 | | | 0.9183 | | | |
| 5200 | GEN | | | Electrical Efficiency = 0.985 | | | | |

TABLE 12-continued

Equipment Parameters Assumed & Calculated: VAST Water Cycle (VAST-W) (60)

| | | Specified | | | Calculated | | |
|---|---|---|---|---|---|---|---|
| Number | Label | Poly. Eff. | T Pinch °C. | Other | Isen. Eff. | Effectiven. | Surface A m2 | Q Transf. kW |
| 7100 | HX* | | | | | 0.1418 | 1.92 | 1.66 |
| 7600 | COL | | 10 | | | | | |
| | ALL PUMPS | | | Hydraulic Efficiency = 0.83; Mechanical Efficiency = 0.90 | | | | |

E.g. For Beta = 60, TIT = 1300° C. (~Opt IRR)

*This is added for generalities but in this configuration may be removed.

TABLE 13

Compositions of Streams: VAST-Water Cycle (VAST-W) (60)

| First Occurrence | | CH4 | H2O (L) | H20(V) | N2 | CO2 | O2 | Streams |
|---|---|---|---|---|---|---|---|---|
| Input Air | Mole Frac. | | | 0.01 | 0.782 | 0 | 0.207 | 100, 101, 102 |
| | Mass Frac. | | | 0.006 | 0.762 | 0.001 | 0.231 | |
| After Inter-Cooler | Mole Frac. | | | 0.019 | 0.775 | 0 | 0.206 | 103, 160, 170 |
| | Mass Frac. | | | 0.012 | 0.758 | 0.001 | 0.23 | |
| Fuel | Mole Frac. | 0.93 | | | 0.07 | | | 320 |
| | Mass Frac. | 0.884 | | | 0.116 | | | |
| After Combustor | Mole Frac. | | | 0.508 | 0.432 | 0.054 | 0.005 | 405 |
| | Mass Frac. | | | 0.384 | 0.508 | 0.1 | 0.007 | |
| After Expander | | | | Not Available | | | | 420, 430 |
| After Surface | Mole Frac. | | | 0.07 | 0.803 | 0.086 | 0.041 | 460, 421, 475 |
| Condenser | Mass Frac. | | | 0.044 | 0.78 | 0.131 | 0.045 | |
| | Dew Point Temperature = 39.36° C. | | | | | | | |

E.g. For Beta = 60, TIT = 1300° C. (~Opt IRR)
All Other Streams are Pure Liquid H2O

TABLE 14

Stream Values: VAST-Water Cycle (VAST-W) (60)

| Unit # | Name | Stream # | Mass Flow kg/s | Temp °C. | Press bar | PwrMe MW | PwrEl MW | Delta P | Delta Q |
|---|---|---|---|---|---|---|---|---|---|
| Input Streams | | | | | | | | | |
| 1100 | OXS | 100 | 42.39 | 15 | 1.01 | | | | |
| 2100 | DIS | 200 | 0 | 15 | 3 | | | | |
| 3100 | FUS | 320 | 2.24 | 25 | 83.96 | | | | |
| Equipment and Streams | | | | | | | | | |
| 1200 | TRE | 100 | 42.39 | 15 | 1.01 | | | | |
| | | 101 | 42.39 | 15 | 1 | | | 1% | |
| 1310 | LPC | 101 | 42.39 | 15 | 1 | | | | |
| | | 102 | 42.39 | 32.67 | 1.22 | | | | |
| | | 500 | 0 | 0 | 0 | −0.76 | | | |
| 1700 | LGC | 102 | 42.39 | 32.67 | 1.22 | | | | |
| | | 270 | 0.25 | 72.59 | 97 | | | | |
| | | 103 | 42.64 | 19.86 | 1.22 | | | 1% | |
| 1350 | HPC | 103 | 42.64 | 19.86 | 1.22 | | | | |
| | | 160 | 36.15 | 653.8 | 59.97 | | | | |
| | | 170 | 6.5 | 653.8 | 59.97 | | | | |
| | | 501 | 0 | 0 | 0 | −29 | | | |
| 4100 | CBC | 160 | 36.15 | 653.8 | 59.97 | | | | |
| | | 320 | 2.24 | 25 | 83.96 | | | | |
| | | 230 | 16.04 | 344.4 | 160 | | | | |
| | | 405 | 54.42 | 1300 | 58.17 | | | 3% | 1% |
| 5100 | EXP | 405 | 54.42 | 1300 | 58.17 | | | | |
| | | 170 | 6.5 | 653.8 | 59.97 | | | | |
| | | 420 | 60.92 | 374.2 | 0.62 | | | | |
| | | 580 | 0 | 0 | 0 | 84 | | | |

TABLE 14-continued

Stream Values: VAST-Water Cycle (VAST-W) (60)

| Unit # | Name | Stream # | Mass Flow kg/s | Temp °C. | Press bar | PwrMe MW | PwrEl MW | Delta P | Delta Q |
|---|---|---|---|---|---|---|---|---|---|
| 6500 | ECO | 420 | 60.92 | 374.2 | 0.62 | | | | |
| | | 430 | 60.92 | 120.1 | 0.61 | | | 2% | |
| | | 249 | 16.04 | 71.58 | 165 | | | | |
| | | 230 | 16.04 | 344.4 | 160 | | | 4% | 1% |
| 7400 | FGC | 430 | 60.92 | 120.1 | 0.61 | | | | |
| | | 460 | 41.76 | 30 | 0.6 | | | 2% | |
| | | 243 | 283.1 | 25.01 | 2.88 | | | | |
| | | 240 | 283.1 | 69.96 | 2.77 | | | 4% | |
| | | 244 | 19.16 | 30 | 0.6 | | | | 1% |
| 5300 | RCP | 460 | 41.76 | 30 | 0.6 | | | | |
| | | 421 | 41.76 | 82.59 | 1.03 | | | | |
| | | 531 | 0 | 0 | 0 | −2.3 | | | |
| 5200 | GEN | 530 | | | | 52.2 | 50.4 | | |
| 7100 | HX | 421 | 41.76 | 82.59 | 1.03 | | | | |
| | | 475 | 41.76 | 82.55 | 1.02 | | | 2% | |
| | | 247 | 0.25 | 70.93 | 100 | | | | |
| | | 270 | 0.25 | 72.59 | 97 | | | 4% | 1% |
| 5900 | STA | 475 | 41.76 | 82.55 | 1.02 | | | | |
| | | | 41.76 | 82.55 | 1.01 | | | 1% | |
| 7600 | COL | 242 | 283.1 | 67.27 | 3 | | | | |
| | | 243 | 283.1 | 25 | 2.88 | | | 4% | |
| | PUM | CWIN | 280.4 | 15 | 1.01 | | | | |
| | | CWINP | 280.4 | 15 | 2 | | −0.04 | | |
| | | CWOUT | 280.4 | 57.27 | 1.92 | | | 4% | |
| 7820 | PUM | 246 | 283.1 | 67.26 | 2.77 | | | | |
| | | 242 | 283.1 | 67.27 | 3 | | −0.01 | | |
| 6100 | MIX | 241 | 263.9 | 69.96 | 2.77 | | | | |
| | | 245 | 19.16 | 30.02 | 3 | | | | |
| | | 246 | 283.1 | 67.26 | 2.77 | | | | |
| 7810 | PUM | 244 | 19.16 | 30 | 0.6 | | | | |
| | | 245 | 19.16 | 30.02 | 3 | | −0.01 | | |
| 6300 | SPL | 240 | 283.1 | 69.96 | 2.77 | | | | |
| | | 295 | 19.16 | 69.96 | 2.77 | | | | |
| | | 241 | 263.9 | 69.96 | 2.77 | | | | |
| 2300 | TRE | 295 | 19.16 | 69.96 | 2.77 | | | | |
| | | 201 | 16.28 | 69.97 | 2.65 | | | 4% | |
| 2100 | DIS | 200 | 0 | 15 | 3 | | | | |
| 8500 | DWD | 290 | 2.88 | 69.96 | 2.77 | | | | |
| 2200 | PUM | 201 | 16.28 | 69.97 | 2.65 | | | | |
| | | 220 | 16.28 | 70.93 | 100 | | −0.21 | | |
| 6320 | SPL | 220 | 16.28 | 70.93 | 100 | | | | |
| | | 248 | 16.04 | 70.93 | 100 | | | | |
| | | 247 | 0.25 | 70.93 | 100 | | | | |
| 7800 | PUM | 248 | 16.04 | 70.93 | 100 | | | | |
| | | 249 | 16.04 | 71.58 | 165 | | −0.14 | | |
| NET ELECTRIC OUTPUT | | | | | | | 50 | | |

Figure 52:
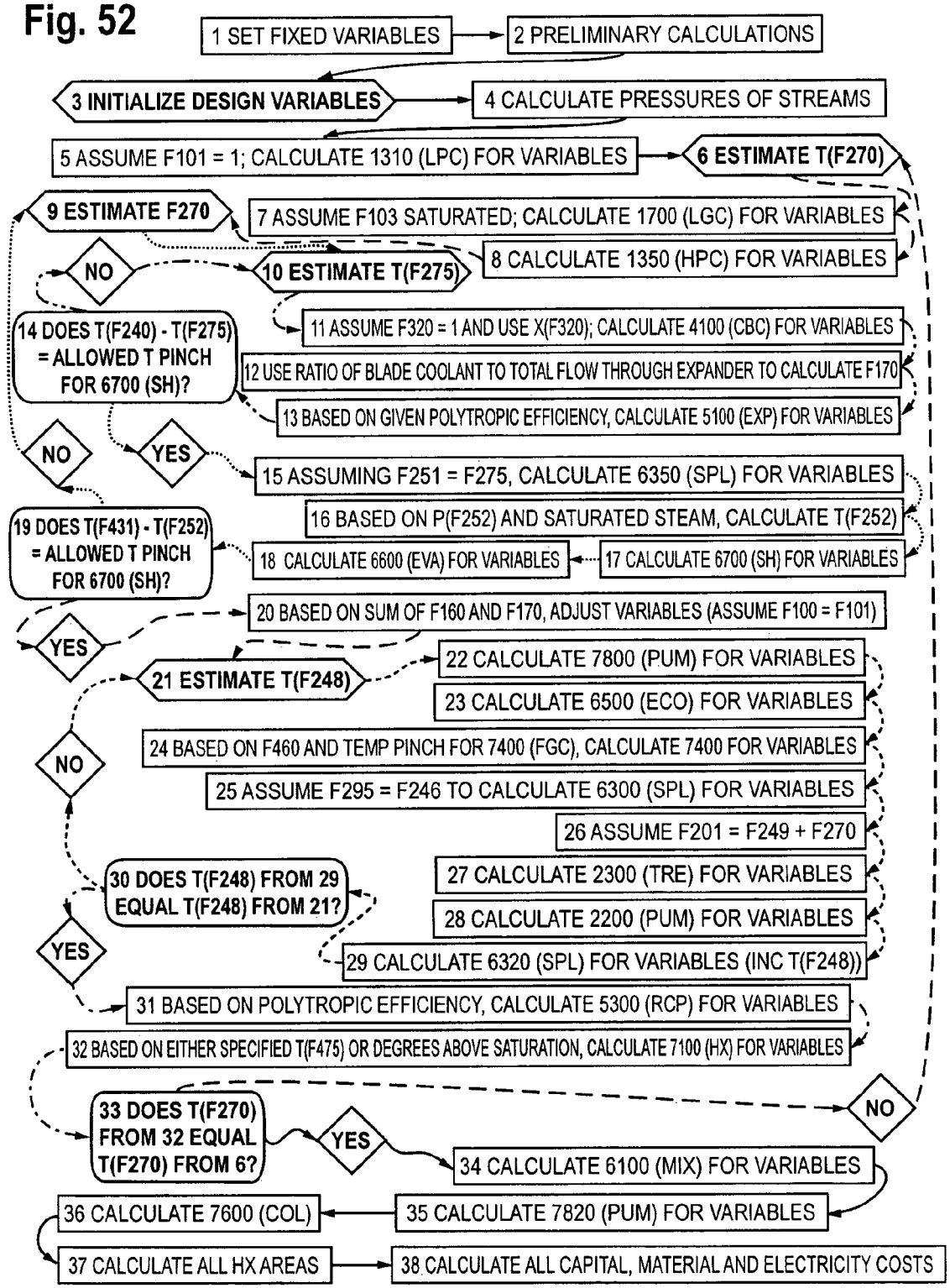
FIG. 52 is a flow diagram of the configuration method for the VAST-Water thermodynamic cycle configuration.

E.g. For Beta = 60, TIT = 1300° C. (~Opt IRR).
Values in bold are assumed values This Turbine Expansion Ratio (Beta turbine) is preferably selected to be about 76.1 for a VAST-WS cycle with a combined intake compressor pressure ratio of about 30. With a VAST Steam cycle (VAST-WS), the combined pressure ratio is more preferably adjusted to about 25 to improve economic performance to near optimum (the configuration of a VAST-WS at a compression ratio of 25 is shown in Table 15, Table 16, and Table 17 with the method of configuration in Table 18 and FIG. 52). The recompressor pressure ratio for this VAST-WS cycle is preferably selected at about 1.81 to give a combined net Turbine Expansion Ratio (Beta turbine) of about 46.1.

TABLE 15

Equipment Parameters: VAST-Water&Steam (VAST-WS)

| | | Specified | | | Calculated | | | |
|---|---|---|---|---|---|---|---|---|
| Number | Label | Poly. Eff. | T. Pinch °C. | Other | Isen. Eff. | Effectiven. | Surface A m2 | Q Transf. kW |
| 1310 | LPC | 0.924 | | | 0.9097 | | | |
| 1700 | LGC | | | Saturation = 100% | | | | |
| 1350 | HPC | 0.924 | | | 0.9016 | | | |
| 4100 | CBC | | | Excess Air = 1.05 | | | | |

TABLE 15-continued

Equipment Parameters: VAST-Water&Steam (VAST-WS)

| | | Specified | | | Calculated | | |
|---|---|---|---|---|---|---|---|
| Number | Label | Poly. Eff. | T. Pinch °C. | Other | Isen. Eff. | Effectiven. | Surface A m2 | Q Transf. kW |
| 5100 | EXP | 0.8607 | | Mech. Eff. = 0.98 Blade coolant to total flow = 0.1099 | 0.9029 | | | |
| 6700 | SH | | | T Pinch = 15K | | | | |
| 6600 | EVA | | | T Pinch = 5K | | | | |
| 6500 | ECO | | | Max is 3° C. below boiling | | 0.9321 | 3,882 | 9,755 |
| 7400 | FGC | | 5 | Saturation = 100% | | 0.9332 | 3,687 | 53,324 |
| 5300 | RCP | 0.924 | | | 0.9177 | | | |
| 5200 | GEN | | | Electrical Efficiency = 0.985 | | | | |
| 7100 | HX* | | | | | 0.5003 | 69 | 70 |
| 7600 | COL | | 10 | | | 0.8 | 3282 | 49726 |
| | ALL PUMPS | | | Hydraulic Efficiency = 0.83; Mechanical Efficiency = 0.9 | | | | |

E.g., 50 MW, TIT = 1300° C., Beta = 25 (~Opt IRR)

*This is added for generalities but may be removed in this configuration.

TABLE 16

Compositions of Streams: VAST-Water&Steam Cycle (VAST-WS)

| | First Occurrence | CH4 | H2O(L) | H2O(V) | N2 | CO2 | O2 | Streams |
|---|---|---|---|---|---|---|---|---|
| Input Air | Mole Frac. | | | 0.01 | 0.782 | 0 | 0.207 | 100, 101, 102 |
| | Mass Frac. | | | 0.006 | 0.762 | 0.001 | 0.231 | |
| After Inter-Cooler | Mole Frac. | | | 0.068 | 0.737 | 0 | 0.195 | 103, 160, 170 |
| | Mass Frac. | | | 0.043 | 0.734 | 0.001 | 0.222 | |
| Fuel | Mole Frac. | 0.93 | | | | 0.07 | | 320 |
| | Mass Frac. | 0.884 | | | | 0.116 | | |
| After Combustor | Mole Frac. | | | 0.508 | 0.433 | 0.054 | 0.005 | 405 |
| | Mass Frac. | | | 0.384 | 0.509 | 0.1 | 0.007 | |
| After Expander | | | | Not Available | | | | 420, 430, 431, 432 |
| After Surface | Mole Frac. | | | 0.074 | 0.8 | 0.085 | 0.041 | 460, 421, 475 |
| Condenser | Mass Frac. | | | 0.046 | 0.778 | 0.13 | 0.045 | |
| | Dew Point Temperature = 40.37° C. | | | | | | | |

E.g., 50 MW, TIT = 1300 C., Beta = 25 (~Opt IRR).
Values in italics are assumed values
All Other Streams are Pure Liquid H2O

TABLE 17

Stream Values: VAST-Water&Steam Cycle (VAST-WS) (25)

| Unit # | Name | Stream # | Mass Flow Kg/s | Temp °C. | Press bar | PwrMe MW | PwrEl MW | Delta P | Delta Q |
|---|---|---|---|---|---|---|---|---|---|
| Input Streams | | | | | | | | | |
| 1100 | OXS | 100 | 42.47 | 15 | 1.01 | | | | |
| 2100 | DIS | 200 | 0 | 15 | 3 | | | | |
| 3100 | FUS | 320 | 2.25 | 25 | 35.75 | | | | |
| Equipment and Streams | | | | | | | | | |
| 1200 | TRE | 100 | 42.47 | 15 | 1.01 | | | | |
| | | 101 | 42.47 | 15 | 1 | | | 1% | |
| 1310 | LPC | 101 | 42.47 | 15 | 1 | | | | |
| | | 102 | 42.47 | 151 | 3.54 | | | | |
| | | 500 | 0 | 0 | 0 | −6 | | | |
| 1700 | LGC | 102 | 42.47 | 151 | 3.54 | | | | |
| | | 270 | 1.65 | 78.3 | 9.7 | | | | |
| | | 103 | 44.13 | 64.1 | 3.54 | | | 1% | |
| 1350 | HPC | 103 | 44.13 | 64.1 | 3.54 | | | | |
| | | 160 | 37.41 | 336 | 25.53 | | | | |
| | | 170 | 6.72 | 336 | 25.53 | | | | |
| | | 501 | 0 | 0 | 0 | −13 | | | |

TABLE 17-continued

| Stream Values: VAST-Water&Steam Cycle (VAST-WS) (25) | | | | | | | | | |
|---|---|---|---|---|---|---|---|---|---|
| Unit # | Name | Stream # | Mass Flow Kg/s | Temp °C. | Press bar | PwrMe MW | PwrEl MW | Delta P | Delta Q |
| 4100 | CBC | 160 | 37.41 | 336 | 25.53 | | | | |
| | | 320 | 2.25 | 25 | 35.75 | | | | |
| | | 230 | 6.18 | 219 | 25.66 | | | | |
| | | 231 | 8.63 | 462 | 24.89 | | | | |
| | | 405 | 54.47 | 1300 | 24.77 | | | 3% | 1% |
| 5100 | EXP | 405 | 54.47 | 1300 | 24.77 | | | | |
| | | 170 | 6.72 | 336 | 25.53 | | | | |
| | | 420 | 61.19 | 477 | 0.59 | | | | |
| | | 580 | 0 | 0 | 0 | 73 | | | |
| 6700 | SH | 420 | 61.19 | 477 | 0.59 | | | | |
| | | 430 | 61.19 | 420 | 0.59 | | | 2% | |
| | | 252 | 8.63 | 225 | 25.66 | | | | |
| | | 231 | 8.63 | 462 | 24.89 | | | 2% | 1% |
| 6600 | EVA | 430 | 61.19 | 420 | 0.59 | | | | |
| | | 431 | 61.19 | 230 | 0.58 | | | 2% | |
| | | 251 | 8.63 | 219 | 25.66 | | | | |
| | | 252 | 8.63 | 225 | 25.66 | | | | 1% |
| 6350 | SPL | 250 | 14.81 | 219 | 25.66 | | | | |
| | | 230 | 6.18 | 219 | 25.66 | | | | |
| | | 251 | 8.63 | 219 | 25.66 | | | | |
| 6500 | ECO | 431 | 61.19 | 230 | 0.58 | | | | |
| | | 432 | 61.19 | 112 | 0.58 | | | 2% | |
| | | 249 | 14.81 | 68.5 | 26.46 | | | | |
| | | 250 | 14.81 | 219 | 25.66 | | | 4% | 1% |
| 7400 | FGC | 432 | 61.19 | 112 | 0.58 | | | | |
| | | 460 | 41.95 | 30 | 0.57 | | | 2% | |
| | | 243 | 292.3 | 25 | 2.88 | | | | |
| | | 240 | 292.3 | 68.2 | 2.77 | | | 4% | |
| | | 244 | 19.24 | 30 | 0.57 | | | | 1% |
| 5300 | RCP | 460 | 42 | 30 | 0.57 | | | | |
| | | 421 | 42 | 88.3 | 1.03 | | | | |
| | | 531 | 0 | 0 | 0 | −3 | | | |
| 5200 | GEN | 530 | | | | 52 | 50 | | |
| 7100 | HX | 421 | 42 | 88.3 | 1.03 | | | | |
| | | 475 | 42 | 86.7 | 1.02 | | | 2% | |
| | | 247 | 1.65 | 68.3 | 10 | | | | |
| | | 270 | 1.65 | 78.3 | 9.7 | | | 4% | 1% |
| 5900 | STA | 475 | 42 | 86.7 | 1.02 | | | | |
| | | | 42 | 86.7 | 1.01 | | | 1% | |
| 7600 | COL | 242 | 292 | 65.7 | 3 | | | | |
| | | 243 | 292 | 25 | 2.88 | | | 4% | |
| | PUM | CWIN | 290 | 15 | 1.01 | | | | |
| | | CWINP | 290 | 15 | 2 | | 0.039 | | |
| | | CWOUT | 290 | 55.7 | 1.92 | | | 4% | |
| 7820 | PUM | 246 | 292 | 65.7 | 2.77 | | | | |
| | | 242 | 292 | 65.7 | 3 | | 0.007 | | |
| 6100 | MIX | 241 | 273 | 68.2 | 2.77 | | | | |
| | | 245 | 19.2 | 30 | 3 | | | | |
| | | 246 | 292 | 65.7 | 2.77 | | | | |
| 7810 | PUM | 244 | 19.2 | 30 | 0.57 | | | | |
| | | 245 | 19.2 | 30 | 3 | | 0.006 | | |
| 6300 | SPL | 240 | 292 | 68.2 | 2.77 | | | | |
| | | 295 | 19.2 | 68.2 | 2.77 | | | | |
| | | 241 | 273 | 68.2 | 2.77 | | | | |
| 2300 | TRE | 295 | 19.2 | 68.2 | 2.77 | | | | |
| | | 201 | 16.5 | 68.2 | 2.65 | | | 4% | |
| 2100 | DIS | 200 | 0 | 15 | 3 | | | | |
| 8500 | DWD | 290 | 2.77 | 68.2 | 2.77 | | | | |
| 2200 | PUM | 201 | 16.5 | 68.2 | 2.65 | | | | |
| | | 220 | 16.5 | 68.3 | 10 | | 0.016 | | |
| 6320 | SPL | 220 | 16.5 | 68.3 | 10 | | | | |
| | | 248 | 14.8 | 68.3 | 10 | | | | |
| | | 247 | 1.65 | 68.3 | 10 | | | | |
| 7800 | PUM | 248 | 14.8 | 68.3 | 10 | | | | |
| | | 249 | 14.8 | 68.5 | 26.46 | | 0.033 | | |
| NET ELECTRICAL OUTPUT | | | | | | | 50.0 | | |

E.g., 50 MW, TIT = 1300 C., Beta = 25 (~Opt IRR).
Values in bold are assumed values

TABLE 18

| Computational Method for VAST-W&S (Beta = 25) |
| --- |

1. Set Fixed Variables: (Values shown are those for this actual configuration.)
   T(F100) = 15° C.    P(F100) = 1.01 bar    X(F100) = [See Composition Specifications]
   T(F200) = 15° C.    P(F200) = 3 bar
   T(F320) = 25° C.    P(F320) = 35.75 bar    X(F320) = [See Composition Specifications]
   Overall Pressure Ratio (Beta) = 25
   Pressure Drops (Delta P) and Heat Losses (Delta Q) for all equipment shown in Stream Value Tables.
   Delta T Subcool in Stream F276 = 3° C.
   T(Cooling Water) = 15° C.
   Temperature Pinch in 7600 (COL) = 10° C.
   Temperature Pinch in 6700 (SH) = 15° C.
   Temperature Pinch in 6600 (EVA) = 5° C.
   Temperature Pinch in 7400 (FGC) = 5° C.
   Polytropic Efficiency 1310 (LPC) = 0.9240
   Polytropic Efficiency 1350 (HPC) = 0.9240
   Polytropic Efficiency 5100 (EXP) = 0.8607
   Polytropic Efficiency 5300 (RCP) = 0.9240
   P(F276) = P(F160)
   T(F276) subcool = 3° C.
   Stream F103 (Gas stream leaving 1700 LGC) is saturated with H2O
   Stream F460 (Gas stream leaving 7400 FGC) is saturated with H2O
   Ratio of Actual O2 Over Stoichiometric = 1.05
   T(F405) = 1300° C.
   Ratio of blade coolant to total flow in expander = 0.1067
   Mechanical Efficiency of Expander 5100 (EXP) = 0.98
   Electrical Efficiency of Generator 5200 (GEN) = 0.985
   Hydraulic Efficiency of all pumps = 0.83
   Mechanical Efficiency of all pumps = 0.9
   T(F475) = 86.72
   Take the pressure ratio over the two compressors to be 25
2. Preliminary Calculations
   Calculate 1200 (TRE) to give X(F101), P(F101) and T(F101)
   Calculate T(F276) based on subcooled amount.
   T(F244) = T(Cooling Water) + Temp Pinch in 7600 (COL)
3. Initialize Design Variables: (Values shown = Chosen Values)
   P(F102) = 3.54 bar    P(F420) = 0.59 bar
   4. Calculate pressures of all streams from the assumed Beta, Delta P's and the design variables.
   5. Assume a basis of F101 = 1 kg/sec, and based on X(F101) calculate 1310 (LPC) to give W500, F102 and T(F102).
   6. Guess T(F270) (Final value after iteration: = 219.30° C.)
      (Note: Because of the small value of F270, the calculation is not very sensitive to this value)
      7. Assume Stream F103 is saturated and calculate 1700 (LGC) to give F270, F103, X(F103) and T(F103).
      8. Calculate 1350 (HPC) to give F160, T(F160), W501 and T(F170)
      9. Guess F270 (Final value after iteration = 6.18 kg/sec.)
         10. Guess T(F275) (Final value after iteration = 461.70° C.)
             11. Assume as a basis of F320 = 1 kg/sec. fuel. Based on X(F320), the assumed ratio of excess O2 and T(F405) Calculate 4100 (CBC) to give the actual F160, F275, F405, X(F405)
             12. Based on the ratio of blade coolant to total flow through expander, calculate F170.
             13. Based on specified polytropic efficiency, calculate 5100 (EXP) to give F420 and T(F420).
         14. Check on whether or not T(F420) – T(F275) = Allowed T Pinch for 6700 SH. If not, adjust T(F275) and repeat from Step 10. If so, continue
         15. Taking F251 = F275, calculate 6350 SPL to give T(F251), F250, T(F250)
         16. Based on P(F252), and assuming saturated steam, calculate T(F252)
         17. Calculate 6700 SH to give F430, T(F430)
         18. Calculate 6600 EVA to give F431, T(F431)
      19. Check on whether or not T(F431) – T(F252) = Allowed Temperature Pinch for 6700 SH. If not, adjust F270 and repeat from Step 9. If so, continue.
      20. Based on the sum of F160 and F170, adjust F103, F102, F270, F101. F100 = F101
      21. Guess T(F248) (Final value after iteration 68.29° C.)
         22. Calculate 7800 (PUM) to give F249, T(F249)
         23. Calculate 6500 (ECO) to give F430, T(F430)
         24. Based on Saturated Stream F460 and temp. pinch for 7400 FGC, calculate 7400 to give F460, T(F460), X(F460), F244, F240, T(F240), F246, T(F246).
         25. Take F295 = F246 and calculate 6300 SPL to give T(F295), F241, T(F241)
         26. Take F201 = F249 + F270.
         27. Calculate 2300 (TRE) to give F200 or (F290 and T290)
         28. Calculate 2200 (PUM) to give F220, T220
         29. Calculate 6320 (SPL) to give T(F248), F255, T(F255)

TABLE 18-continued

Computational Method for VAST-W&S (Beta = 25)

| | |
|---|---|
| 30 | Does T(F248) match the assumed T(F248) in Step 21? If not, adjust T(F248) and repeat from Step 21. If so, continue. |
| 31 | Based on its polytropic efficiency, calculate 5300 (RCP) to give F421 and T(F421). |
| 32 | Based either on a specified T(F475) or a specification of a number of degrees above saturation, calculate 7100 HX to give F270 and T(F270) |
| 33 | Does T(F270) match the assume T(F270) in Step 6? If not adjust T(F270) and repeat from Step 6. If so, continue. |
| 34 | Calculate 6100 (MIX) to give F242, T(F242) |
| 35 | Calculate 7820 (PUM) to give F243, T(F243) |
| 36 | Calculate 7600 (COL) |
| 37 | Calculate all heat exchanger areas. |
| 38 | Calculate all capital costs and material costs and the value of electricity produced. |

With reference to FIG. 39, with two or more compressors, the higher to lower pressure compressors may be varied to improve system performance.

Excess Water Injection Losses Vs Drag Losses

Drag pressure drops across one or more components and/or parasitic pumping losses reduce the effective oxidant compression ratio and then net turbine expansion ratio available to recover mechanical power. E.g. one or more of the intake diffuser, intake oxidant fluid filter, intake water entrainment spray, intra-compressor water spray, inter-compressor water spray, inter-compressor surface intercooler, diffuser, combustor components including the diffuser, fluid delivery and equilibration zone ("transition piece"), superheater, evaporator, economizer, preheater, condenser, cooler, and diffuser. To reduce pressure drop, users preferably configure a water spray oxidant intake filter such as taught in the '191 patent application. They also preferably configure a direct contact condenser to reduce pressure drop and improve thermal performance, such as taught in the '191 patent application.

Multi Axis Turbines

In some embodiments, users preferably configure a first compressor turbine and a first compressor on one shaft. They preferably position a power turbine and generator on a second shaft. Users preferably configure a recompressor on the first shaft together with the compressor turbine and the compressor. They preferably configure the combination together with a motor that can control the speed of the compressor-recompressor combination. In other configurations, the recompressor and motor may be configured on a separate shaft.

Such combinations provide flexibility in varying the compressor-turbine rotational speed and associated flow rates of oxidant containing fluid and combustion. Since it does not have to drive a compressor, the power turbine is preferably configured to provide the torque and speed desired for an application. E.g., it may be configured to deliver a very high torque at low speed applications. Similarly, the turbine and generator may operate at a fixed speed on a separate shaft proportional to the grid speed.

Rotational speed of at least one turbine may be varied up or down, to operate the turbine under more efficient parameters. For example the speed of the power turbine may be adjusted according to the desired output shaft speed. Similarly, the speed of the recompressor may be varied to control the net turbine expansion ratio.

In some configurations, users may provide an adjustable speed drive between the power turbine and the output drive shaft. This may accommodate most of the speed variation while keeping the turbine near its best efficiency for the desired power.

The power of the compressor turbine is preferably sized to the power required for the compressor. This may be about 65% to about 72% smaller than conventional lean combustion compressor turbines at 15% O2 exhaust concentration per compressed air flow rate. When users add the recompressor, the compressor turbine is preferably sized to the combined power drawn by the two compressors on, that first shaft.

In some embodiments, users preferably configure a second (low pressure) compressor turbine or electrical motor on a third shaft together with the inlet low pressure compressor. In such configurations, users preferably configure the recompressor on this third shaft while placing the high pressure compressor on the first shaft with the high pressure compressor turbine. The high pressure compressor turbine and low pressure compressor turbine or electrical motor are configured to the corresponding power required by the associated compressors. Users preferably use the power turbine on a separate second shaft either directly or with the generator.

Some embodiments connect a mechanical device to the turbine, with or without an intermediary drive. Mechanical device may consist of at least one vessel propeller, Cycle ReCompressor, and Cycle pump in addition to compressors.

Turbine Specific Net Power

In some embodiments, users preferably increase the net power per unit mass flow or "specific power" of the turbine expander. I.e., net turbine power kW per turbine mass flow (kg/s)=(kJ/s)/(kg/s)=(kJ/kg). By increasing the power that can be generated through the same turbine, the VAST cycle reduces the capital cost to generate a desired power. This becomes an increasingly large portion of the cost of power as the number of hours of use per year decrease. ($/kW, or the cost of energy, /kWh or $/MWh)

Users preferably configure the VAST Cycles to provide the following features and benefits in some configurations:

Increase Turbine Specific Power per Stage
Higher specific heat capacity
Higher specific enthalpy
Lower mass for given power rate
Higher power for given temperature, mass flow rate, pressure
Higher Peak Specific Power
Higher Turbine Expansion Ratio
Net Turbine Expansion Ratio In some embodiments, users preferably increase the turbine expansion ratio through which the energetic fluid is expanded. I.e., the ratio of the high pressure at the turbine inlet to the low pressure after the turbine exit.

In some configurations users replace most of the excess oxidant and compressed gaseous thermal diluent with a vaporizable diluent pumped in as a liquid. They preferably resize compressors and turbines accordingly as described herein. (e.g., displacing about 65% or more of compressed air by pumping in water.) This gives the benefit of a very substantial increase in the Net Turbine Power per Turbine mass Flow Rate of energetic fluid through the turbine or Net Specific Turbine Power (kW per kg/s flow or kJ/kg energetic fluid measured at the turbine inlet.) (See, for example, FIG. 41 and FIG. 48.) Correspondingly, this substantially increases the torque from the power turbine relative to the relevant art, especially at low speeds.

For example, with VAST Steam Cycle (VAST-WS), with steam and water heat recovery, the Net Turbine Power per Turbine mass flow the Net Turbine Power per turbine mass flow is about 843 kJ/kg (kW/kg/s), at an air pressure ratio Beta of about 30 (near the economic optimum), with the sample industrial 50 MW 1300° C. aeroderivative turbine. This ranges from about 791 kJ/kg at a air pressure ratio Beta of about 10 to about 852 kJ/kg at an air pressure ratio Beta of about 40.

Similarly, with VAST-W (VAST Water Cycle) with only water heat recovery, the Net Turbine Power per Turbine mass flow the Net Turbine Power per turbine mass flow is about 847 kJ/kg (kW/kg/s), at an air pressure ratio Beta of about 30 (near the industrial economic optimum), with the sample industrial 50 MW 1300° C. aeroderivative turbine. This ranges from about 764 kJ/kg at a air pressure ratio Beta of about 10 to a peak of about 851 kJ/kg at an air pressure ratio Beta of about 40. This net specific turbine power drops back to about 848 kJ/kg at a pressure ratio Beta of about 58.

In some embodiments, users preferably displace turbine blade air cooling with water or steam, or utilize no turbine blade cooling. The VAST Steam Cycle (VAST-WS) with steam and water heat recovery but no air cooling achieves a higher thermal diluent/oxidant flow (water/air) ratios of about 41% to about 44% for pressure ratios Beta of about 50 to about 10 respectively. Consequently, this configuration achieves a very substantially higher Net Specific Turbine Power.

This VAST-WS without blade cooling achieves a Net Specific Turbine Power of about 980 kJ/kg (kW/kg/s) at a pressure ratio Beta of about 30, near the industrial economic optimum. This Net Specific Turbine Power ranges from about 912 kJ/kg at a pressure ratio Beta of about 10 to about 993 kJ/kg at a pressure ratio of about 50.

By comparison with the relevant art, the most similar HAWIT cycle has a Turbine Specific Net Power of about 612 kJ/kg (kW/kg/s) at similar conditions. (i.e., the gross power of the turbine less all pumping work in compressor(s) and pump(s) divided by the fluid mass flow exiting the turbine.) I.e. the VAST-WS has about 38% higher Turbine Specific Net Power. Similarly a single pressure STIG cycle has a Turbine Specific Net Power 533 kJ/kg. This gives the VAST-WS an advantage in the Turbine Specific Net Power of about 58% over the STIG cycle. These parameters provide very substantial thermoeconomic benefits.

Similarly the high Net Specific Turbine Power of 980 kJ/kg for the VAST-WS without blade cooling and with no air cooling is about 60% higher than the HAWIT cycle and 84% higher than the STIG cycle in this 50 MW industrial aero-derivative turbine example.

Note also that the VAST Cycles utilize substantially higher ratios of thermal diluent added/oxidant containing fluid flow (at the compressor intake) (e.g., total water added/total compressed air flow). E.g. from 29% to 40% for the examples calculated with air cooled turbine blades at turbine. inlet temperatures of 1300° C. By contrast the four relevant art cycles STIG, HAT, RWI, and HAWIT have water/air ratios generally ranging from 12% to 23% for typical air pressure ratios of 20 to 40. (Assuming full cycle redesign enabling those levels of additional diluent to be added.) Thus VAST cycles preferably provide more than 26% total water added/total compressed air flow at about 1300° C. At lower turbine-inlet temperatures (TIT), these proportions of water/air further increase.

Turbine Requirements

High temperature gas turbine components desire low levels of ions in the energetic fluid such as sodium and vanadium to avoid component damage. They prefer low levels of particulates to avoid fouling the turbine vanes and blades which reduce efficiency. These deleterious components come from the intake oxidant containing fluid, the fuel and the thermal diluent. (E.g. compressed air, diesel fuel and water.)

Component Cooling & Recycling Cooling Heat

Users preferably provide thermal diluent cooling to one or more heat generating components (See FIG. 18 and FIG. 22. For example, they may cool one or more of a generator, motor, mechanical drive, pump, bearing, electromagnetic converter, (e.g., transformer or variable frequency converter) or a electromagnetic controller. With reference to FIG. 18, these may be described and collected as low temperature. They then preferably direct the heated fluid back into the VAST thermodynamic cycle to cool the combustion and energetic fluid. Such coolant flows recover heat which is commonly lost through components to reduce the fuel required to increase the temperature of the energetic fluid exiting the combustor to the desired Combustor Exit Temperature (or Turbine Inlet Temperature.)

The turbine-generator drive system is a very significant source of thermal losses. Users preferably recover some of the heat generated in the drive system and recycle it using the thermal diluent in some embodiments.

Variable speed electronic power converters/controllers achieve about 95% to about 96% efficiency. E.g., in microturbine power systems. Consequently, about 5% to 4% of the gross power generated by the generator is converted to heat. Conventional power conversion systems typically provide air cooling to maintain the temperature of the electronic power converters. The fan pumping power is a significant parasitic loss and reduction in efficiency.

Instead, with VAST Cycles, users preferably provide liquid heat exchangers to cool the power electronics in some configurations. Users preferably configure the heat exchangers and/or control the flow of thermal diluent to maintain the junction temperature of the power converters below the desired or needed levels according to the reliability desired (or to reduce the failure rate to the level desired.) Users preferably provide redundant pumps to provide coolant flow with a desired probability.

With such measures users recover heat from the power electronics and heat the thermal diluent from the temperature of the fluid exiting the condensor to near that of the allowable temperature exiting the power electronics heat exchanger. E.g. taking thermal diluent from temperatures of about 25° C. to about 30° C. and heating it up to about 95° C. to about 98° C. Users thereby recover about 3.5% to 4.5% or more of the power otherwise lost from the variable frequency electronic power converter as heat.

Users preferably deliver this heated thermal diluent into one or more of the thermal diluent flows that collectively cool the energetic fluid. This reduces the amount of heat that is added as fuel to increase the temperature of the oxidant containing fluid and the thermal diluent to the desired combustor exit temperature (or turbine inlet temperature.) By preferably recycling this heat, users achieve significant increases in thermal efficiency.

E.g., of the order of one percentage point or more. With such measures, users expect to recycle 3.5 to 4.5 kW of heat in a 100 kW microturbine power system. They also reduce the parasitic fan power required. Accordingly, in such a systems, they expect to improve the efficiency of such a 100 kW VAST microturbine power system from about 36% to about 37%.

In such configurations, users preferably form the heat exchangers are preferably lined with a low solubility high conductivity material or coating to reduce dissolution of the heat exchanger into the thermal diluent. E.g., tin plating or stainless steel coating to reduce corrosion or dissolution of copper heat exchangers. This reduces the concentration of copper or other contaminants in the thermal diluent system and thus from the energetic fluid flowing into the turbine.

Gear trains commonly result in 0.5 to 2% losses or higher. Users preferably use a fluid coolant to cool the gear trains and recover this heat in some embodiments. They preferably use the thermal diluent directly as the fluid coolant. In other configurations, they use a suitable intermediate coolant and then recover that heat into the thermal diluent.

In some configurations, users preferably use the thermal diluent to provide both lubrication and thermal cooling. E.g., the high purity deionized water used as thermal diluent contains few particulates and provides a useful lubricant as well as coolant. In such configurations, users preferably use corrosion resistant materials for the gear train.

Variable speed mechanical drives have similar losses and lubrication requirements. Users preferably use thermal diluent to cool the drive and recover the heat in some configurations. They preferably use the thermal diluent to also lubricate the drive where appropriate, or to cool the lubricant with the thermal diluent.

Generator

Generators have significant resistive losses from current flows in conductors. They also create windage losses. Generators are commonly air cooled and the heat is lost. Generator losses are of the order of 5% for small alternators, 1.5% to 2% for high speed small permanent magnet generators, dropping to 0.5% to 1.25% for large generators. In modified embodiments, the generator heat removal rate (i.e., temperature) may be varied to achieve generator (AC or DC) output power change.

Users preferably direct thermal diluent through and/or around rotor stators to cool them and recover a significant portion of the generator losses in some configurations. They preferably use thermal diluent warmed by more thermally sensitive applications such as power electronics. They preferably use higher temperature insulation coatings on windings and/or permanent magnets to operate the generators at higher temperatures and more effectively recover and recycle the thermal energy.

Where gases are used to cool generator rotors, users preferably provide heat exchangers to recover heat from those heated gases. E.g., to cool hydrogen that is used in cooling large generator rotors to both cool conductors and to reduce windage.

Re-Compressor (RCP)

Referring to FIG. 25, users preferably expand the energetic fluid to sub-atmospheric pressure, condense at least a portion of the condensable diluent-containing fluid and then recompress the non-condensibles back up to atmospheric pressure. This recompressor 5300 operates on the spent fluid which is primarily on humidified products of combustion. i.e., primarily nitrogen and carbon dioxide, with some excess oxygen and noble gases (e.g., argon), saturated with residual uncondensed water vapor.

Users preferably expand and re-compress the energetic fluid as described above and then additionally recover heat from the expanded fluid by heating and vaporizing diluent-containing fluid and then injecting that fluid between expansion stages. (See FIG. 26 and FIG. 31.) This recovers some additional heat and injects additional gas into the expansion train in order to produce additional mechanical work.

Where additional compression is desired, users preferably recompress products of combustion instead of the reactant gases to reduce the gas mass flow rate being compressed. During combustion, the oxidant reacts with the fuel to form carbon dioxide and water. Water is preferably also used for the thermal diluent. The water formed and added is preferably condensed and removed in the condenser. This results in a significant reduction in the non-condensable volume of the products of combustion compared to the reactant gases (aside from the common flow of non-condensable diluent gases e.g., nitrogen, excess oxygen, and the noble gases including argon.)

E.g. One mole of methane react with two moles of Oxygen to give one mole of carbon dioxide and two moles of water. This results in about a 67% reduction in volume of non-condensable gases from three moles to one mole. Similarly in burning diesel fuel, there is a reduction from about 18.5 moles of oxygen to 12 moles of carbon dioxide plus 13 moles of water. This gives a reduction of about 35% in these non-condensable reacting and product gases.

By preferably cooling the expanded fluid with a direct contact condenser, users preferably achieve temperatures fairly close to the coolant fluid. E.g. close to ambient conditions. This is typically cooler than the average temperature of the compressed oxidant containing fluid being compressed in the high pressure compressor (HPC) 1350. Accordingly the fluid is more dense, reducing the cost of the compressor relative to one compressing hotter fluids.

By this hybrid combination of compressor(s) before the Turbine 5100 and a recompressor 5300 afterwards, users preferably reduce both the cost of the compressor and the work.

In embodiments where the exhaust fluid is cooled and condensed, users preferably add a recompressor 5300 to discharge the expanded fluid back to the atmosphere. The cooling and condensation reduce the volume of the expanded gas. Consequently with the recompressor 5300, the pressure downstream of the turbine drops below atmospheric pressure. Users preferably use this configuration to improve the net thermodynamic cycle efficiency and costs (see FIG. 37, FIG. 50, Table 1, Table 19, and Table 20)

TABLE 19

RELATIVE COSTS OF SELECTED VAST CYCLES

| Component | VAST-Water @ Beta = 30 | | VAST-Water @Beta = 60 ~Opt IRR | | VAST-Water&Steam @Beta = 25 ~Opt IRR | |
|---|---|---|---|---|---|---|
| | Cost USD | % of TCI | Cost USD | % of TCI | Cost USD | % of TCI |
| Compressor Lpc | 750,792 | 3.80% | 166,151 | 0.99% | 1,121,085 | 6.07% |
| Compressor Hpc | 2,509,092 | 12.69% | 2,267,265 | 13.47% | 1,916,905 | 10.38% |

TABLE 19-continued

RELATIVE COSTS OF SELECTED VAST CYCLES

| | VAST-Water @ Beta = 30 | | VAST-Water @Beta = 60 ~Opt IRR | | VAST-Water&Steam @Beta = 25 ~Opt IRR | |
|---|---|---|---|---|---|---|
| | Cost | | | | | |
| Component | USD | % of TCI | Cost USD | % of TCI | Cost USD | % of TCI |
| Vast Combustor | 41,911 | 0.21% | 40,911 | 0.24% | 42,336 | 0.23% |
| Expander | 2,289,130 | 11.58% | 2,355,036 | 13.99% | 1,940,043 | 10.50% |
| Superheater | | | | | 225,706 | 1.22% |
| Evaporator | | | | | 367,342 | 1.99% |
| Economiser | 425,243 | 2.15% | 409,328 | 2.43% | 457,117 | 2.47% |
| Flue Gas Condenser | 231,549 | 1.17% | 307,774 | 1.83% | 323,118 | 1.75% |
| Re-compressor | 1,203,887 | 6.09% | 458,852 | 2.73% | 508,453 | 2.75% |
| Pre-water Heater | 49,353 | 0.25% | 3,451 | 0.02% | 28,072 | 0.15% |
| Cooler | 269,186 | 1.36% | 301,633 | 1.79% | 301,318 | 1.63% |
| Pump Recycle (Tocooler) | 9,877 | 0.05% | 8,041 | 0.05% | 8,507 | 0.05% |
| Pump Recycle (Condtocoo) | 5,619 | 0.03% | 6,204 | 0.04% | 6,280 | 0.03% |
| Pump Booster (To Hrecov) | 70,605 | 0.36% | 78,786 | 0.47% | 12,672 | 0.07% |
| Pump Feed (Tovastmixer) | 49,761 | 0.25% | 58,385 | 0.35% | 20,841 | 0.11% |
| Pump Cooling Water | 27,000 | 0.14% | 21,984 | 0.13% | 22,489 | 0.12% |
| Generator | 1,836,380 | 9.29% | 1,837,818 | 10.92% | 1,827,379 | 9.89% |
| Purchased Equipment Costs | 9,769,385 | 49.42% | 8,321,619 | 49.42% | 9,129,663 | 49.42% |
| Indirect Costs | 9,996,928 | 50.58% | 8,515,440 | 50.58% | 9,342,307 | 50.58% |
| Total Capital Investment TCI | 19,766,313 | 100.0% | 16,837,059 | 100.0% | 18,471,970 | 100.0% |
| Assumed Salvage Value | 0 | | 0 | | 0 | |
| Capital Cost $/MWh | 15.0 | | 12.8 | | 14.1 | |
| Variable Cost $/MWh | 30.6 | | 30.5 | | 30.5 | |
| Total Cost US$/MWh | 45.6 | | 43.3 | | 44.6 | |

50 MW TIT = 1300° C. Configurations**
Based on Cost equations from Traverso 2003 as in Table 3; For US 2000 mean Industrial Gas costs

TABLE 20

VAST CYCLE COMPRESSOR, RECOMPRESSOR BETA RATIOS & TURBINE EXPANSION RATIOS

| | VAST-W | | | | VAST-WS | | | | VAST-WSR | | | |
|---|---|---|---|---|---|---|---|---|---|---|---|---|
| beta | RPC LPC | RPC HPC | RPC (LPC*HPC) | EXP | RPC LPC | RPC HPC | RPC (LPC*HPC) | EXP | RPC LPC | RPC HPC | RPC (LPC*HPC) | EXP |
| 10 | 3.903 | 0.873 | 0.585 | 58.09 | 1.463 | 0.942 | 0.372 | 36.96 | 2.371 | 1.104 | 0.542 | 42.946 |
| 20 | 2.134 | 0.633 | 0.260 | 103.44 | 1.348 | 0.326 | 0.148 | 59.01 | 1.184 | 0.576 | 0.185 | 73.506 |
| 30 | 1.211 | 0.351 | 0.119 | 105.89 | 0.806 | 0.269 | 0.085 | 76.13 | 1.067 | 0.3 | 0.104 | 92.563 |
| 40 | 0.863 | 0.224 | 0.070 | 107.91 | 0.786 | 0.169 | 0.058 | 91.53 | 0.668 | 0.245 | 0.064 | 101.936 |
| 50 | 0.964 | 0.108 | 0.046 | 112.56 | | | | | | | | |

Liquid-Gas Fluid Contacting Apparatus

Some embodiments utilize the carbon dioxide rich flue gas as a carbon feed product food production, energy crop production, aquaculture, or mariculture. The "VAST gas™" formed typically has about 300% of the Carbon Dioxide that is in conventional lean combustion at about 15% O2 in the exhaust. (See, for example, Table 3.)

The very low NOx concentrations formed from in these embodiments provide a highly desirable carbon feed for such applications. This significantly reduces the action of NOx on accelerating ripening of vegetables, fruit or other horticultural products. In other configurations, users preferably increase the temperatures in the combustion chamber 4100 to actively increase NOx production when there is a desire to actively enhance and accelerate ripening.

The high humidity in the exhaust is ideal for horticultural applications.

In other embodiments, users separate the carbon dioxide from the exit gas and provide a carbon dioxide enriched gas for pharmaceutical production, biosynthetic processes, or other high carbon applications.

In some embodiments, the carbon dioxide rich gas or enriched carbon dioxide gas is preferably used as a flooding fluid in petroleum recovery processes. In other embodiments users sequester the carbon dioxide in deep waters, in partially depleted petroleum fields, or in geological formations to reduce the enhanced greenhouse effect. The embodiments described provide more efficient and cost effective methods to recover and utilize or sequester the carbon dioxide.

Diffuser/Stack

In some embodiments, users preferably control one or both of the parameters of the coolant flow through the expanded fluid condenser 7500 and the recompressor speed to adjust the recompression ratio. These control the pressure of the expanded fluid F420 and the expanded fluid gas temperature. By controlling these parameters relative to the water/fuel ratio, air/fuel ratio and fuel composition, users preferably adjust the dew point of the discharged exhaust fluid (or "stack gas"). By so doing, they adjust the fraction of thermal diluent condensed in the condensor 7500. (E.g., fraction or rate of recovery of water.) They preferably adjust the spent fluid F475 composition and temperature so that its temperature is above its dew point or saturation temperature. By such control, users may avoid condensation within a diffuser or stack 5900.

Cooling the turbine exhaust gas, condensing the thermal diluent and recompressing the non-condensable spent fluid typically results in an unsaturated stack gas. By so doing, they reduce or eliminate the size of the visible plume formed above the exhaust under typical ambient conditions. In some configurations, they may control or reduce the exhaust dew point so that no plume is formed when the exhaust fluid is discharged to the atmosphere.

This benefits perceptions of the nearby public as to environmentally clean power systems. It also provides a means to comply with local regulations such as those that require avoiding visible plumes in urban areas. This facilitates locating such VAST Cycle systems within municipalities that prohibit plume formation. It provides more efficient and economical methods of controlling plumes compared to relevant art methods of reheating the exhaust to prevent plumes. The recompressing VAST cycle provides these benefits without having to use burners and fuel etc. to reheat the stack gas.

Control System

Some embodiments of the invention preferably comprise a controller which preferably controls and monitors the overall operation of the system such as filter pressure drop, pump head, pump speed, compressor and/or blower speed, combustor pressure and temperature, expander shaft torque, generator output, and the like. Suitable sensors may be utilized, such as rotational speeds, pressure, temperature, flow meters and the like, as needed or desired. The controller may efficaciously incorporate a feedback system.

The controller is preferably configured to control the delivery of diluent within the configured VAST thermodynamic cycle. The liquid and vapor diluent flows are directed as desired to recover heat and cool energetic fluid flows such as shown in FIG. 28 and FIG. 29. Diluent fluid or coolant fluid flows may similarly be directed as desired to control temperatures of heated or heat generating components, such as shown in FIG. 18 and FIG. 22. The controller preferably controls coolant or diluent flows to one or more hot components of the combustion system and the expansion system.

Heated diluent may be directed to heat use applications as specified, such as shown in FIG. 28 and FIG. 29. As shown in FIG. 8, FIG. 12 and FIG. 13, diluent is preferably directed to cool one or more flows of oxidant containing fluid as it is being compressed. The controller preferably apportions the flows among these applications to satisfy the related cooling and temperature control criteria.

Users preferably control the diluent flow sufficient to constrain the temperature of heated components to below a selected design temperature. Where heat sensitive components are actively cooled, users preferably provide priority diluent flows to keep them below their respective design temperatures. Sensors such as temperature or flow sensors are preferably provided to sense temperature or flow conditions. Measure are preferably taken to control the flow and initiate power reductions or other measures should the diluent flow not be sufficient to control the temperature as desired.

Similarly, some thermal applications require minimum flows of heated diluent. These are often needed with a temperature greater than a minimum temperature. Accordingly, users preferably control the diluent or coolant flows to ensure minimum temperatures to a desired probability. E.g., in recovering heat from the energetic fluid. To do so, the turbine inlet temperature is preferably controlled within a desired range such as below a Turbine Inlet Temperature design limit, and above a practical temperature sufficient to achieve the minimum desired temperatures out of the heat recovery system. The diluent fluid flows through the heat recovery heat exchangers are preferably delivered with a flow controlled to achieve the desired degree of heating and fluid temperature to the desired application.

The fuel flow is preferably controlled to achieve the desired thermal and mechanical or electrical power from the energy conversion system. The diluent flow is preferably adjusted to control the turbine inlet temperature at a desired temperature or within a desired range while the-power level fluctuates.

While controlling temperature sensitive components, temperatures of thermal flows, and power levels, users preferably configure portions of diluent to the oxidant delivery system to cool the oxidant fluid being compressed and increase the efficiency of the compression process. Where vaporizable diluent is sprayed into the oxidant fluid being compressed, users preferably control the amounts delivered to below desired design levels. These are preferably set to avoid compressor surge. They may also be adjusted and the liquid diluent drop size and/or temperature adjusted to achieve diluent evaporation within desired distances and reduce or avoid compressor erosion. Multiple flows are preferably delivered to the inlet to the compressor and between compressor stages to provide the incremental cooling and achieve near saturated conditions in the compressed oxidant.

Users similarly configure the remaining diluent among the heat recovery system to improve the specific power and cycle efficiency while achieving these other control objectives. Where there are high demands for heated fluids, users may even deliver warm or unheated liquid diluent into the combustor to control the turbine inlet temperature, and similarly cool the combustor liner. For example, using warm or cold water into the combustor to complement the available steam and/or hot water as appropriate to control the temperature of the energetic fluid and the Turbine Inlet Temperature. This provides a flexible method of controlling the energy conversion system to achieve multiple and/or changing objectives.

Generalization

From the foregoing description, it will be appreciated that a novel approach for forming thermodynamic cycles using liquid diluents has been disclosed using one or more methods described herein. While the components, techniques and aspects of the invention have been described with a certain degree of particularity, it is manifest that many changes may be made in the specific designs, constructions and methodology herein above described without departing from the spirit and scope of this disclosure.

Where dimensions are given they are generally for illustrative purpose and are not prescriptive. Of course, as the skilled artisan will appreciate, other suitable fluid compositions, pressures, temperatures, heat flows and power levels, may be efficaciously utilized, as needed or desired, giving due consideration to the goals of achieving one or more of the benefits and advantages as taught or suggested herein.

While certain compressors, heat exchangers, turbines, pumps, treatment systems, ducts, valves, mixers and other components are shown in some configuration for some embodiments, combinations of those configurations may be efficaciously utilized, including varying the nominal compressor size, number of compressor stages, compression ratio, turbine size, turbine expansion ratio, number of stages, heat exchanger size, surface heat exchanger or direct contact heat exchangers, type and method of flow control, temperature control, power control, enthalpy control, and other dimensions and parameters for thermodynamic cycles may be used.

Though turbines have been used for expanders in some embodiments, other types of expanders may be used including reciprocating expanders.

Where the terms fuel, diluent, water, air, oxygen, and oxidant have been used, the methods are generally applicable to other combinations of those fluids or to other combinations of other reacting and non-reacting fluids. Where fluid quantities are referred to, these methods are generally applicable to include quantities delivered at multiple times, and to continuous fluid flows. Where assembly methods are described, various alternative assembly methods may be efficaciously utilized to achieve configurations to achieve the benefits and advantages of one or more of the embodiments as taught or suggested herein.

Where transverse, axial, radial, circumferential or other directions are referred to, it will be appreciated that any general coordinate system using curvilinear coordinates may be utilized including Cartesian, cylindrical, spherical or other specialized system such as an annular system. Similarly when one or more transverse or axial distributions or profiles are referred to, it will be appreciated that the configurations and methods similarly apply to spatial control in one or more curvilinear directions as desired or prescribed. Similarly, the contactor, array, device or duct orientations may be generally rearranged to achieve other beneficial combinations of the features and methods described.

While the components, techniques and aspects of the invention have been described with a certain degree of particularity, it is manifest that many changes may be made in the specific designs, constructions and methodology herein above described without departing from the spirit and scope of this disclosure.

Various modifications and applications of the invention may occur to those who are skilled in the art, without departing from the true spirit or scope of the invention. It should be understood that the invention is not limited to the embodiments set forth herein for purposes of exemplification, but includes the fall range of equivalency to which each element is entitled.

What is claimed is:

1. An energy-conversion system comprising:
   an oxidant delivery system having an inlet and an outlet configured to deliver an oxidant-containing fluid into the energy-conversion system;
   a fuel delivery system configured to deliver a fuel-containing fluid into the energy-conversion system;
   a diluent delivery system configured to deliver diluent-containing fluid within the energy-conversion system, at least a portion of which comprises a vaporizable diluent fluid, and wherein at least a portion of diluent-containing fluid is pressurized as a liquid;
   a combustion system, being configured to receive fluid from the fuel delivery system, the oxidant delivery system, and the diluent delivery system; and including a combustion chamber having at least one inlet in fluid communication with the outlet of the oxidant delivery system and with the outlet of the fuel delivery system; having at least one outlet, the combustion system being configured to mix fuel-containing fluid and oxidant-containing fluid to form a combustible mixture of fuel and oxidant, to oxidize fuel with oxidant, whereby forming products of oxidation, and to deliver at least a portion of liquid diluent-containing fluid into the combustion chamber; the combustion system being further configured:
   to deliver and mix diluent-containing fluid with one or more of oxidant-containing fluid, fuel-containing fluid and products of oxidation;
   to constrain the peak temperature of the energetic fluid exiting the combustion system; and
   to form an energetic fluid within the combustion system comprising products of oxidation, and vaporized diluent fluid, the energetic fluid having elevated levels of one or more of: temperature, pressure and kinetic energy;
   an expansion system comprising an expander having an inlet and an outlet configured to expand at least a portion of the energetic fluid, whereby forming an expanded fluid;
   a heat and mass transfer system having a plurality of inlets and outlets, being configured to: recover heat from the expanded fluid whereby forming a cooled expanded fluid; provide heat to diluent-containing fluid whereby forming a heated diluent fluid; deliver at least a portion of heated diluent fluid to the combustion system;
   a diluent recovery system configured to recover diluent from the expanded fluid at least about equal to that delivered into the oxidant fluid or energetic fluid upstream of the outlet of the expansion system; and to recover a portion of one or both of the water formed during combustion and the water delivered with the oxidant fluid into the oxidant delivery system; and
   a fluid treatment system configured to remove at least a portion of water recovered from the expanded fluid, wherein removing a portion of at least one contaminant in the expanded fluid and wherein reducing the concentration of the contaminant in the energetic fluid entering the expansion system.

2. The energy-conversion system according to claim 1 wherein the cooled energetic fluid further comprises at least one minor pollutant species formed by reaction between two or more components of fuel-containing fluid, oxidant-containing fluid, and diluent-containing fluid; the energy-conversion system being configured to control the concentration of at least that one pollutant in the utilized fluid exiting the energy conversion system to less than a prescribed concentration.

3. The energy-conversion system of claim 2 further configured to control the rate of discharge of minor pollutant species to less than 1 kg per MWh of power generated.

4. The energy-conversion system according to claim 1, wherein the transverse distribution of the ratio of actual exit temperature to desired exit temperature is controlled within a desired transverse ratio distribution, and wherein the temperature ratio is maintained within a range of 0.93 to 1.07.

5. The energy-conversion system according to claim 4, wherein the temperature ratio is maintained within the range of 0.97 to 1.03.

6. The energy-conversion system according to claim 1, wherein the transverse distribution of the ratio of actual exit temperature to desired exit temperature is controlled within a desired transverse ratio distribution, and wherein the temperature ratio near the location of peak temperature is maintained within the range of 0.99 to 1.01.

7. The energy-conversion system according to claim 1, wherein the transverse distribution of the ratio of actual exit temperature to desired exit temperature is controlled within a desired transverse ratio distribution, and wherein the ratio of the temperature ratio near the periphery to the temperature ratio near the center is within the range of 1.00 to 1.06.

8. The energy-conversion system according to claim 1 wherein the flow uncertainty in the flows of fuel-containing fluid, diluent-containing fluid and oxidant-containing fluid are controlled within a selected magnitude thereby defining a temperature uncertainty, such that the peak temperature of the energetic fluid exiting the combustion system is within a selected number of temperature uncertainties below the designed peak temperature within a desired probability, thereby increasing the system efficiency.

9. The energy-conversion system according to claim 1 wherein the oxidant delivery system further includes a fluid-pressurizing device configured to pressurize the oxidant-containing fluid, wherein the pressure ratio of the pressure entering the combustor to the ambient pressure is greater than about 20.

10. The energy-conversion system according to claim 9 further configured to cool the oxidant-containing fluid being compressed with diluent-containing fluid.

11. The energy-conversion system according to claim 1 further including a recompression fluid pressurizing device compressing the cooled expanded fluid downstream of the diluent recovery system is configured to reduce the pressure of the cooled expanded fluid exiting the diluent recovery system to at least 1% less than the ambient pressure.

12. The energy conversion system of claim 11 wherein the recompressor is further configured to vary the recompression ratio of the ambient pressure to the pressure of the cooled expanded fluid.

13. The energy-conversion system according to claim 1 wherein the compression ratio of the fluid pressurizing device compressing the cooled expanded fluid downstream of the diluent recovery system is configured between 1.1 and 8.

14. The energy-conversion system according to claim 1 is further configured to control the ratio of condensible diluent to non-condensible gases in the energetic fluid, the ratio of temperature of the cooled expanded fluid to the ambient temperature, and the recompression ratio such that the concentration of diluent fluid in the fluid exiting the energy conversion system is less than a desired portion of the saturation concentration, whereby controlling the probability of a plume being formed.

15. The energy-conversion system according to claim 1 further comprising an expander having an inlet in fluid communication with the combustor, and an outlet, configured to expand the energetic fluid from a higher pressure at the expander inlet to a lower pressure at the expander outlet.

16. The energy-conversion system according to claim 15 wherein the expander is a work engine configured to convert energy contained in the energetic fluid to useful mechanical power.

17. The energy-conversion system according to claim 15 wherein the fluid delivery and expansion ratio are configured and controlled such that the exit temperature of fluid exiting the expander is less than 500 degrees Celsius.

18. The energy-conversion system according to claim 15 further configured and configured to control the fluid delivery and expansion ratio such that the diluent concentration of the energetic fluid exiting the expander is less than the saturation concentration, whereby diluent does not condense within the expander.

19. The energy-conversion system according to claim 16 further comprising an electrical generator mechanically connected to the expander and configured to convert at least a portion of the mechanical power to electrical power.

20. The energy-conversion system according to claim 19 wherein the heat and mass transfer system further comprises a heat exchanger configured to recover heat from the electrical generator and transfer it to heat diluent-containing fluid.

21. The energy-conversion system according to claim 20 further configured to control the flow of diluent-containing fluid through the electrical generator heat exchanger and to maintain the temperature of the electrical generator below a desired level.

22. The energy-conversion system according to claim 20 further configured to use a low viscosity fluid to cool the electrical generator and exchange heat with the diluent-containing fluid.

23. The energy-conversion system according to claim 20 further configured to mix at least a portion of the heated diluent comprising heat from the electrical generator, with fluid upstream of the outlet of the expander.

24. The energy-conversion system according to claim 16 further comprising an expander drive connecting the expander to a mechanical application and wherein the heat and mass transfer system further comprises a heat exchanger configured to recover heat from the expander drive and deliver heated diluent-containing fluid.

25. The energy-conversion system according to claim 24 wherein the heat and mass transfer system is further configured to maintain the temperature of the drive lubricant to below a desired temperature.

26. The energy-conversion system according to claim 1 further comprising
 a heat generating component consisting of one or more of
  a generator connected to the expander, a motor, an electromagnetic converter, and an electromagnetic controller; and
 the heat and mass transfer system further comprising a component heat exchanger configured to control the flow of diluent-containing fluid wherein controlling the temperature of the heat generating component and recovering heat into heated diluent-containing fluid.

27. The energy-conversion system according to claim 26 further configured to control the flow of diluent-containing fluid such that the temperature of the electronic converter is maintained below 100 degrees Celsius.

28. The energy-conversion system according to claim 15 further comprising at least a second expander, configured to extract power from the energetic fluid at greater than 1.5 times the power extractable by the first expander at design conditions.

29. The energy-conversion system according to claim 1 wherein the controller is configured to control the fluid delivery such that the temperature of the energetic fluid entering the expander is controlled to not exceed a desired temperature.

30. The energy-conversion system according to claim 1 further comprising a fuel treatment system in fluid communication with the diluent delivery system, configured to treat the fuel-containing fluid and deliver it for use in the energy-conversion system.

31. The energy-conversion system according to claim 30 further comprising a cleaning means configured to remove at least a portion of contaminants in the fuel-containing fluid.

32. The energy-conversion system according to claim 31 further configured to filter off the contaminants from the fuel-containing fluid larger than a desired size.

33. The energy-conversion system according to claim 1 wherein heat from the expanded fluid downstream of the expander is exchanged with fuel-containing fluid being delivered to the combustion system.

34. The energy-conversion system according to claim 1 wherein the temperature of the fuel-containing fluid is maintained below a desired temperature prior to delivery into the combustion.

35. The energy-conversion system according to claim 34 the heat recovery is controlled such that the fuel-containing fluid temperature is maintained below about 100 degrees Celsius prior to delivery into the combustion system.

36. The energy-conversion system according to claim 1 further comprising a diluent treatment system in fluid communication with the diluent delivery system and configured to prepare the diluent for use in the energy-conversion system.

37. The energy-conversion system according to claim 36 further comprising a cleaning means configured to remove at least a portion of the contaminants from at least a portion of the diluent-containing fluid.

38. The energy-conversion system according to claim 37 further configured to filter off the contaminants larger than a desired size from at least a portion of the diluent-containing fluid.

39. The energy-conversion system according to claim 37 further configured to remove at least a portion of the soluble contaminants from the diluent-containing fluid.

40. The energy-conversion system according to claim 36 further configured to remove a portion of the recovered diluent from the energy conversion system.

41. The energy-conversion system according to claim 40 further configured to remove a portion of diluent from the energy conversion system whereby removing at least a portion of at least one containment from the energy conversion system, wherein maintaining the concentration of at least that containment entering the expander to less than a desired value.

42. The energy-conversion system according to claim 36 further configured to reduce a concentration of a diluent component to less than a desired value in at least a portion of diluent-containing fluid, wherein when at least a portion of that diluent is delivered upstream of the outlet of the expander, the concentration of that component in the energetic fluid delivered to the expander is less than a desired concentration.

43. The energy-conversion system according to claim 1 further to recycle a portion of the recovered diluent to upstream of the combustion system outlet.

44. The energy-conversion system according to claim 43 configured to reduce the portion of contaminants in a portion of the recovered diluent.

45. The energy-conversion system according to claim 44 further configured to sufficiently purify the diluent such that the total concentration of at least one contaminant in energetic fluid comprising the purified diluent recovered is less than a desired level.

46. The energy-conversion system according to claim 1 further comprising a diluent recovery system configured to recover a portion of diluent from the utilized fluid.

47. The energy-conversion system according to claim 46 further configured to control the portion of diluent removed from the energy conversion system wherein controlling the amount of diluent within the energy conversion system.

48. The energy-conversion system according to claim 46 further configured to recover a portion of diluent from the utilized fluid at least equal to the portion delivered upstream of the outlet of the expander.

49. The energy-conversion system according to claim 48 further configured to recover a portion of diluent equal to or greater than the portion of diluent delivered upstream of the outlet of the expander plus a portion desired to be removed from the energy conversion system.

50. The energy-conversion system according to claim 46 further configured to recover a portion of diluent from the utilized fluid to be equal to the portion deliverable upstream of the outlet of the expander plus a portion of diluent formable in combustion plus a portion of the relative humidity receivable through the incoming oxidant-containing fluid.

51. The energy-conversion system according to claim 1 configured to use water as a diluent-containing fluid.

52. The energy-conversion system according to claim 1 wherein the diluent recovery system comprises a direct contact condenser.

53. The energy-conversion system according to claim 52 wherein an approach temperature difference between coolant fluid entering the diluent recovery system and cooled energetic fluid exiting the diluent recovery system is less than 20 K (36 Fahrenheit degrees).

54. The energy-conversion system according to claim 53 wherein the approach temperature is less than 4 K (7.2 Fahrenheit degrees).

55. The energy-conversion system according to claim 1 wherein the diluent recovery system further removes a portion of filterable contaminants from the cooled expanded energetic fluid.

56. The energy-conversion system according to claim 1 wherein the diluent recovery system further removes a portion of soluble contaminants from the cooled expanded energetic fluid.

57. The energy-conversion system according to claim 1 further including a first heat exchanger having a hotter inlet in fluid communication with the expander outlet, and a cooler outlet, to exchange heat between at least a portion of the expanded energetic fluid and at least a portion of diluent-containing fluid.

58. The energy-conversion system according to claim 57 wherein a portion of heated diluent is delivered to the combustion system.

59. The energy-conversion system according to claim 1 wherein the diluent recovery system is configured to recover at least a desired portion of diluent from the expanded fluid exiting the expander.

60. The energy-conversion system according to claim 1 including a diluent recovery system in fluid communication with the outlet of the expander and configured to recycle at least a portion of recovered diluent fluid within the energy-conversion system.

61. The energy-conversion system according to claim 1 wherein a portion of the diluent is mixed with fuel-containing fluid before the oxidation thereof.

62. The energy-conversion system according to claim 1 wherein a portion of the diluent is mixed with oxidant-containing fluid before oxidation of the fuel.

63. The energy-conversion system according to claim 57 further comprising a second heat exchanger downstream of the first heat exchanger to exchange heat of at least a portion of the energetic fluid with at least a portion of cooler diluent to cool the energetic fluid.

64. The energy-conversion system according to claim 1 wherein the heat and mass transfer system further comprises a second heat exchanger downstream of the first heat exchanger.

65. The energy-conversion system according to claim 64 wherein the heat and mass transfer system is configured such that the ratio of the area of the second heat exchanger to area of the first heat exchanger is in the range of 20% to 150%.

66. The energy-conversion system according to claim 64 wherein heat from the expanded fluid flowing through the second downstream heat exchanger is recovered by liquid diluent.

67. The energy-conversion system according to claim 64 wherein a portion of the liquid diluent heated in the second downstream heat exchanger is delivered to cool oxidant-containing fluid being compressed by the oxidant fluid pressure device.

68. The energy-conversion system according to claim 64 further comprising a device configured to control the flow rates of diluent-containing fluid being delivered from the second heat exchanger to the first heat exchanger and being delivered to the oxidant delivery system.

69. The energy-conversion system according to claim 64 further comprising a device configured to control the flow rates of diluent-containing fluid being delivered from the second heat exchanger to the intake to the oxidant delivery system and into compressed oxidant-containing fluid within the oxidant delivery system.

70. The energy-conversion system according to claim 1 wherein a portion of the flow of heated liquid diluent is delivered to an oxidant fluid pressuring device in an amount less than or equal to that required to saturate the oxidant-containing fluid exiting the oxidant pressurizing device.

71. The energy-conversion system according to claim 57 wherein the heat and mass transfer system further comprises a condensation heat recovery system downstream of the first heat exchanger using a coolant fluid to recover heat from at least a portion of the energetic fluid sufficient to condense at least a portion of the vaporized diluent fluid.

72. The energy-conversion system according to claim 1 wherein the heat and mass transfer system further comprises a cooling system for coolant used to cool the expanded fluid and condense the vaporized diluent.

73. The energy-conversion system according to claim 71, wherein the condensation heat recovery system comprises a direct contact heat exchanger utilizing diluent as the coolant fluid.

74. The energy-conversion system according to claim 73 wherein the direct contact heat and mass transfer system and the coolant diluent flow are configured and controlled such that the approach temperature between the cooled utilized fluid exiting the direct contact heat exchanger and the heated coolant diluent is less than 4 degrees Celsius.

75. The energy-conversion system according to claim 57 wherein the heat and mass transfer system further comprises a recuperative heat exchanger configured to recover heat from the expanded fluid exiting the expander and to heat oxidant-containing fluid upstream of the combustion system.

76. The energy-conversion system according to claim 75 wherein the heat and mass transfer system is configured such that the ratio of heat recovery surface area of the recuperative heat exchanger to the first heat exchanger is from 20% to 300%.

77. The energy-conversion system according to claim 75 wherein the heat and mass transfer system is configured such that the portion of expanded fluid directed through the first heat exchanger downstream of the expander is similar to the portion of the expanded fluid directed through the recuperative heat exchanger heating oxidant-containing fluid upstream of the combustion system.

78. The system of claim 1 wherein the fluid treatment system further being configured to treat one or more of the diluent fluid, the fuel-containing fluid, and the oxidant-containing fluid to reduce the concentration of at least one component of the energetic fluid entering the expansion system.

79. A method of controlling a heat and power system, the heat and power system comprising:
a reactant delivery system configured to deliver a reactant fluid comprising a reactant;
a co-reactant delivery system configured to deliver a co-reactant fluid comprising a co-reactant;
a diluent delivery system configured to deliver a diluent fluid comprising a vaporizable diluent;
a reactor configured to deliver diluent, react reactant with co-reactant and form an energetic fluid comprising reaction products, diluent and residual components of the co-reactant fluid and diluent fluid;
an expander configured to expand the energetic fluid and extract mechanical energy, whereby forming an expanded fluid;
a hot fluid heat exchanger configured to recover thermal energy from at least one of the energetic fluid and the expanded fluid, into a coolant fluid whereby forming a heated fluid and a cooled fluid;
a heated component heat exchanger, configured to control the temperature of a heated component of the heat and power system and recover heat into a coolant fluid;
a controller configured to control the delivery of reactant fluid, co-reactant fluid and diluent fluid;
the method comprising:
controlling the delivery of coolant fluid to the heated component heat exchanger wherein controlling the temperature of the heated component to less than a selected temperature;
controlling the diluent fluid delivered into the co-reactant containing fluid or energetic fluid upstream of the expander outlet, thereby controlling the peak temperature of the energetic fluid entering the expander to below a specified temperature;
controlling the delivery of coolant fluid through the hot fluid heat exchanger wherein recovering heat from the energetic fluid and
controlling the temperature of the heated fluid to be greater than a selected temperature;
controlling the reactant fluid delivery to provide a thermal energy at least equal to the thermal energy sufficient to deliver the sum of a mechanical energy extracted from the energetic fluid by the expander, plus a thermal energy extracted from the energetic fluid or expanded energetic fluid and delivered by the coolant fluid;
controlling one or both of the reactant fluid and the co-reactant fluid to obtain a ratio lambda of the co-reactant to reactant ratio relative to the stoichiometric co-reactant to reactant ratio within a selected range above one and below a selected ratio;
controlling diluent delivery within the reactor; wherein controlling the amount of oxides of nitrogen and amount of reactant pollutant components in the expanded fluid being exhausted from the energy conversion system.

80. The control method of claim 79 wherein the heated fluid comprises diluent.

81. The control method of claim 79 wherein the reactant is a fuel comprising one or more of hydrogen and carbon.

82. The control method of claim 79 wherein the co-reactant is an oxidant comprising one or more of oxygen, fluorine, chlorine, bromine, and iodine.

83. The temperature control method of claim 79 wherein the reactor is configured and able to deliver more diluent than the amount sufficient to saturate the co-reactant containing fluid.

84. The control method of claim 79 wherein the heated component receives heat from one of the energetic fluid and the expanded fluid, and comprises one or more of a component of the reactor, a component of the expander, and a heat exchanger.

85. The control method of claim 79 wherein the heated component comprises an internally heated component which generates heat, wherein the internally heated component comprises one or more of a generator, a motor, a bearing, a mechanical drive, an electromagnetic converter, and an electromagnetic controller.

86. The control method of claim 79 further comprising delivering heated diluent to cool a second heated component.

87. The control method of claim 79 further comprising delivering heated diluent to a heat application.

88. The control method of claim 79 further comprising delivering heated diluent to the reactor.

89. The energy-conversion system according to claim 63 further configured to deliver a portion of the heated diluent-containing fluid from the second heat exchanger into the oxidant-containing fluid being compressed.

90. The energy-conversion system according to claim 63 wherein the heat and mass transfer system comprises a third heat exchanger downstream of the expander and upstream of the first heat exchanger to recover heat from the expanded fluid and to heat a coolant fluid.

91. The energy-conversion system according to claim 90 further comprising a device configured to control the flow rates of diluent-containing fluid being delivered from the first heat exchanger to the second heat exchanger and being delivered to the combustion system.

92. The energy-conversion system according to claim 90 wherein the coolant fluid comprises liquid thermal diluent and at least a portion of the thermal diluent is evaporated in the third heat exchanger.

93. The energy-conversion system according to claim 90 wherein the coolant fluid is thermal diluent and at least a portion of the thermal diluent is evaporated and further heated in the third heat exchanger to form a superheated diluent.

94. The energy-conversion system according to claim 90 wherein the oxidant delivery system comprises a compressor, and the coolant side of the third heat exchanger is in fluid communication with the combustion system downstream of the compressor and upstream of the expander.

95. The energy-conversion system according to claim 94 wherein diluent heated by the third heat exchanger is mixed with fluid within the combustion system downstream of the compressor and upstream of the expander.

96. The energy-conversion system according to claim 90 wherein diluent heated by the third heat exchanger is mixed with fluid upstream of the start of combustion.

97. The energy-conversion system according to claim 89 further comprising a recompressor configured to compress the expanded fluid to at least ambient pressure and to exhaust it.

98. The energy-conversion system according to claim 97 wherein the recompressor is configured downstream of a diluent recover system.

99. The energy-conversion system according to claim 97 wherein the gross combined expansion ratio of the product of the pressure ratios of one or more fluid pressurizing devices compressing oxidant-containing fluid upstream of the combustion chamber and the pressure ratio of the recompressor compressing the cooled expanded fluid downstream of the diluent recovery system, is greater than about 37.

100. The energy-conversion system according to claim 99 wherein the ratio of mass flow of condensible diluent to mass flow of oxidant-containing fluid is controlled such that the net specific power of the energy conversion system relative to the total oxidant-containing fluid flow, comprising the gross power of the expander less the sum of the power utilized to compress the oxidant-containing fluid, fuel-containing fluid, and diluent fluid and cooled expanded fluid downstream of the diluent recovery system, is greater than 940 kW/(kg/s) (=kJ/kg) of fluid flow exiting the fluid pressurizing device compressing the oxidant-containing fluid wherein the oxidant is air.

101. The energy-conversion system according to claim 99 wherein the ratio of mass flow of condensible diluent to mass flow of oxidant-containing fluid is controlled such that the net specific power of the energy conversion system relative to the expander flow, comprising the gross power of the expander less the sum of the power utilized to compress the oxidant-containing fluid, fuel-containing fluid, and diluent fluid and cooled expanded fluid downstream of the diluent recovery system, is greater than 700 kW/(kg/s) (=kJ/kg) of fluid flow entering the expander when operating on air.

* * * * *